US010991242B2

(12) United States Patent
Taylor

(10) Patent No.: US 10,991,242 B2
(45) Date of Patent: Apr. 27, 2021

(54) SUSTAINED VEHICLE VELOCITY VIA VIRTUAL PRIVATE INFRASTRUCTURE

(71) Applicant: Donald Warren Taylor, Fredericksburg, TX (US)

(72) Inventor: Donald Warren Taylor, Fredericksburg, TX (US)

(*) Notice: Subject to any disclaimer, the term of this patent is extended or adjusted under 35 U.S.C. 154(b) by 0 days.

(21) Appl. No.: 15/489,974

(22) Filed: Apr. 18, 2017

(65) Prior Publication Data

US 2017/0337813 A1 Nov. 23, 2017

Related U.S. Application Data

(63) Continuation of application No. 14/666,588, filed on Mar. 24, 2015, which is a continuation of application
(Continued)

(51) Int. Cl.
| | |
|---|---|
| *G08G 1/005* | (2006.01) |
| *G08G 1/01* | (2006.01) |
| *G01C 21/34* | (2006.01) |
| *G08G 1/08* | (2006.01) |

(Continued)

(52) U.S. Cl.
CPC ....... *G08G 1/0141* (2013.01); *G01C 21/3415* (2013.01); *G01C 21/3691* (2013.01); *G01C 21/3697* (2013.01); *G05D 1/0285* (2013.01); *G05D 1/0287* (2013.01); *G06K 7/10475* (2013.01); *G08G 1/0112* (2013.01); *G08G 1/0116* (2013.01); *G08G 1/0133* (2013.01); *G08G 1/0145* (2013.01); *G08G 1/08* (2013.01);
(Continued)

(58) Field of Classification Search
CPC .......................... G08G 1/0141; G01C 21/3691
See application file for complete search history.

(56) References Cited

U.S. PATENT DOCUMENTS

| | | | | |
|---|---|---|---|---|
| 2009/0271101 A1* | 10/2009 | Relyea | ................... | H04W 4/50 |
| | | | | 701/118 |
| 2015/0206426 A1* | 7/2015 | Bradley | ............... | G08G 1/0141 |
| | | | | 701/118 |

(Continued)

*Primary Examiner* — Jess Whittington

(57) ABSTRACT

A secure vehicle navigational system managing recorded vehicular and human movements transmitting encrypted communications between secure interconnected devices configured along road-ways within network-topology of two or more domains interconnected within a configured infrastructure communicating with a plurality of encrypted telemetry communication devices con figured within or attached to vehicular apparatus and humans, recording received and transmitted data-content between interconnected ecomm-devices and navigational command centers, continuous calculating forecasted positional phase-change positional points determined from a plurality of algorithms and techniques, map tracking a plurality of mechanisms, performing a plurality of calculations comprised of spatial density in proportion to velocity changes, analyzing a plurality of detected guidance drive-ability and interoperability factors, forecasting programmed space time position compared with future time in space positions from a configured subnaysys network-topology, navigational directives and communications are viewable and audibly heard on a augmented VIR Inter-Face, and other embodiments are claimed and described.

1 Claim, 10 Drawing Sheets

Related U.S. Application Data

No. 14/158,797, filed on Jan. 18, 2014, now Pat. No. 9,224,293, which is a continuation of application No. 13/815,897, filed on Mar. 15, 2013, now Pat. No. 9,743,473.

(51) Int. Cl.
*G08G 1/0965* (2006.01)
*G08G 1/0967* (2006.01)
*G08G 1/0968* (2006.01)
*G08G 1/00* (2006.01)
*G01C 21/36* (2006.01)
*G05D 1/02* (2020.01)
*G06K 7/10* (2006.01)
*H04Q 9/00* (2006.01)

(52) U.S. Cl.
CPC ......... *G08G 1/0965* (2013.01); *G08G 1/0968* (2013.01); *G08G 1/096725* (2013.01); *G08G 1/096741* (2013.01); *G08G 1/096775* (2013.01); *G08G 1/096816* (2013.01); *G08G 1/096844* (2013.01); *G08G 1/205* (2013.01); *H04Q 9/00* (2013.01); *H04Q 2209/47* (2013.01)

(56) References Cited

U.S. PATENT DOCUMENTS

| | | | |
|---|---|---|---|
| 2016/0284212 A1* | 9/2016 | Tatourian | G08G 1/0133 |
| 2017/0359197 A1* | 12/2017 | Stolfus | H04L 12/6418 |

* cited by examiner

*iCrypticus*

Secure iPage for iNavX2 Interface With Data-iFields to pay for Vehicle Inspections, License Renewal, Insurance, Advertisements, Reservations and or any other product and or services.

> Time Left before iWindow Closes in '190 sec.'

Enter Card Holder Name

Card Number

Expiration Date

Zip Code

Card Code from back

Press to Transmit Data

Credit Card Information Transmits to at least one Processors iServer → *iTraceTrac Analyzed*

Figure 6D

*iCrypticus*
Secure iPage, iWindow and/or
iPWindow, with only registered
card Data-iFields Time Left before iWindow
Closes in '190 sec.'

Enter Card Holder Name

Registered ID-CardPin

Press to Transmit Data

Figure 6E

SUSTAINED VEHICLE VELOCITY VIA VIRTUAL PRIVATE INFRASTRUCTURE

CROSS REFERENCE TO RELATED APPLICATIONS

The present application is a continuation-in-part of and claims priority to following U.S. patent applications, Ser. No. 13/815,807, entitled "Apparatus and System for Monitoring and Managing Traffic Flow" filed in the U.S. Patent and Trademark Office on Mar. 15, 2013, now U.S. Pat. No. 9,070,290; U.S. patent application Ser. No. 14/158,797 entitled "Apparatus and System for Monitoring and Managing Traffic Flow" filed in U.S. Patent and Trademark Office on Jan. 18, 2014, now U.S. Pat. No. 9,224,293; U.S. patent application Ser. No. 14/666,588 entitled "Apparatus and System to Manage Monitored Vehicular Flow Rate" filed in U.S. Patent and Trademark Office on Mar. 24, 2015, now U.S. patent Ser. No. 10/037,689; and now U.S. patent Ser. No. 15/489,974 having at least one common inventor as the present document and each hereby incorporated by reference herein.

FIELD OF THE INVENTION

The present vehicle navigational system is generally related to vehicular or human transportation, and more particularly to a structured apparatus and system to manage monitored traffic flow based on Phase-Change Spatial Density factors from authenticated, registered iLink-sync'd vehicular movements in proportion to other vehicles with surrounding scenery in a virtual interface, providing authoritative digital traffic directives navigating any type vehicle maneuvering within at least one networked domain, that may be further interconnected within one or more interconnected infrastructures, sharing contemporary and historical business telematic data across certified Tribal entities, share or stack-holders; along with forecasted verified business intelligence with state, federal DOT and local law enforcement agencies.

STATEMENT REGARDING FEDERALLY SPONSORED RESEARCH OR DEVELOPMENT

No federal funds were used to develop or create the secure vehicle navigational system disclosed and described in the patent application.

AUTHORIZATION PURSUANT TO 37 C.F.R. § 1.171 (d)

Portions of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DISCUSSION OF THE BACKGROUND

Intuitive Intelligent Traffic System commands real-time data signals encapsulated, of encrypted mobile or static Encrypted Communication Devices (also known as ecomm-devices), collecting physical events indicating positional Phase-Change Spatial locations for each vehicle in relationship to surrounding vehicular movements within any given networked domains infrastructure. Thereby providing stern evidence that pushes Quantum Mathematical Boundaries displacing momentum and positional points calculated at same time from multiple XY co-ordinates Latitude Longitude and Altitude (Longlatilt) laced together with vehicles spatial third dimension Z-Topography and Climatic Expectations commixed with the human elements (x2factors) recorded, vehicle capabilities/capacity to navigate either semi-autonomous or autonomously, amalgamated within network architectonics, intensifying traffic throughput by way of a Channeled Telematic Architecture, hereafter referred to as CTA creating a navigational matrix, incorporating a sub-navigational systems (subnaysys), structured to only communicate with specific linked and paired ecomm-devices within the networks infrastructure. Establishing a secure connected organizational protocol for each certified iLinkSync'd (Identified Link Synchronized Device) ecomm-device, registered and authenticated in direct point communication with surrounding selected or assigned ecomm-devices transmitting secure coded data between a plurality of ecomm-devices, localized CyberCloud servers inter-connected to at least one identified navigational command center (iNavCom).

With the ever increasing degree of road traffic congestion and related road rage in certain areas, eliminating me first syndrome by a guarded domain networked infrastructure that manages monitored traffic flow density provides straight forward solutions that protects vehicles and drivers. Relaxes congestion controlled in a protected environment, alleviating unexpected maneuvers from careless drivers, navigate semi-autonomous, autonomous or an identified mechanisms (iMechanixms) example: a drone, autonomous hovering apparatus, vehicle operationally controlled by a human virtual or not, a machine operator supported by redundant triangulated communications from various types of ecomm-devices; and most importantly, exchanging or providing data-artifacts across all tribal, share and stack-holder entities. Resulting fuel consumption decrease in direct relationship, in association with environmental concerns from $CO_2$, $O_2$ and other organic or inorganic engine vehicles propulsion matter, maintenance data items are maintained in constant observation, including preferred management of vehicle inspections, licensing status, insurance coverage each archived within at least one iChipset, $iChipset^X$ or AiChipset, that become relatively interoperable in a managed equation.

Thus, flow variations of network traffic manageability decreases useless idle times, and more requiring earnest attention regarding fuel consumed to break and minimize inertia; the second true element of a Traffic Modeled Ecosystem equation, most important the manageability of variable sustained vehicle momentum or velocity. By allowing vehicular traffic to flow in variable speed variations within the state of a secure virtual vehicle navigational systems created ecosystem drives measurable analytics, evaluating temporal effectiveness, performance attributes for each vehicle and ecomm-device deployed, further enhancing speed modifications between tVectorHub or traffic lights, roadways in Phase I with simple secure sensor devices. During Phase I & II transition, vehicular traffic control incorporates ecomm-device sensors transmitting or receiving navigational directives generated by the secure virtual vehicle navigational system, Phase III move completely to a virtual interface; wherein all navigational traffic signs are eliminated, each phase allows cross traffic seamlessly flowing in a calculated command controlled manner along with other secondary roadways, thoroughfares or cross-layer streets; wherein traffic itself becomes manageable exponentially.

Existing vehicle traffic systems lack efficient stable and most importantly a uniform secure structured operating system, generally depends on direct line of sight or near-field detection interpretation devices or with visual observations of some sorts produced from devices like infrared receivers; wherein cameras that have limited visual detection zones and devices used to aid emergency vehicular traffic, are expensive and not reactive enough between lights or intersections with or without traffic lights if at all, and most require a direct line of sight to function somewhat properly, additional deficiencies occur in bad or foggy weather, sunlight reflection or refraction of suns rays obstructing detectable events. Furthermore, current roadside traffic signal controller cabinets are power-hungry systems, that need routine maintenance and are costly on all fronts combined, along with hardware or upgrades to programs and tech support personnel working out of towed trailers. With further concerns of temperature fluctuations within these cabinets play havoc on relays, timers, electrical circuitry and all other parameters example: including traffic lights, cameras and current sensors currently being used, cussing degradation to parameters expected at any given intersection. Not to mention electrical power outages from storms during an evacuation or grid shortages, in doing so human intervention from law enforcement agencies are deployed, many drivers have experienced these concerns while driving. Mobile repeater towers can be strategically deployed or built on emergency vehicles activated before storms arrive, assisting in signal strength so that any smart phone ecomm-devices or vehicles equipped with Auto-vector Integrated Chipset (Avics) within On Board Vehicle Processor (Ob-vipro) is always receiving traffic directives during an eventuality of a storm or emergencies.

Meantime, vector-hub class or node-class ecomm-devices are zolar equipped with one or more zPanels; wherein ecomm-devices are covered on two or more of the exterior sides to capture sun power from multiple side angles or combinations of spherical angular shaped enclosures increasing physical areas exposed to sun light. Furthermore, each ecomm-devices is are small and preforms simple tasks that transmits vehicle traffic data, some of which may be bi-directional data coded transmissions and uncomplicated as to their purposeful functionality and of course cost effective during or after deployment.

Video image vehicle detection system (VIVDS) that need to be humanly monitored and are inconsistent with detections due to having an engineer manually draw or system auto adjust limited detection zones repetitively, to identify precise areas of concern due to vehicular traffic positions or vehicle size variations within lanes themselves including common weather events, not to mention hackers that indulge themselves in disruption attempts, instead of using their God given talents for betterment of entire human race.

Furthermore, loop detectors that are fairly expensive, results in area concrete deterioration from water infiltrating that causes cracks, and have a high failure rate with limited capabilities along with other expensive devices that do not collect real-time data from multiple positional reference points continuously throughout any municipality or on freeways. Said techniques can only provide extremely limited short range manageability with little or no proficiency, if any at all for the manageability of multiple vehicles and are too imprecise for more sophisticated management strategies that engages the ability to monitor traffic density and there associated variables maintaining safety-critical distant factors between vehicles based on density flow rates as speeds increases in direct relationship.

Aggregate density of traffic has a direct relationship to area traffic speed within cities and or freeways. Whereby, factored increased distant between vehicular movements creates less dense traffic resulting in a safer network, distant factor assists in lane changes or merging, unexpected or generated by the secure virtual vehicle navigational system speed reductions maintaining safe momentum flow in any given domains networked infrastructure. Managing variable density flow ratio, facilitates systematic capacity to decrease energy consumption, further providing real-time vehicular maintenance diagnostic informatics, insurance coverage verifications capabilities, along with current vehicle inspections completed via coded data transmissions, valid licensing status for commercial or personal vehicles from coded data telemetry being received, are generally not automated nor shared with governmental, certified tribal, share and stack-holder entities that is part of contemporary vehicular traffic equation.

Current traffic equipment and/or studies do not take into consideration as to staggering amount of fuel needed to obtain momentum again after stopping, in addition to idling these statistical studies lack evidence as to many different types of vehicles and their weight, age, not properly tuned, engine and related vehicle control system and/or human parameters, tire pressures or depth from at least two or more sensors, or of additional items not listed, and that are not within papers in circulation; wherein data-facts are screwed for readability purposes.

Thus, there currently exists deficiencies in viewpoints that manage flow rates in relationship to traffic density and further in need of a uniform standardization, comprising Architectural Application Reliability so that no matter what country or state driven in, one can understand systematic nomenclature and functional purpose that is Reliable by Architectural Design, using scalable sub-navigational systems capable of changing secure communication flexibility with ease of deployment and understanding. Encompassing a Uniform Vehicular Architecture (UVA) that learns from detected recorded historical events, categorically defines driver and vehicular deficiencies with ease of deployment, cost per intersection a very small fraction of current technologies.

Phase-Change Spatial Analytics helps municipalities make advanced informed decisions regarding vehicular density, automation of map-tracking particular or selective vehicles with or towards alternate routes, allowing drivers decision capabilities; determine trends in vehicular movements in advance to maintain maximum destination variations compared with original routes maintaining Spatial Conformity from destination time frames based on ensuing dynamics for any clustered-mass or an individual vehicle determined, make calculated spatial phase changes in momentum to cross-layer intersections. Informational data collected, assuredly sheds new light on road concentration costs, short and long term future congestion alternatives with uncomplicated protocols.

In conjunction with comparative computations, Phase-Change spatial analytical data modeling from overlay map-objects of a plurality of vehicles provides decision makers from city to state DOT with Business Telematic Intelligence (BTI) data metrics. Including traffic modeling for public employee vehicles, mass transportation and school busses, along with significant monetary savings in all areas of current traffic management from prevailing systems involvement and further learns or anticipates a driver or a semiautonomous or autonomous vehicles cataloged deficiencies, reactive responsiveness or from itself as to how vehicles navigate seamlessly with semi-autonomous in relationalship with autonomous vehicles.

The secure virtual vehicle navigational system provides business owners trucking or service related enterprises and tribal entities, share or stack-holder entities a Smarter Processing Platform for map-tracking products carried, recording exact triangulated locations, stopping points and of additional items not listed, enabling proven a financial performance from their assets increasing revenue, generated aspects viewable over at least one secure encrypted data communication link (edcomm-link). The secure virtual vehicle navigational system assimilates the ability by one or more algorithms to forecast growth, to plan maintenance or new roads, visualize by virtual results before they occur including accidents, shared across multiple platforms with tribal, share and stack-holder entities creating a safer vehicular rudimentary infrastructure. As with our past, Phase-Change Spatial Analytics is a body of methods and techniques formulated for analyzing spatial scalability, allows defined manageability to control variable traffic flow in large infrastructures; wherein results depend upon a spatial density arrangement or arrangements from prior moments in a time-frame or a in determination with vehicular artifacts past, present or a calculated space time-frame at a plurality of future spatial positional points of a vehicles movements or maneuvering with or between surrounding vehicles, calculations are determine by at least one algorithm of the one or more factors: momentum of one or more vehicles within a mass, the calculated positional point in a future time-frame sequenced mapped equation by at least one or more algorithms to and/or with adjacent, surrounding vehicles, vehicles or a hovering apparatuses within same mass or clusters of one or more masses. The secure virtual vehicle navigational systems generates generated analytics provides informatics beyond toolset currently known for querying, measuring, transforming, describing calculable dataset optimization from conceptual testing of real-time verified data harvested and more.

Furthermore, there is a need for standardized of a International Transit Telematic System, also known as ITTS, comprising the advancement in traffic telematics worldwide; wherein the secure virtual vehicle navigational system continually computes traffics phase-change spatial positions virtually throughout any given domain networked infrastructure area. Maintaining a standardization in distance factors between vehicles at a plurality of speeds or flow rates based on future calculated density factors on freeways or for that matter any traversed roadway with transit variables compiled with in-exhaustible momentum variations, detections of lane deviations are computed by Vector Lane Drift analytics, also known as vLaneDrift (VLD) notifications are supported by Proximity Integration sensors surrounding a vehicle, a bicycle, a motorcycle or a hovering apparatus built with or attached to on all sides of a vehicle, sensors are built of at least one Ultrasonic telemetry-device or Ultrasonic device, comprised of a transceiver, a transponder or a radar device for redundant location verification purposes combined that receives, or responds with a echolocation change by transmitting a plurality of frequency or pulsating tones to surrounding iLink-sync'd vehicles, hovering apparatuses continuously verifying or confirming geographical locations, a propagation of message updates being received from the secure virtual vehicle navigational system, programmed or downloaded stored in into vehicles ecomm-devices of a spatial distance in proportion with a calculated speed; wherein the spatial distance factors between surrounding vehicles or more specifically the spatial distance between the vehicle in front of each vehicle are based on a vehicles functional attributes, example: braking capabilities or capacity, x2Factors, or of additional attributes not listed displaying said detected distances numerically on a display screen or a virtual screen, transmitting recorded distances to at least one linked and paired server, iNavCom centers or facilities simultaneously.

Further advancing Traffic Congestion Artifacts in relationship to other vehicles from planned or not route destinations, as it relates to alternatives for planned or unplanned routes, detours and additional traffic variables codifies traffic flow based on a regulated flow rate in relationship with aggregate density composed with the human equation (x2Factors), vehicle capacity to navigate by a human or a autonomously along with topography, that is to say the extended relationship between longitude/latitude and altitudes artificial physical features of an area arrangement; wherein spatial analytical forecasts in conjunction with climatic factors keeps to a minimum of unnecessary idling or minimizing if not eliminating the need to consistently break inertia with exponential results in energy propulsion consumption savings, including hydrogen fuel-cells vehicles.

Signal light control devices, cameras are minute representations in the whole schema in traffic control that does not account for calculable time/distant equations for entire network traffic infrastructure in any given municipality or surrounding conurbations approaching interactions, and for that matter even on freeways in an around and between any town or metroplex. These are a few examples of one of many priority elements the vehicle navigational system Administers Organizational Control responding with a Cloud Sync'd Enterprise Architecture in secure communication with at least one central server in one or more iNavCom center or facilities.

Currently there are statistical records that provides most cities have very large numbers of non-compliant vehicles without current tag devices or for that matter inspections, that are not properly insured. Previous statistics show nearly 40 percent or more of all drivers in Dallas-Fort Worth MetroPlex do not carry insurance, further possibly more due to lapsed coverages at any given time period. Insurance, inspections and license tag devices are updated or paid through network using secure ECDLinks (Encrypted Communication Data Links) provided by encapsulate Encrypted Data Push to one or more payment processors or acquiring banks, entire system will create many more tech jobs, hardware sales.

Preferred understanding of the vehicle navigational system embodiments, comprises an architectural resemblance of, opening up and looking inside either a PC or a MAC®. Both have a pre-configured and most assuredly that of which is merely an infrastructure, which has made its way to the over all composure and to its processes managed by knowledge from the secure virtual vehicle navigational systems infrastructure itself at all communication levels encompassing Channeled Telematics by subnaysys integration.

Resources municipalities have currently in use, once moved over to a manageability role, utilizing current deployed traffic devices as need to be replaced arises or move over too, as in taking down certain intersections traffic lights and other signage. Savings from bidding new contracts for equipment that is not sufficient to adapt much further without significant costs, maintenance heavy, along with updates on internal hardware or software are substantial, not to mention amount of heat and energy needed to run traffic control cabinets and over-all life expectancy for hardware in each. During both warm and cold days, we all have experienced errors from power outages due to weather events increasing idling time-consuming travels.

Taking the costs associated with of one four-way double lane intersection from traffic lights with hardware, cameras, or additional traffic sensors, the combined dollar amount moves close to 6 figures plus, in some instances much more. By placing one or more tVectorHub ecomm-devices or combinations of additional types of vector-hub class or node-class ecomm-devices; wherein the vehicle navigational systems devices are is a small fraction of current technological equipment deployed at any particular intersection, deploying said devices from intersection for a mile more or less, or as far as eye can see in a straight line or replace all forms of signage and their associated poles and towers with exceptions of course. Cost to convert over to a completely digital infrastructure is extremely cost effectively accomplished, with less effort, with Infinite Solutions Inspiring Endless Possibilities to advance traffic flow to an art as computer industry has accomplished. During Phase II of deployment, allowances are incorporated to exchange existing traffic signage, and take down signs, leaving polls replacing with a plurality of BeaconHubs, Repeater Towers or of additional vector-hub class or node-class ecomm-devices, towers, example: femtocells, picocells, microcells, or remove signs or fixtures completely: wherein polls, suspended, vertical or otherwise, altogether replacing each with vector-hub class or node-class ecomm-devices in ground or in Phase IV provides the virtual representations of all traffic signage, preparing for full implementation examination proceedings occur. During this adjustment from Phase I to Phase II, instead of replacements of existing hardware devices, BeaconNodes can be marked as to Longlatilt, expediting deployment in Obvipro or other certified devices virtual interface: iNavX2 displayed TVA, or of additional certified compliant ecomm-devices not listed in Phase III with Virtual Class Nodes (vCNode) deployment, allowing drivers to acclimate to a new atmosphere in vehicular navigational conditions gradually. These BeaconHubs during Phase I are deployed on speed and other sign poles that send out signals, warning pAvics by either audible or visible, or both audible and visible at the same time, and said notifications on a smart-iDevices display to drivers that have downloaded, installed and registered smart ecomm-device of an up an coming change to alter vehicular speed or angular movements and other traffic signage notifications.

Jobs to manufacture ecomm-devices, to deploy same, to manage infrastructure both local, state and federal jobs with independent contractor jobs at all levels and to maintain, analyze informatics shared with certified Tribal entities, share or stack-holders, wherein vehicle navigational system generates business intelligence both from in-house and field testing creates a new era in telematics, Virtual Telematic Connectivity that is. Most of these jobs are somewhat technical in nature, other positions require degrees in specific fields, again to manage, oversee and improve system without limitations; preforming data extractions looking for anomalies, secure data distribution to shareholders when needed, requested or continuously, adapting systematically the vehicle navigational system informatics generated, further enhancements since architecture is structured with preferred expectations based on predictable algorithmic variations as to the vehicles navigational systems overall propositional configuration.

Objective reality of this structured vehicle navigational system apparatus and converging subsystems is to protect drivers and lessen cost in vehicle management, substantial reduction in combined vehicle exhausted energy, a platform that will universally accommodate paradigm shift in Managed Autonomous Usage-based Insurance and sharing computational data across all levels of interested parties, including driver, transport, hovering or vehicle manufacturers, commercial dispatchers, owners and governmental entities.

It is understood that core components of each ecomm-device equipped with Avics, further known as AutoVector Identified Chip Set (AIChipSet) continuously transmits triangulated Geo-positional locations to at least one iNavCom center or a facility; various embodiments of data point collection apparatus and their associated modus operandi are explained in some detail, it is to be further understood that present disclosures is are not limited in its application to stated details of the constructed embodiments, or of additional arrangements not listed of the components or procedures set forth in following descriptions. Data collection methodology presented for each apparatus is fully capable of other embodiments and of being practiced or of being carried out in various ways beyond said details listed herein, since time and space in over all composition is necessary.

Fundamentally, MAUBI sets a standard in a vehicular navigational traffic infrastructures reliability, scalability with restricted access from ecomm-devices that enhances detection, uses rudimentary communication directives for each manually, semi-autonomous and/or autonomous vehicles or other vehicles once iLinkup to assist in ability towards predictive drive ability creating an Intuitive Transit Telematic System. While accurately pricing faulty drivers non-engagement if need be for semi-autonomous vehicles or autonomous vehicles deficiencies that caused an mishap, insurance carriers hold risk in check, realized from generated Statistical Telematic Analytical Data—STAD. Drive Safe & Secure with SAUBI.

A Managed Cloud Based Sync'd Architectural system is necessary to secure data coded transmissions; system variable data driven from edcomm-devices, generating encrypted data coded strings, providing precise informatics for calculating any infrastructures logistical attitude, the need for such data to be transmitted into one area server will not suffice, even under best of conditions. Unless of course, a municipality encompasses small areas to manage or multiple iNetworked iDomains within a specific infrastructure, determination by municipalities as infrastructures and there associated domains are iLinkSync'd together. However to protect system attitude, there is a need for redundant isolation similar to airline industry; wherein each domain is iLinkSync'd with a larger network of several domains within at least one infrastructure within a metroplex or large cities determined by feasibility organization studies.

Traffic flow rate or rates has a direct relationship with traffic density cloaked with human emotions, vehicles driveability, vehicles capacity or capabilities to self-navigate autonomously, along with climate or topography conditions and evolving x2Factors. Taking emotions out of the navigational equation, with expectational standardization, managing the density factor or factors; network vehicular traffic can be reduced to a elementary controlled framework adjusting speed in proportion too density or in some events vis-à-vis, thus managed flow rates become rudimentary.

Moreover, safety-critical functions that navigate by encrypted communicated advice (ecomm-advice) directives minimizes wasted fuel, and of course with permission as to advice directives that inform each driver as to their spatial relationship with other vehicles; utilizing Density Point Clustering Schema—(DPCS), in turn predictable automation as to expectable driver destination that was either chosen on fly, programmed into network status or archived in vehicles Obvipro's memory mediums for daily routes takes place autonomously. Measuring and recording amount of vehicular traffic proximity density at any given time frame (moment) relative to a specific point (co-ordinate), compared with speed of a comparative clustered-mass area chosen, common variations in predictable conception provide results to manage vehicular flow rates at future spatial points in time space.

Furthermore, non-insured vehicles or non-compliant vehicles place a substantial burden on cost of insurance, our global environment over all for each citizen from within any country. After Phase1 is brought into effective action, notably insurable costs are reduced by safer road conditions within a secure infrastructure. Such concerns fade during first phase of deployment from detection of a Registered Sync'd Authenticated Paired pAvics equipped with downloadable certified application for smart devices, smart-iDevice, Identified Hub-devices (iHD's) or of additional certified ecomm-devices not listed with similar compliant communication capabilities. At first encouraging driver engagement to manually enter vehicle data via secure weblink or enter a user, or drivers data from within downloadable applications secure link for requested informational data linked to drivers VIN #, current tag device number, insurance and inspection status, age, any physical limitations in the use of glasses and of additional items not listed by way of a non shared data base; this self entered data is verified from specific shared databases with local or state authorities, shared with insurance companies updated informatics as it becomes available.

SUMMARY OF THE INVENTION

The present secure vehicle navigational system relates to an apparatus and structured system to monitor and manage physical rates of spatial positional change from vehicular locational movements in relationship to traffic density derived from traffic congestion artifacts, human elements, navigational capacity of vehicles, along with Topography and Climatic Expectations. Herein after relative meaning that coincide within scope of this vehicle navigational system for said use of 'topography' encompasses Longitude, Latitude and Altitude referenced as: Longlatilt. Creating a Channeled Telematic Infrastructure, sharing phase-change spatial situational awareness from vehicular calculated movements.

VectorArc-Objects refers to herein after denotes one or more objects: buildings, road or thoroughfares of any type tolled or not, traffic signage currently used or virtual navigational representations thereof, vehicle or structure seen observed by human eyes while traversing in any manner and associated surrounding land masses.

With RFIDGPS Modules integration merged with operational map-objects co-ordinated with a virtual graphical GPSGIS interface, also called TVA (Telematic Virtual Architecture) utilizes multiple services for navigational informatics from NavStar, GPS.gov, Hughes or from similar providers in conjunction with Channeled Telematic Weather from one or more NOAA, NCEI or additional countries academic weather centers. Providing meteorological forecast conditions with no fluff or advertisements, sent through iVoiceCommands (iVocX) displayed on iNavX2 virtual screen from a toggle interface using Kernel-based Virtual Machine (KVM), Alienware for one or more displayed parts or through additional known means in research consideration or a custom designed program as to a virtual means providing virtualization solutions in part or for all aspects generated controlled configured navigational services using non-modifiable code transmitted from iNavCom (Identified Navigational Command) centers associated with each Autovecth related academic entities, displayed on iNavX2 virtual interface or additional certified compliant devices for navigational concerns, for vehicular traffic maneuvering on ground or hovering.

Said vehicle navigational system provides the ability for each ecomm-device equipped with Avics iChipSet, iChipset$^X$, Obvipro or of additional ecomm-device not listed that are certified compliant ecomm-device to communicate H2V/I (Human2Vehicle or Infrastructure) V2H (Vehicle2Human), V2I (Vehicle 2 Infrastructure), I2V/I (Infrastructure 2 Vehicle or Infrastructure) or V2V/I (Vehicle 2 Vehicle or Infrastructure) and sharing transmitted harvested data with county, state and federal DOT, along with insurance carriers, certified tribal share and stack-holder entities.

The secure vehicle navigational system includes (i) a plurality of mobile transmittable or receiving with a transponder capable telemetry-devices built with redundant capabilities or other certified ecomm-devices without limitation devices equipped with Auto Vector Integrated iChipset, iChipset$^X$ or a AiChipset (RFIDGPS Module), also referred to "AVICS" devices, such geographic positional data and/or vector rendering from one or more vehicles may utilize devices equipped with accelerometers or a quantum compass, installed with pAvics during Phase I deployment for vehicles not equipped with ODBII or vehicles future configured technological port to send or receive diagnostic and telemetry information to or from any type mechanical, electrical or mechanical-electrical, sensor or sensor device that controls the navigational aspects for any type vehicle or its associated programmed or directed actions to listen or respond to a digital directive, preform processes some of which are hardcoded to only respond to vehicles internal sensor or additional internal computer read sensor or sensors, further arranged within a plurality of vehicles, one or more individual user, attached to or built within on bicycles or motorcycles in which each device is equipped with Avics iChipset, iChipset$^X$ or AiChipset with downloadable application installed using existing equipments locational service transmitting vehicles corresponding phase-change spatial Longlatilt coordinates of a pre-defined data formate continuously from within certified compliant smart ecomm-devices installed application, further receives speed recommendations, trip analytics based on computational ecomm-advice directives, certified advertisements or locational movement data associated with vehicles or driver informatics.

For vehicles equipped with ODBII technologies, assimilation of Obvipro incorporates a similar downloadable application installed either before installation or after being registered and synchronized with the secure virtual vehicle navigational system before download starts. Avics (AutoVector Identified Chip Set) AiChipset, iChipset or iChipset$^X$ that receives, transmits and uses transponders to verify not only inbound/outbound data, also integrity of telemetry-device from vehicle traffic data, example: dimensional mapping or map-tracking locational services displayed iNavX2 virtual interface or owners of commerce vehicles to view a map-location for vehicle in real-time or archived-tracking, vehicle disablement that transfer corresponding spatial Longlatilt coordinates before a safety-critical disablement, pre-defined data continuously generated from accelerometers or a quantum compass, transmitting back vehicle speed variations depending on density, lane adjustments based on dynamic analytical lane allocation for trucks—commerce and interstate/intrastate carries of good, services, humans, dignitaries destination variations, or of additional calculated directional directive recommendations based on computational traffic data from; (ii) a plurality of stationary or mobile autonomous ecomm-device placed within safety officer vehicles or connected vehicles hub; wherein Sub-hub eComm-device can view realtime selected infrastructures domains networked areas traffic, along with nodes, from additional certified ecomm-devices strategically arranged along one or more roadways in communication with at least iNavCom center or facility, that may be controlled in case of an emergency notifying the secure virtual vehicle navigational system of an impaired area, re-routing all or selected vehicle traffic to one or more determined path routes, modify one or more Traffic Vector Hubs (tVectorHubs) or vector-hub class or node-class ecomm-devices to iGate control traffic; wherein each tVectorHub at any intersection receives from vector-hub class or node-class ecomm-devices of passing or approaching vehicles transmitting to tVectorHub; wherein perpendicular roads to each tVectorHub receives same information from vector-hub class or node-class ecomm-devices, where tVectorHub verifies with the secure virtual vehicle navigational system being received and the tVectorHub ecomm-device performs comparative calculations of the volume, approach rate of vehicles from each intersecting angle executing at least one signal transmitted to approaching vehicles intersecting angle to adjust speed, to pass through intersection, or of additional navigational directives not listed, or to transmit corrective signals to the traffic light controller; (iii) local cloud based central servers comprising a Cloud Based Sync'd Enterprise Architectural Infrastructure securely communicating with, (iv) one or more network interfaces configured with at least one localized central server in communication through; (v) various sub navigational system databases with EVPC (Encrypted Virtual Private Connection) or with one or more secure communication connected iData-links with each central server for any city, township or municipalities configured to, (vi) receive, transmit or transponder requests responses that are encrypted traffic data visual or audible digital advice directives from a plurality of mobile or strategically positioned stationary transmitting and receiving ecomm-devices over networks infrastructure incorporating vector-hub class or node-class ecomm-devices, tVectorhubs, or of additional certified compliant sub-hub class sensor devices not listed, (vii) update traffic data in a non shared database, data facts relative to each vehicle is encrypted SHID IDT #, prior to sale of vehicle de-registration event take place—loan, title and other data needed to transfer SHID ID # to new owner and archive prior owners data, (viii) compare certain data being received in a shared data base against transmitted archived data, and filtration of certain data, (ix) continuously calculate optimum traffic density from one or more of vehicles traveling along one or more roadways in connection with variable speeds recommendations based on computational traffic congestion artifacts, and (x) transmit encrypted timing adjustments for vehicular traffic network via encapsulated digital encrypted voice or virtual commands to one or more traffic lights or traffic tVectorhubs for any given intersection, and/or other certified ecomm-devices such as Obvipro or pAvics and/or within vehicles traversing along any roadways and/or thoroughfares based on optimal traffic flow dynamic calculations, (xi) transmitting and/or receiving via secure encapsulated speed encrypted communication advice (ecomm-advice) directives additional adjustments and notifications through hubs and virtual node ecomm-devices and/or by visual virtual means directed to a specific vehicle or all vehicles through TVA within any specific or all domains networked infrastructure, (xii) each network interface is configured to only respond to ecomm-devices iLink-sync'd with specific identification number that is sent; receive traffic data, wherein traffic data-artifacts includes vehicle location, Phase-Change Artifacts or other informational data associated vehicles IDT # conveyed from a plurality of VectorHubs or virtual VectorNodes from system, and (xiii) sent to corresponding Obvipro's, pAvics, or of additional certified ecomm-devices relevant to calculated datas specific and/or requested data calculated, and (ivx) continuously repeats extracted data calculations, entire process without interruptions adjusts for density vs. speed variations and other pre-defined computational variables as need arrises for warnings, lane adjustment and all other associated items with vehicular navigational concerns. (xv) Entire system is configured as a Virtual Private Infrastructure (VPI), communicating only with certified iLink-sync'd ecomm-devices, of which these devices are built with Avics iChipset, AiChipset or iChipset$^X$. Wherein one or more iChipset, iChipset$^X$ or AiChipset are stacked upon each other or connected horizontally, vertically or angularly of each other. Each iChipset iChipset, iChipset$^X$ or AiChipset preforms certain functions, independent of each iChipset, iChipset$^X$ or AiChipset functional processing tasks or procedural events; wherein each certified sensor communication device may be constructed of nano technologies; comprised of separate circuitry sectioned into subsections, constructed of at least one iLogic-gates connected to in direct communication with one or more iChipset, iChipset$^X$ or AiChipset; preforming specific tasks or pre-configured to preform more than one task, process or procedural events.

Wherein each divisional subsection within each iChipset, iChipset$^X$ or AiChipset works independent of additional iChipset, iChipset$^X$ or a AiChipset sections, each preforming same hardcoded tasks or separate tasks, example: verifying transmitted or receiving filtered data-analytics, a data-set a string or artifacts, transmitting responding requests or other functional programmed tasks; wherein each iRoutine within the iChipset, iChipset$^X$ or a AiChipset sections may be configured to operate at least one sub-iRoutine within or outside a sub-application within primary iRoutine, each divisional sub-application may be configured as a sub-iRoutine within a configured circuitry as a configured backup; that may act as a separate processing function of one or more in support of functional attributes of a sub-application; wherein sub-iRoutines may or may not open, close or cause at least one iLogic-gate within iChipset, iChipset$^X$ or a AiChipset sections to initialize connections with another iChipset, iChipset$^X$ or a AiChipset section inter-connected performing one or more identified processes (iProcesses) or configured to act with an internal program to activate a transmitted reply to a transponder within the Ultrasonic telemetry-device or to activate one or more internal codes to activate the data coded transmission from the transponder or Ultrasonic Telemetry-device signals, or both transponder and the Ultrasonic Telemetry-device at the same time that may use signatures of various frequencies or communicates with and/or to at least one separately iConnected iChipset, iChipset$^X$ or a AiChipset section preforming at least one configure task and further may included a software program, subsequent iProcesses to operate at least one portion of a iProcess, program iProgram within Obvipro, vector hubs-class device sensor, vector-nodes, Beacon-hubs, Alpha-hubs, SentryHubs, Sentinel-hubs sensor devices, or of additional ecomm-devices not listed; wherein ecomm-devices may be further powered by one or more zPanels one outside of entire devices enclosure.

Further processing calculations are preformed in direct correlation with traffic speed in conjunction with density comparatively analyzed with flow verses density, combined with the recorded and detected human elements—that is to say drivers age and their responsiveness to react, attentiveness to listening to audible or visual commands and additional recorded human factors not listed. Vehicles capacity to navigate either semi-autonomously or autonomously, topography and climatic data, along with historical driver data regarding previous programmed trips to work or random excursions for personal, service, commercial, interstate or intrastate commerce vehicles previous routes and driver behavior indexes.

A preferred embodiment in calculable equations is, slower traffic speed fewer calculations are necessary; or in another way slower the traffic is, in relationship with density of traffic, frequency calculations intervals are longer. Again flow rate is corresponding, since time/distance variations are proportional to calculable ecomm-advice directives being sent to selective vector-hub class or node-class ecomm-devices in isolated sectors within a particular domains infrastructure to a specific or a group of vehicles. Otherwise, computational authoritative eComm-advice directives will not coincide with vehicular flow rate from lag time in computations that are irrelative to current time data being received by Obvipro, vector-hub class or node-class ecomm-devices, pAvics or smart-iDevice that have downloaded the Avics application certified vector-hub class or node-class ecomm-devices consistent with entire system functional purpose in preforming secure independent tasks, without the need to have a software or hardware operating system be updated by humans. Thus randomized computational analysis is inefficient; since the speed of calculations must simulate the speed or the purposed forecasting traffic infrastructure area calculated, and is a core component of intuitive traffic systems.

Furthermore, herein after the nomenclature iChipset, the name itself means at least one or more iChipset, iChipset$^X$ or AiChipset iLink-sync'd together as one device and each iChipset, iChipset$^X$ or the AiChipset is configure to preform at least one event, task, program or the execution of same, to activate, to change position of sensor device, open, close, to transmit, receive, to activate a transponder that may be combined with at least one Ultrasonic telemetry-device or to acknowledge and respond independently to the transponder or the Ultrasonic telemetry-device confirming geolocation or Phase-change spatial position, to preform calculable equations and all other matter discussed herein and there associated functions.

However, randomized selectively chosen vehicles within a clustered-mass are used to support calculable forecasting Spatial Analytical Phase-Change calculations proportional with other vehicles within same clustered-mass traversed area direction, in relation to expected comparative computational variations expressing relationship between part or a mass area of vehicles from predicated artifacts of one or more vehicles geographic location compared against, or with one or more vehicles having been selected, selecting at least one additional group of vehicles, or a single vehicle within a mass or not the processing continues until that the selected group or vehicles transponder or confirms a departure of one or more unregistered or registered vehicles programmed designated entry/exit point has arrived, forthcoming or vector drift was detectable from within mass or a single vehicle being compared to or with, a core element of Intuitive ITS.

Further randomized, meaning only taking a few selected vehicles or data facts for computations regarding information the system generates, including a minute change or in another way a phase shift in support of any aspect from none-linear computations, a vector determination can be seen/calculated. Looking another way at Dimensional Linear Algorithms, especially since we already know how they look; example: 2D, 3D and so forth—it is dimensional correct. Therefore overlapping equations to adjust computed small changes ever how perceptible solution is, there is a changeable effect that only overlapping these resulted equations into a shape either imagery of equation or reverting sideways to a linear view in next equation before next view/equation overlapping occurrences become noteworthy as with Vector Lane Drifts or human alterations in trip variations. Mathematically reflected dimensionally for next transmission change in vector-hubs data coded facilitates consciousness of overlay. In other words overlapping is simply a repeat. Overlay is different and can be equated to a linear line not dimensional; reason dimensional lines warp. These changed results move into a directional phase-change at some point in time, always. Walt Disney with his animations for his first cartoon sets—remember it was over each time new image in different Spatial Angles was viewed, so goes for vehicular traffic its linear 1 dimension—flat for mapping purposes. Subsequent images reflects continuous movement within line in directional velocity, what ever ending or configured direction as in X vs. Y co-ordinates, angle Z's determination of next dimensional attributes, as in topography and climatic (TC) or x2Factors have dependent variables. Wherein, Z encompasses multiple dependent factors within each variable, since any calculated X,Y spatial corrections or forecasted phase-change shift for any vehicle spatial relation to whatever is seen and/or detected within equation. For instance as in vLaneDrift for at least one vehicle are further dependent on x2factors, trajectories angular movement in spatial time-speed; wherein such corrective equations are already in database calculated from prior associated phase-change artifacts; wherein change variable modification to equation occurs within nano seconds or less; wherein disturbances and their associated interpretation in one or more calculable equation as it is pushed to surrounding vehicles, further make partial or minor adjustments to anomalies detected database management system tabled equations, follow a sequence of events to one or more vehicles equation isolates effected area event order, example: foremost velocity change accelerate/decelerate one more conveyances or mass of vehicles; wherein allowing system precise time recalculating phase-variables of the data coded transmission. Each added variable (age, vehicle type, human attentiveness and so on) that is to say, a new vector axis summary point is created and added and/or mixed or merged into equations dbase. Its like a conversation there are opposing forces that push on wave thought/imagery in angled directions. This particular embodied procedural event is part of core components of the secure virtual vehicle navigational system's parameters subroutines, establishing predictable calculated parameters, forecasting drive-ability and safety-critical features.

Further each municipalities infrastructure has different types of domains within entire infrastructure, including but limited to vehicle-domains pre-configured internally equipped to be, that may be randomly select or programmed from authentication for any type vehicle device including those certified compliant devices downloaded pAvics or Obvipro; wherein further at least one may be configured to preform dual functionalities within domains networked infrastructure preforming multiple functions; for each and/or other certified compliant devices comprising of one or more Sentryhubs, Sentrybeacons or iVS that may be combined into one device, along with all other sub hub-class devices listed herein. Some vehicles are domains that may act or represent a vector-hub or other comm-devices, which are inter-connected with other vehicle-domains; wherein some may be SentryHubs and or other types of ecomm-devices not listed, used for protection or within areas of inefficient communications. These domains are determined or managed based on historical traffic density within each domains area. Further some domains are residential domains when entered, system denotes speed in any area and SentinelHubs, or of additional ecomm-devices not list determines or detects traffic violations, during Phase 1 deployment; wherein Phase 3 speed violations are monitored for both autonomous or semi-autonomous vehicles, along with notifications of any violations or deviations as when driver/owner takes control of vehicle. Other domains are shopping center domains, and so forth to be determined by appropriate governing body, other areas may require additional cameras or ecomm-devices within specific domain infrastructures for additional security measures. Infrastructures outside any municipalities jurisdiction, these domains infrastructures are managed by counties, since they too are currently managed by or governed by same sheriffs office, county commissioners in partnerships with state entities. Once TVA is enterprise ready, expectational expenses related to maintaining traffic signage throughout each counties infrastructure reduces exponentially thereafter, possibly shifting to other expenditures that is more boots or law enforcement vehicles on ground so to speak or diverting funds to new roads or maintenance thereof.

Accommodating aspects of the presented secure vehicle navigational system herein provides Intuitive ITS, engages Channeled Vehicular Telematics conveying inter-connective statistical data; wherein system generates accident reconstruction as soon after event occurred from a plurality of encrypted communication telemetry-devices networked together providing informational services forecasting safety-critical features and more, in return gathering and disseminating connected Channelled Intelligence between vehicles from within and surrounding infrastructures and sharing with certified tribal and driver/owners.

Each infrastructure may be divisionally separated, where a domain may be a freeway domain, example: I35, I95 and so on; in direct secure communication with at least one sub-domain within one or more networked domains from one end to other, that are inter-connected to at least on infrastructure creating a matrix of subordinate domains overseen controlled by one or more infrastructures each inter-connected, allowing further unified manageability for entire municipality or a metroplex of municipal domains. That being said, data itself is simple data: 1's and 0's, no matter if it's a data set or string of encrypted characters of various types a languages, text, voice, or images of any types comprising of a vehicles maintenance needs, ecomm-advice directives and verification including: vehicles iLink-sync'd networked registration status within a particular infrastructure, vehicles identity registration within a state, territory, country, etc., it is simply data to be transmitted as a electrical or mechanical/electrical impulse of the data coded transmission.

Another aspect of the presented secure virtual vehicle navigational system is to provide a method for a electronic apparatus program embodied on a electronic ecomm-device processing received and/or sent data for managing monitored traffic density rate flow in a non shared database. More generally this apparatus and system includes (i) a first non-transitory computer-readable medium further comprising a computer device configured for receiving, transmitting and/or responding to transponder calls, to record time stamp marking of said received, transmitted or extracted data formulated by continuous variable frequencies of encrypted vehicular data from a array of stationary or mobile ecomm-devices or vector node ecomm-devices displaying virtually the movement of said data, strategically arranged in a managed protocol along one or more roadways and in communication with a plurality of mobile ecomm-devices not listed, some of which are Obvipro's, pAvics, or of additional certified ecomm-devices not listed, some of which are Obvipro's, pAvics and/or other certified ecomm-devices, arranged from within or attached to a plurality of vehicles over a networks infrastructure, attached to or carried by humans or non motorized such as bicycles or iMechanixms or motorcycles, (ii) a second non-transitory computer-readable medium further comprising a computer device configured for updating encrypted traffic flow density rate data, archive vehicles proprietary data being received or extracted from OBD, and telemetry data from or between vehicles ecomm-device being received comparing against prior data received continuously in a non shared database, (iii) a third non-transitory computer-readable medium further comprising a computer device configured to receive continuous variable frequency data feeds from mobile or stationary ecomm-devices calculating by one or more algorithms optimal traffic density congestion rate flow from one or more vehicles traveling along one or more roadways based on calculable updated traffic data, and (iv) a fourth computer programmed code comprising of at least one non-transitory computer-readable medium performing the generation of computational data for transmitting timing adjustments over network to one or more traffic light intersections and vehicles equipped with certified ecomm-devices based on optimal traffic flow calculations generated by the comparison with semi-autonomous or autonomous vehicles navigational attributes, or of additional factors not listed, and (v) a fifth non-transitory computer-readable medium further comprises a computer device executing one more programs configured to perform at least one or more a method that filters certified third party applications such as advertisements and like for security risks, (vi) a sixth computer-apparatus structured code comprising computational memory functions using Phase-Change Artifacts of the exact spatial location for each vehicle, by projecting multiple mathematical equations creating optimized overlay models, resulting in faster overlay models precise by design created from the acquired vehicle informational knowledge a cognitive representation indicating a Phase-Change spatial position of a vehicle in a future space timed GeoiLoc generated by the secure virtual vehicle navigational system, creating a Super-Accurate Navigational System, and (vii) a seventh computer apparatus encrypted repository system comprising a shared database with state, country or federal department of transportation authorities, and (viii) a eighth non-transitory computer-readable medium and further comprises a computer software program configured to preform a process method comprising BeaconHubs, SentryBeaconHubs, iVS and SentryHubs that may or may not be combined in part with other Vector Hubs or stand along ecomm-devices and like scanning area network for intrusions, hacks or other maliciousness that disrupts the secure virtual vehicle navigational systems attitude, and (ix) a ninth non-transitory computer-readable medium further comprises a computer program configured to preform a process method comprising an operational system creating a Digital TVA GPSGIS Overlay Model calculated from data coded transmissions decoding creating a Quantum Positioning Overlay Model using accelerometers found in smart-iDevice or a quantum compass, in a networked Wi-Fi infrastructure for secure communications. Using a standardized code, in that displayed code for pAvics, iNavX2 and other certified devices is generated with current XHTML, HTML5, XML, XSLT or current none modifiable display code that utilizes cross-platform-compatible codes requiring no plugins. Simultaneously producing traffic VectorNodes on a virtual display screen that provides dimensional images for warning signs, traffic lights, digitally encrypted speed variations either by audible and/or virtual means for curves in road ahead and all other signage being used currently, that is effectively inputted showing exact spatial locational position, and for other surrounding vehicles in a translucent back ground with drivers vehicle enhanced visually, with system overtures as to implicit details for on demand localized maps of area roads being traversed; virtually displaying buildings and like with 2D, 3D or 4 dimensional toggled aspects for all surroundings and, (x) a tenth non-transitory computer-readable medium further comprises a computer device configured to preform a process comprising a plurality of transmitting and receiving comm-hubs and/or nodes, know as SentryBeacons or SentryHubs detecting foreign matter to intercept hacks or data attacks engaging Triangulation Sentry Fortification—also known as TSF, utilizing current techniques for Reflective Backscatter Technologies and, (xi) a eleventh non-transitory computer-readable medium further comprises a computer device configured to preform a process that incorporates longitudinal an latitude vector nodes as to each traffic light, and all other current and future deployed traffic signage as to there specific geographical location that overlays basic framework for GPSGIS Telematic Virtual Architectural interface known as TVArc (further known as TVA) in a 2D, 3D or 4D each with Overlay Model generated from Quantum Positioning, formulated by accelerometers and/or a quantum compass in smart ecomm-devices and/or by current real-time virtual modeling means.

BRIEF DESCRIPTION OF THE DRAWINGS

FIGS. 6A-6E is a paradigm configuration of iCrypticus information transfer system iMatrix Network credit card processing platform.

DETAILED DESCRIPTION THE PREFERRED EMBODIMENTS

Figure 1:
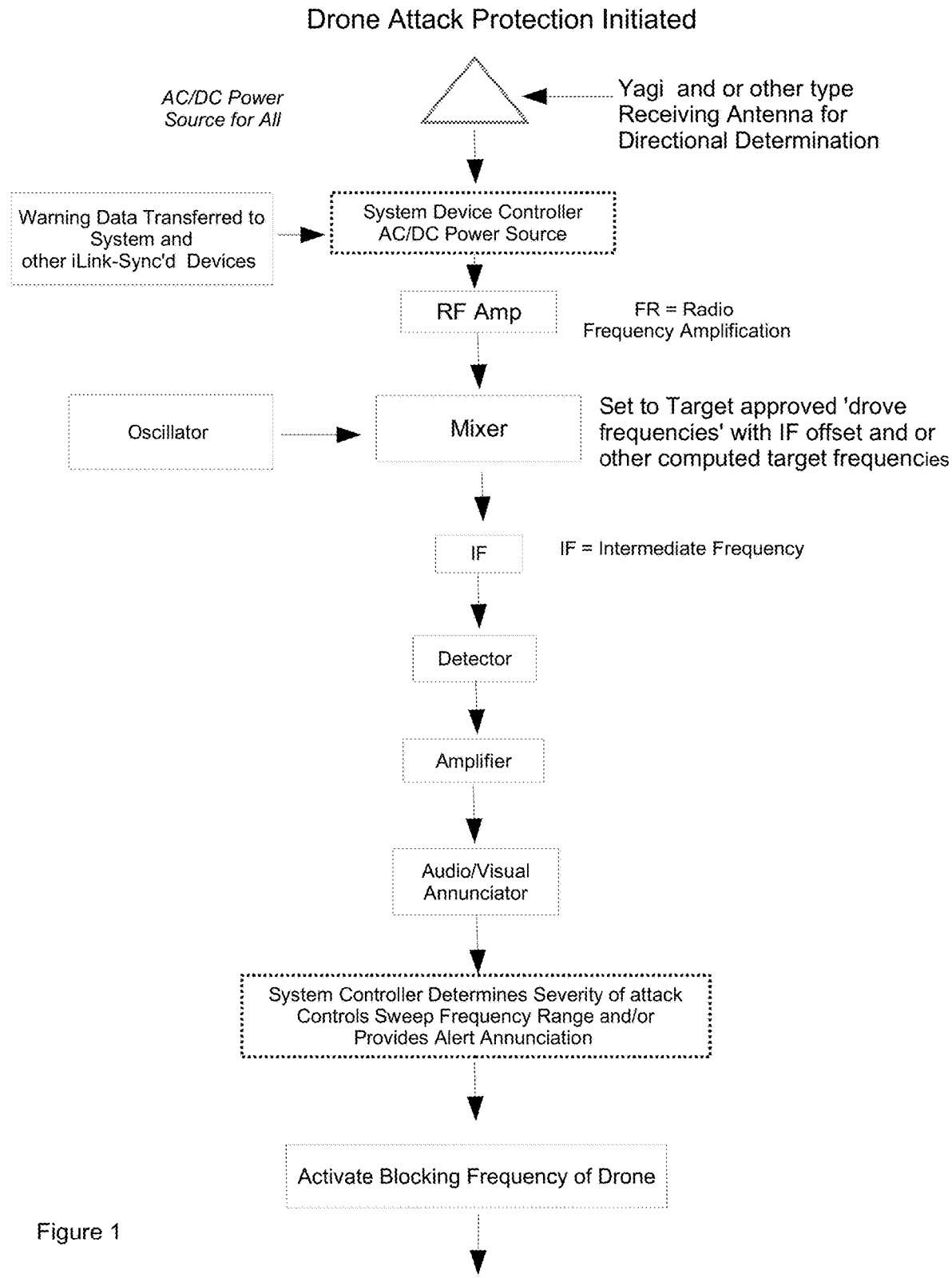
FIG. 1 depicts electrical circuitry example device drone attack protection sequence process.

Referring now to each drawing submitted on prior applications and those newly attached, wherein like reference numerals designate identical or corresponding parts throughout views, preferred embodiments of the virtual vehicle navigational system are described.

The secure vehicle virtual navigational system relates to an apparatus and system that manages monitored vehicular traffic flow rate in a domain networked infrastructure in an area served by one or more stationary ecomm-devices conveying Phase-Change positional movements and other data from one or more vehicles equipped with Avics iChipset, iChipset$^X$ or AiChipset providing real-time data for vehicular forecasting.

[H]ere-in after relative meaning that coincides within scope of the secure virtual vehicle navigational system for the use of word 'topography' encompasses following features; Longitude, Latitude, Altitude referenced as and referred to dimensional considerations for calculable equations: Longlatilt throughout, disclosed inventions related 'virtual representational interactions' formulated displayed by VTA's relationship with 'topographical conveyances' that relate to accuracy within any virtual arrangement, providing physical features such as roads and associated contours, building(s) and dimensional representations of any and all such seen with human eye; such as surfaces area and surrounding physical components therein displayed on a Virtual Conceptual Interface (VCI) for purpose of navigational assistance on land or hovering through Channeled Communication Device—iNavX2. Transmissions distributional conveyance is again—dimensional in its appearance, along fluid lines that bring virtual reality, unfolds relative visualization as we see in reality—sense we live in now. Distribution is fully accomplished by Identified Navigational Command Centers (iNavCom) associated to each Autovecth's networked domain offices within one or more infrastructures. These interconnected vehicle-domains communicate through edcomm-device iLink-sync'd with ecomm-devices within each domain network, in communicate with each and neighboring infrastructures; where control system resides again iLink-sync'd with and near other academic locations improves over-all subroutines and shares with all countries. Where global open source begins evolution for betterment of mankind, before we run out of time. Larger municipalities have one or more navigational office location iNavCom centers, surrounded by interconnected domains virtually overseen, as with virtual computer domains.

Topology for TVA interface provides secure Point-to-Point eComm-advice for each vehicle requesting navigational advice. iNavX2's architecture is platform-independent from vTelArc's virtual interface, toggling back an forth by iTouch$^X$ voice commands or touching screen, providing overlay-ed traffic route variables based on expected computational congestion artifacts in future time-frame positional points with directive recommendations, displaying visual-based conclusions or chosen forecasted route displaying destination time-frame sets for each route event selected compared to or with one or more prior positional points for each vehicle, a selective group of vehicles or at least one clustered-mass of vehicles, where the secure virtual vehicle navigational system continuously adjusts density factors according to a vehicles performance attributes, or a humans reactive responsiveness and braking capabilities or capacity of either semi-autonomous or autonomous vehicles; wherein vTelArc further comprises a configured Telemetry Network Topology. Where endpoints are viewed by hybrid features linked symmetrical and/or asymmetrical, wherein nodes and hub-devices transmit securely, allied interconnected with at least one sub-navigational system hierarchy relationship with each inter-connected vehicle within at least one domain, recording iMechanixms or vehicles ingress and egress, transferring record-artifacts, example: SHID, ID #, or of additional records not listed upstream to a determined, selected or the secure virtual vehicle navigational system generated path location to at least one ecomm-device, or user selected identified route path (iRoute-path) within any matrix-network configured infrastructure; wherein one or more iMechanizm's or vehicles traversing between various telemetry-devices or sensors, each measuring their triangulation between surrounding iLink-sync'd vehicles transmitting their positional phase-points to the secure virtual vehicle navigational system and verifies transmitted virtual scenic surrounding by one or more cameras attached to or built into iMechanixms or vehicles, incorporating ring, tree, bus, star or hybrid combinational topologies of each; wherein each telemetry-device within an iMechanizm or a vehicle communicates continuously between surrounding iLink-sync'd vehicles or iMechanixms, already has SHID informatics in advance, since Identified Mapped Tracking (iMapTrac) GeoiLoc's were transmitted from a subsequent telemetry-device, vector-hub class or node-class ecomm-device or a Ultrasonic telemetry-device previously encountered.

According to one embodiment, geographic positional data from one or more vehicles may comprise without limitation certified vector-hub class or node-class ecomm-devices built with Auto Vector Integrated iChipSet, iChipset$^X$ or AiChipset RFIDGPS Modules built with a transponder/receiver/transmitter built into Ultrasonic telemetry-device combined, also referred to "AVICS". Herein after iChipset, iChipset$^X$ or a AiChipset refers to 'Identified Chipset', meaning each chipset within ecomm-device has a unique SHID assigned and hardcoded within NOS that is non-changeable or modifiable. Wherein each SHID's Longlatilt may be encrypted for security reasons to further protect datas integrity. According to other embodiments, geographic positional data received from commercially available consumer ecomm-devices equipped with accelerometers, a quantum compass, satellites or from archived data from other sources associate with GPSGIS data modeling or from third parties applications are overlapped or over-lay'd comparing a final overlay of a future phase-change spatial positional point in time space; and overlaid into a virtual interface using non-modifiable codes, displayed by means of without limitations on mobile phones, smart ecomm-devices, smart-iDevices, PDAs certified ecomm-devices equipped with Avics internally or downloaded and installed pAvics software not listed.

Wherein said current geographic positional data may include information received without limitation from a vehicle triangulating with one or more satellites, or two or more vehicles, towers, satellites, or from repeater towers, or of two or more towers comprised of picocells, microcells or femtocells towers or from different sources no listed depending on availability of services, required, needed in certain areas or costs. Geographic positional data may be formed of a geographical position, longitude and latitude, also known as Longlat, or may be other current except able forms which can be converted into a geo-positional point. Information collected on the progress of individual vehicles can be used to dynamically calculate the combined average speeds, transit times and proportional Phase-Change Spatial Locational Density Factors of one or more or vehicles movement in relationship with at least one vehicle within a mass or not. Informatics collected, includes calculable recommended traffic congestion options for alternate routes, emergency or dignitary vehicle travel variables and Dedicated Lane Isolation for commercial trucking, hovering apparatus, school busses including autonomous or semi-autonomous vehicles, maintaining a secure protected trajectory.

Data being received from each vehicle's Integrated Computer Processor (iCP) includes but is not limited to energy propulsion consumption data, maintenance information, mechanical information from onboard vehicle processors, $CO_2$, $O_2$, consumption variable output, to report emergency information Mi911 calls, external web-interface for deactivation of vehicle along with trace routes for stolen vehicles and disablement of same; verification of inspection status, insurance and licensing validation of each vehicle.

As used herein, term "OBVIPRO" refers to an onboard vehicle processor, and it is also understood that Obvipro may be a downloadable software application preforming similar features or functionality as with a hardware software installation, further known as pAvics.

According to energy savings implementation, vehicle energy data is transmitted from Obvipro, for Consumption Variable Analysis for historical tracking purposes of fuel. ITTS will thoroughly reduce the worlds Fossil Fuel Supply Consumption Rate, and record-track any other type of energy based propulsion matter and on many other fronts availed by extracted data transmitted from each vehicles Obvipro or pAvics (portable Avics), or of additional certified ecomm-devices not listed. Recording all network traffics consumption analysis from $CO_2$ and $O_2$ exhaust gases along with additional informatics being received that provides real-time reduction in Energy Summation Data from combined vehicle exhausted energy by adjusting optimum traffic flow in conjunction with density variables, including but not limited to street lighting circuits, or any other open or closed electrical or mechanical devices the secure virtual vehicle navigational system embarks on a new era in Intuitive Vehicle Management.

Receiving stations include one or more transmitters or receivers, a transponder, a Ultrasonic telemetry-device or a transceiver in each, known as VectorHub Class ecomm-devices, strategically placed along various roadways, park, and walk-way locations, and like. As used herein, roadway locations include, without limitation, municipal traffic lights and the traffic controller at any intersection, intersections using stop signs, lighting circuits, camera feeds from fixed or stationary local highways, parks, walking trails, secondary roads, freeways and interstate roads, rest stops, bridges, landmarks, municipal buildings, selected freeway mile markers and other common areas, sub-divisions and tribal entities.

According to present he secure virtual vehicle navigational, existing wired or wireless networks, wide area networks, ad-hoc networks, and of additional communication systems networks not listed may be modified for continuous data feeds from one or more ecomm-devices, between ecomm-devices transmitting data being received by one or more servers woven into a Dynamic Computational Algorithmic Architecture (DCAA). According to one possible embodiment, communications received from one or more communication ecomm-devices, sometimes referred to as "tVectorHubs" or "hubs", strategically placed at traffic intersections, roadway locations, or of at additional locations not listed. Any network may optionally be enhanced to handle network data necessary to manage traffic flow in real time, make suggestive analytical calculations to advance hands free driving. Such data includes data received from, to one or more stationary or mobile transmitting and receiving telemetry-devices, received or transmissions of the data coded messages from other types of ecomm-devices within vehicles and/or associated transponder that may be combined with a Ultrasonic telemetry-device that includes a UltraSonic-telemetry Receiving Sensor Device (RSD) continuously responding back to Ultrasonic telemetry-device responder or signals providing generated Geo-positional change, GeoiLoc and vehicles Obvipro performs calculations of phase-change spatial-distance between surrounding vehicles randomly or continuously transmitting back to surrounding vehicles or the secure virtual vehicle navigational, or both. Vehicular Traffic flow management includes automatically presenting alternate routes, granular decelerate/accelerated speed recommendations, accident updates, planned road maintenance along with growth projections, alternative routes due to congested routes or intersections, roadway light failures, or additional traffic manageability items not listed.

Traffic flow management adjustments may be directed towards specific traffic lights or tVectorHub or hub-devices at one or more traffic intersections to adjust general traffic flow maintaining variable momentum formulated based on traffic density from one intersection to another. Traffic flow management may also be directed towards specific vehicles to suggest alternate routes, and granular decelerate/accelerated speeds recommendations based on density within any given area, calculations are derived from human elements, vehicles capacity to navigate, especially whether vehicle is older or maneuvering autonomously or semi-autonomous. Each digital transmitted eComm-advice directives are formulated from computed variables associated with each particular vehicles cataloged informatics, turn signal notifications—driver or initiated by the secure virtual vehicle navigational system depending on what deployment phase. Onboard 'Object Functionality Points' (sensors on sides, rear, front of vehicle includes the RFIDGPS Module); Proximity Integration Detection of the 'Object Functionality Points' provides records of which sensors RFIDGPS Module was first to detected, allows Reactive Response Interval Feeds into onboard vehicle systems, advising each drivers vehicle spatial relationship with surrounding vehicular traffic in event of vehicle migration—Vector-LaneDrift, either audibly or on a virtual interface warnings one or more drivers of an event or a mishap.

Measuring recorded vehicular traffic proximity density at any given time frame (moment) relative to a specific geographic point, example: XY coordinate in present time, compared with calculated controlled speed of one or more comparative clustered vehicle mass or a single vehicle within mass selected; computational evidence adjusts density factor (distance between each vehicle within a mass or in front or side of each other) to one or more vehicles within mass in proportion to on one or more determined routes for each vehicles projected momentum at a future phase-time location. Wherein controlled Spatial discipline forecast stopping, lanes changes, vLaneDrifts excited by other vehicle manageability within mass or other mass clustered areas within proximity of a chosen clustered-mass or one or more vehicles entering or exiting one or more clustered masses or not, as to momentum variations of a selected mass or a vehicle as to it own Spatial Density Momentum. Transmittable calculations precipitates quantified momentum phase-change notifications to one or more vehicle comm-devices; wherein other vehicles equipped with ecomm-devices forward to transmitted device or to a rear mass or a single vehicle, receive one or more adjustments in motioned momentum; wherein transmitted adjustments make supplemental changes as to velocity curve in respect to re-routes, lane change acquisition, exiting a specific mass within each distant mass relative to controlled calculated momentum distant factor determined, in relationship to spatial locational flow rate for at least one or more specific vehicles in one or more surrounding clustered masses or a single vehicle; and in further proportion with relationship to one or more vehicles at a specific clustered position or XY coordinate of mass of planned or not trajectory at a future positioned phase-frame, facilitates sustained momentum.

In accordance with further enhanced implementation, the use of a plurality of hub sensor ecomm-devices intensifies over all awareness of vehicular traffic flow comprising a plurality of vehicles propelled by any type matter, example: gasoline, electrical, hydrogen-fuel cell or just hydrogen, solar, air, human exertion, fusion or a combination of one or more of these items or any other type of propulsion matter known now or in future protecting density and safety by using specific devices some of which are as follows: VectorHub or tVectorHub Class ecomm-devices, that may be a combination of or independent with at least one BeaconHub, SentryBeaconHub, SentryHub, SentinelHub or SentinelHubs, Sentry Nodes, AlphaHubs, AlphaVectorHubs; b, c, d and xVectorHubs; wherein each sub-hub has an explicit task or duty of which is specifically allocated for any given sectors sensor device within each vector area within one or more networked domains, that are inter-connected within at least one network infrastructure and is further connected to one or more neighboring or surrounding infrastructures.

According to one enhanced implementation, one or more AlphaVectorHubs transmit encrypted data, filter and gated through one or more AlphaHubs, providing certified broadcasts that may or may not be encrypted supplying products or services needed or wanted displaying local merchants by a Select on Demand Advertisement Service (SODAS); wherein localized merchants within any area domain networked infrastructures advertise their products or services for: gas, food, lodging, hotels/motels, shopping of all kinds, vehicle maintenance, towing service companies and any other type merchant purveyor selling goods and/or their services; wherein requesters search specific vendors or purveyors, each on demand choices are iGate directed through one or more specific AlphaHubs for security and data integrity through at least one subnaysys iLink-sync'd determination by the secure virtual vehicle navigational system a configured iPath, that may change at any given time or one or more parts of data-facts, sets or data string or strings may be separated into packets through one or more Identified Paths (iPaths). Where each area VectorHub or other certified compliant ecomm-devices are configured or equipped as Transmitting Sub-Class Devices and may include one or more iLink-sync'd identified vehicle ecomm-device that continues to disseminate data-facts, sets or data string or strings; where designated advertisement may transmit parts thereof, for any type diagnostic, requested or broadcasted advertisement, such as without limitations determining one or more specific vehicles energy summation data, based on Consumption Variable Analysis. Results in the secure virtual vehicle navigational system transmits notifications to one or more vehicles in need of fuel, providing logistical computational data, displays one or more clearly defined or identified options for a driver request or the secure virtual vehicle navigational system initiated based on fuel remaining analysis as to next available fuel supply iPoints or better known as iPNode (identified propulsion node) and of additional necessitates not listed, requested items referred to as identified Nodes (iNodes); wherein the secure virtual vehicle navigational system transmits a displays of alternatives regarding fuel grade, manufacturer types and additional related associated items, based on trip analytics or driver dependent. Additional Alpha-hubs for advertisements are added within this realm for food-nodes (iFNode) displayed on Virtual Conceptual Interface VCI; wherein providing alternatives for lodging or rest stops if a calculable variable is computed for rest time or driver selected based on fatigue attributes; completely maintaining autonomy as to each Transmitting Sub-Class Device in a particular industry managed through one or more sub navigational systems, thereby protecting and enhancing secure digital traffic broadcasted alerts, warnings, advisements or directives.

According to one enhanced embodiment, each city or municipality may have their own AlphaVectorHub sub-class ecomm-devices, e.g one or more AlphaHubs that have gated filtered advertisements; wherein locational services provide determined routes for fuel, food, lodging, local news interests, Channeled Telematic Weather and other necessities from local merchants with ability to poll customers or users for an opinion on services, techniques, concerns presented and advertising of such are a PSE for listing advertisements for whatever including to chose where certified vehicular mechanical shops are located or entertainment for any purpose displayed by a user request, or by the secure virtual vehicle navigational system providing selectable choices; generating revenue from business listing services and vehicle requesters of a particular cities ODNA directory accessible from Obvipro's virtual iTouch$^X$ screen switching from iNavX2 screen or the screen has the ability to split screen into at least two visual quadrants on the display screen; creating income thereby offsetting expenses in maintaining the local secure virtual vehicle navigational system infrastructure. Operational management is overseen by local authorities with defined expectations as to systems uniform functionality; wherein the advertising of local merchants based on revenues from search engines, revenues may be near to a quarter of a trillion dollars or more annually of all cities within north America, where each city donates or contributes at least five (5) percent of generated revenues from advertisements to St. Jude, or of additional institutions that help children, to find cures for cancer, or of additional research institutions or hospitals not listed for the advancement of research results, its a human thing to do; wherein the secure virtual vehicle navigational system provides a secure platform for iNewsXchange or iStreamXchange being performed initiated by a request of a users ecomm-device; wherein iNewsXchange channels, example: channel 0001 provides streaming of: iDentified Christian Network (iCN), comprised of CBN, Joel Osteen, or of additional christian information providers not listed; channel 0002 provides FoxNews, channel 0003 provides PBS, channel 0004 provides NPR, channel 0005 provides APNews, channel 0006 provides DW, channel 0007 provides BBC, or of additional informational providers not listed; wherein iNewsXchange is transmitted via Wi-Fi, or of additional means that does not allow cross platform contamination of signals; wherein iStreamXchange movies are requested by users, where iStreamXmovies are transmitted when vehicles are at rest; wherein at rest definition comprises the vehicle is at home, hotel, work, or of additional locations vehicles ecomm-devices, Obvipro's ecomm-devices, smart-iDevices. AiDevices or of additional ecomm-devices not listed, or of a iDockingXstation, that may also be a electric or hydrogen fueling station while vehicle is being fueled that includes a secure Wi-Fi node ecomm-device, or of additional data transfer means not listed that detects a request transfer of an Identified Xchange Provider (iDXP), example: Disney+ Vault, Netflix, or of additional streaming enterprises; wherein each iStreamXmovie being downloaded by vehicles ecomm-device or additional ecomm-devices not listed are downloaded into a special folder created in ecomm-devices memory medium; wherein based on the iStreamXchange partners terms and conditions, the downloaded iStreamXmovies may only be watched once, or of additional times as partners terms and conditions allow; or user can request from iStreamXchange partner to pay for additional views of iStreamXmovie, or iStreamXmovie is set to auto delete determined by iStreamXchange partner, ecomm-device that stored iStreamXmovie or user can request or initiate deletion; wherein iNewsXchange or iStreamXchange may be a PSE, generating additional revenue for each city increasing employee count.

According to one possible implementation, IEEE 802.11 protocol may be utilized for communication with palmtop computers, laptop computers, personal digital assistants (PDAs) and Internet mobile phones, certified ecomm-devices, or of additional devices that may be proprietary and not listed. 802.11 standard specifies two modes of operation: (i) an infrastructure mode where an access point provides a iLink-sync'd connection between wireless stations or a wireline legacy infrastructure, and (ii) an ad-hoc mode where there is no access point. By using tVectorHubs to collect real time data that is feed into a central processing complex of cloud based sync-d servers, each tVectorHub contributes towards Telemetry Networking Communications from distributed management by command virtual control of the secure virtual vehicle navigational system for entire networked domains infrastructure, and (iii) wherein the use of Plug-n-Play activations expedite preregistration synchronization for ecomm-devices in any given domain networked infrastructure area when a vehicle is traversing, moving into an adjacent or surrounding interconnected domain networked infrastructure. With additional data being sent on to next infrastructure in vehicles route destination via one or more communication data links over current secure cellular radio systems, cable TV lines, electrical lines, cooper, fiber or one or more satellites, or of additional communication techniques or technologies not listed. Wherein, authentication may further use texting, voice messages authentication or automatically transmit vehicles credentials; wherein the data coded message transmission received or is sent with one or more partial key-sets, a alpha/numerical sequence, binary code, one or more forms of biometrics or simply by ones hand or voice entered, by driver/owner or commercial representative waiting on confirmed response key, initiating a paring sequence activation programmed process within ecomm-device as the newly entered vehicle enters adjacent or surrounding networked domain infrastructure a authentication activation for continued navigational directives.

According to an advanced implementation, comprising operating system of the secure virtual vehicle navigational may be built on a Unix platform that may be further supported by one or more Quantum Computers. According to this non-limiting implementation, verifications of tVectorHubs occur routinely in sequential non-random patterns from transponder frequency with echolocation change that may be confirmed by at least one Ultrasonic telemetry-device configured within an part of Avics built into each Obvipro, which stream through any type lines of communication from surrounding paired and iLink-sync'd Vector hub-Class Devices. Secure notifications are sent out to each tVectorHub class device for authentication purposes, to verify integrity of each ecomm-devices uses a secure connection configuration in a VPI. A network infrastructure may utilize Crypsis Tokenization, otherwise known as layered encrypted tokenization. Each tVectorHub is routinely verified by a encrypted data push for the ecomm-devices original collective data composition that was either injected or downloaded. On deployment one or more tokens and response token sets are placed within each tVectorHub's or ecomm-devices core operating system—NOS. If tVectorHub is deprived of power, is hit with a power surge, or has otherwise been compromised, then tVectorHub's primary $OSV^X$ data may be rolled back or a secondary redundant internal iChipset, iChipset$^x$ or an AiChipset board may be activated, that may or may not be layered with another board or a processing code may be energized or if necessary advising the secure virtual vehicle navigational, Avics iChipset, iChipset$^x$ or AiChipset board can be replaced quickly. Herein after the term data, denotes collective data from one or more ecomm-devices and their associated embedded data-class string.

If any Avics iChipsets iChipset$^x$ or AiChipsets deployed become inactive for what ever reason, certain deployed Avics ecomm-devices within range of specific class devices have internal capabilities to be energized remotely, initiating Long Range Wi-Fi transponder/receivers/transmitters or using GPS satellite triangulated verifications; until erred telemetry-device is repaired and re-activated.

According to one embodiment, test tokens are sent to continuously or randomly to ecomm-devices verifying operational areas for data integrity composition inspections. If any tVectorHubs NOS's $OSV^X$ (operating system version) are not the same as its original encrypted token, tVectorHub or additional certified ecomm-devices $OSV^X$ may be rolled back, flushed or replaced as needed. Off-line for maintenance and operating $OSV^X$ or NOS system updates, hardware failures/software updates may be propagated throughout random ecomm-devices or additional telemetry-devices, secondary redundant boards first then primary at a later date for a specific domain area within infrastructure, with redundant cloud-based server capacity maintain operational uptime. Collective data from tVectorHubs may be sent via one or more token sets for security protocols originally implanted within each NOS verifying device sensor $OSV^X$ functionality.

These data composition inspections have a pre-defined examination protocols for specific ecomm-devices, telemetry-devices built into Vector-hubs or additional ecomm-device mentioned herein; wherein providing a detectable determination of maliciousness from possible attempts on code injections of paired and iLink-sync'd ecomm-devices. [I]f such error exists next dataset values are examined and error control initiates alert status to all devices within determined vector-areas, if datas encapsulated encrypted key or embedded Key-Codes is are intact, transmitted data is used for calculations; authenticated component composition of previous digital advice directives are compared for locational anomalies, along with the Identified Trace Route (iTrace-route) marker of 't' or 't2' markers are compared. If a suspicious abnormality is detected, next positional locational dataset coded message transmission is comparatively overlaid for compositional comparative analysis for datas integrity and parsed it valid. Finally data optimization parameters are excited against topography and climatic conditions, human elements, vehicle and drivers ability to navigate with other referenced data, comparative parameters are verified against last dataset coded message transmission, if data clears—meaning current data has to pass several pre-configured tests based on previous datasets once clear, data is parsed for computational events, then repeated for next digital data coded message transmission directives, topography is a reflection of altitude displaying dimension of course.

Accordingly a preferred embodiment forecasting performance communication to one or more cluster of vehicles maneuvering in same direction, specifically only a few vehicles within that clustered-mass Longlatilt's geographical positions are used for computations of a particular cluster, then compared with others within that same mass on subsequent calculations. Meantime, all vehicles within that mass continue to transmit required data facts to at least one AiComm-device deployed specifically to receive such information from vehicles that pass within range, receiving vehicle engine diagnostics, current status on inspections, licensing and insurance data composed of diagnostic analytical data-artifacts; wherein deployment locations for each AiComm-device may be near to parking lots both private or public; wherein the AiComm-devices transmits a message being sent to vehicles ecomm-device or pAvics built with, or attached to FRIDGPS Module requesting a memory file dump of the recorded diagnostic analytical data-artifacts from each vehicle memory medium, continuously transmitting to the secure virtual vehicle navigational. Upon deployment within each NOS's operational system a key configured eComm-advice directive response are implanted within operating systems core code, ecomm-device is always attentive to a triggered match key code from the secure virtual vehicle navigational system, iLink-sync'd servers or additional ecomm-device iLink-sync'd together. Said parameters of each code has at least one or more code snippets that activate a matching response key generated or pulled from at least one repository by the secure virtual vehicle navigational system or embedded within ecomm-devices code when received. Each Obvipro, hub-devices and additional certified ecomm-devices either acknowledges requested codes with Match Set Coded Response (MSCR), transmitting back paired-key requested or activates specific transponder echo-call with associated matched data requests initiated by the secure virtual vehicle navigational system hub-class devices or vehicles ecomm-device providing match set code, waiting for reply.

Continuing on with the above preferred embodiment within certified ecomm-devices each communicates a similar derivatives for matched key codes either to receive, transmit or transponder echo-location or echo-replies to said dataset coded transmission requests, each vehicle transmits energy propulsion consumption within pre-configure attributes established within each NOS for certified mobile or stationary ecomm-device, Obvipro's and pAvics or additional certified ecomm-devices not listed. These snippets of code within the data string of the data coded transmission are encapsulated in a encrypted rapper within NOS, each OSVx has transferred mathematical match key to activate response to send, receive, reply to or activate a transponder echo-call requested key matched-code for certain types of the coded data transmission requests for a particular matched derivative that pertains to a certain data type from the secure virtual vehicle navigational system requests or Obvipro's ecomm-device, or Hub ecomm-devices within domains networked infrastructure exiting from infrastructure the vehicle is registered in moving or entering into a surrounding iLink-sync'd infrastructure. Such data code executables includes engine performance data, vector lane drifts, turn signal activation, turn on head lights autonomously, advise navigational movements, fuel capabilities (speed, time, weight load capabilities, or of additional items not listed) based on current volume used in proportion to volume remaining, geographic alternate data frequencies for navigational displays.

Vehicles advancing into adjacent or surrounding domains within a particular infrastructure or moves out of into another networked infrastructures or a network domain there are specific snippets of embedded code within the data coded transmission used as a identifier to send or receive vehicular data informatics via vector-hub class or node-class ecomm-devices or Repeater Towers, whether for navigational purposes, positional data, proximity data, and all additional forms of data necessary to communicate securely from vehicle to infrastructure, to vehicle, to vector hub-class or ecomm-devices or vis-à-vis. Of course communications are accomplished only after certified ecomm-device is Registered Sync'd and Paired, there are certain parameters required to be meet before vector-hub class or node-class ecomm-devices are authorized before communications starts, then an only then those devices iLink-sync'd together that have been accepted as being entitled by means of authenticated authorization process to transmit, receive, to respond to or transmit transponder echo-signals of various frequencies transmitting one or more data-sets, facts, datum, data or sense datum strings and/or artifacts within a networked domains infrastructure; wherein vector-hub class or node-class ecomm-devices are configured with logged data coded transmission rights, all other devices are ignored or identified as a foreign intruder and dwelt with accordingly.

The preferred communication embodiment between the secure virtual vehicle navigational system (Infrastructure) 2 vehicles (Obvipro) or hub-devices, or additional certified ecomm-devices not listed, data string is small and may or may not be of course encrypted, depending on specific data-class facts sent and/or received. Transmitted string has an encrypted rapper embedded Key-Code hidden. Upon registration, authentication and iLink-sync'd with edcomm-device or ECDLink'd communicating with the secure virtual vehicle navigational system; and the secure virtual vehicle navigational system transmits back a response Paired-key code initializing iLink-sync'd authentication to complete pairing event with any registered device, example: an ecomm-device with additional ecomm-devices for redundancy, Obvipro, Avics or additional certified compliant ecomm-devices not listed, provides a Authenticated Comm-Device Certificate. Such Certificate is encapsulated within, having registered Paired-key and a Matched Key-Set for Communication Authentication. Data extraction initiation starts with a command, that is shorten either as an acronym or first letter from each string of word message or a code constructed of special along with alpha-numeric characters, similar to what Apple's OS is built upon. That is for: Pull 02 data SHID IDT # and transmit via encrypted data push, resulting in a similar string example: po2dS #, that may be encrypted for security reasons, the SHID and related data is like a credit card number or SSN, and must be protected at all times. Then verify closest hub-class destination recipient ecomm-device iLink-sync'd with, by the other half of Paired-key response back to complete cycled handshake. Further data enhancements include vehicle registration identities (type/age of vehicle, listed drivers, and other relative items necessary for navigational concerns for iLink-sync'd vehicles, including maintenance alerts, vehicles insurance validity, driver-demand or owner item requests. Wherein the data coded transmission instructions are simply turned into scalable communication protocols that are uncomplicated in their architectural nature. This encrypted data file message sent, may or may not have same Paired-key hidden within file rapper, response matched Key may have an encrypted iMarker or iMarkers where to find match key before sending off to a particular onboard vehicle processor (Obvipro) or pAvics or one or more additional certified ecomm-device not listed, process is paired and matched a final time, before displaying visual or audible commands on TVA. Within each Paired-Key there is a matched key response key-set (RKS). Enclosed within each NOS, a cypher key can be activated anytime, if needed to reverify datas data coded transmissions with assigned SHID or the Longlatilt that may or may not be an encrypted binary combined marker that is hard-coded in NOS and sent to primary level for execution verification for stationary or mobile ecomm-devices. A simple mathematical task that protects system from channeled encrypted communication devices within each domains that are networked within a secure infrastructure.

Generally summarizing overall systematic procedural processes for each NOS's operating system; each ecomm-device receives data, such collective data is time-stamped as to time received adding devices positional hardware data, such as Longlatilt, devices SHID # of additional marked encrypted data not listed providing ecomm-devices iLink-sync'd attributes; then time-stamping data string within the data coded transmission out to next iLink-sync'd ecomm-device. Each ecomm-device deployed has specific programmed parameters, each NOS's programmed characteristics have only specific tasks to process with each iChipset, iChipset$^X$ or AiChipset configuration, to move data between the secure vehicle navigational system between vector hub-class or node-class devices, onboard vehicle processors (Obvipro) or portable certified devices such as pAvics, smart-iDevices, or AiDevice that does not communicate with any additional devices outside its iLink-sync'd tLoad Stand. Wherein vector-hub class or node-class ecomm-devices deployed are positional, as in asymmetrical, symmetrical, example: or a balanced isometric wave pattern, based on combinational communication devices used. Whereby such spatial placement incorporates maximum distance in communication relay overlap. Preferentially beyond line of sight, since some transmissions may bend from gravitational assistance, depending on transmitters height deployed or additional vector-hub class or node-class ecomm-devices deployed position, allowing positioned vector-hub class or node-class several miles or kilometers apart, possibly 10 or more miles plus/minus dependent on Longlatilt. Certain vector-hub class or node-class ecomm-devices are configured to only communicate in certain directions or with certain vector-hub class or node-class ecomm-devices. Said granular configuration assignment solutions augment protection of vector-hub class or node-class ecomm-devices portfolio deployment, further capabilities not mentioned benefit signals from tVectorHub, vector-hub class or node-class ecomm-devices iLink-sync'd communicating with traffic lights or the traffic controller, Obvipro2Hub, hub2hub, Hub2Infrastucture (H2I) that has an angular hypotenuse, seen from higher distances or if structures are impairing the data coded message transmissions, example: route data around corners via hub-devices or a plurality of towers. Existing, new or modified Repeater Towers may be used to route data coded message transmissions in multiple directional points at same time-frame, adjusting traffic area-wide; reducing deployed of the vector-hub class or node-class ecomm-devices. Other occasions may require Obvipro's and additional certified vector-hub class or node-class ecomm-devices to only communicate with Repeater Towers for security reasons; wherein one or more tVectorHubs are equipped with additional vector-hub class or node-class ecomm-devices, increasing data coded message transmission extension in different directions at the same time-frame.

Vehicular Network Traffic control is similar to computer network traffic at its core. Thus, vehicular network traffic control is accomplished by load balancing one or more vehicles within a domains network by throttling one or more vehicles momentum rate; wherein past or future network traffic congestion artifacts are compared with at a calculated present phase-change spatial positional point generating a forecasted point a space time position the secure virtual vehicle navigational system determines adjustments to one or more vehicles phase momentum, allowing directional or bidirectional traffic load balanced flow rates with one or more vehicles destination route in one or more domain networked infrastructures.

One benefit of RFIDGPS Modules transponder/transceiver Ultrasonic telemetry-beacon or devices iChipset, iChipset$^X$ or the AiChipset are built with the ability to map-track and record time entires/exits, verify SHID IDT #'s or additional identifiers assigned and transmitted intervals from a plurality of mobile or stationary ecomm-devices built within the onboard vehicle processor (Obvipro) establishing Longlatilt isolation integration by transmitting the triangulated GeoiLoc continuously, such as without limitation OBVIPRO, pAvics, cameras with stationary or fixed feeds, street lights and other certified smart or proprietary ecomm-devices simultaneously within any given networks framework, such as without limitation a city, a township, a railway, highway, freeway, river or of additional areas not listed. Intermixing of network packet traffic variables, having a reserved IPv(set), along with sub hub-sets for each municipality increasing security localizing threat attempt detections. Allowing tracking attempts much easier within networks framework further encapsulating transmitted radio frequency identifier (RFID) variations to or from a plurality of ecomm-device or certified smart-iDevices. System relies on several tVector and/or Vector data-node points for redundancy in communication data links using the full radio or communication iSpectrum, example: radio waves from any type transmitting device, at least one satellite, cable TV lines, electrical lines that may be boosted by other communication devices and/or towers, cooper phone lines, cellular, fiber and microwave radio signals each extending data coded message transmissions by one or more repeater and/or existing towers transmitted by or from future data coded message transmission type devices.

Utilizing Stationary Hub Identifier (SHID) that has a dedicated IPv(set) for an additional layer of security, example: IPv8 or 10 and so on, especially since there is need to isolate IP addresses within a specific IPset for the purpose of to navigate various types iMechanizm or vehicles; that may further reflect ESN and/or additional unique cellular identifiers assigned to each Avics iChipset, iChipset$^X$ or the AiChipset within each VectorHub, OBVIPRO, pAvics or of additional certified devices not listed; wherein signal integration interactions allow data coded message transmissions from/to each ecomm-device whether independent. networked or interconnected as in a structured navigational matrix. Such ecomm-devices are tracked as a group or individually in simultaneous communication with Vector Hub-class device, or additional ecomm-devices not listed that are iLink-sync'd with vehicles on-board vehicle processor (OBVIPRO), pAvics and other certified ecomm-devices securely. Forming a wired/wireless ad hoc framework, essentially expedited secure direct communication from or to each ecomm-device having at least one unique RFIDGPS transponder/receiver/transmitter and/or transceiver iChipset, iChipset$^X$ or the AiChipset—integrated identifier circuitry encapsulated within using one or more types of cellular capabilities to enhance variable distance providing redundant data coded message transmission alternatives. Each municipality can deploy that communication process that is most readily available to maintain cost implementation in beginning, scheduling migration over to most current com-links at a later date.

Communication is transmitted from/to each tVector Hub, that receives and/or transmits data from/to each vehicle's Obvipro, pAvics and/or other certified compliant ecomm-devices, compiling simple data that creates complex fuel consumption variables, engine analysis, long-lat spatial positional points in relation to other vehicles and transmitting speed variations for each, from vehicular traffic that passes through, around, above and/or below or in direct signal communication with Repeater Towers. These hubs ecomm-devices, data collection is transmitted with multiple com-links (example: wireless, electric lines, Wi-Fi and/or gigabit wide/local area networks or by other currently known technologies such as electrical and/or phones lines of various types of materials or different mobile communication networks without limitations UMTS, WLAN, and WiMAX or CTP and not limited but in support of advanced communication networks that can be extended to support other secure advanced IP networks, long term evolution (LTE) and other advanced alternatives in transmitting or receiving data of all types, images, voice-data, text (SMS) including repeater towers or additional cellular devices not listed communicating to or from at least one Identified Navigational Command center of facility (iNavCom) or transmitting to at least one surrounding certified compliant ecomm-devices or telemetry-devices. Wherein comm-links further includes currently known or in contemplation of radio data communications by a radio frequency or band of frequencies in the range of 104 to 1011 or 1012 Hz, or additional frequencies suitable for use in telematic information communication exchange, comprised of one or more combinational aspects or segments of a frequency listed within embodiments or additional radio wavelength frequency technologies not listed; herein after referred to as Telespect, short for Telemetry Spectrum.

Wherein by analyzing Dynamic Analytical Rate Flow (DARF) in comparison to dynamic analytical lane allocations on at least one roadway, along with dynamic directional flow constraints calculated inputs from network traffic congestion artifacts are fast an accurate. The process, computational traffic flow dynamics draws principles from the fields of cross-layer optimization, artificial intelligence, machine learning creating a dynamic computational algorithmic architecture from dynamically compiled data transmitted to or received from the vehicles ecomm-device on any local or a wide area network that is registered iLinksync'd and paired with at least one iNavCom centers, hub devices, one or more node-class ecomm-devices and vehicles on-board vehicle processors ecomm-devices equipment with Avics, that comes into range of any mechanical, electrical-mechanical or software receiving/transmitting hub ecomm-device or of additional certified ecomm-device not listed deployed within at least one domain networked within at least one infrastructure.

Network Packet Artifacts (NPA) are determined by sending out transponder echo calls or transmitting Ultrasonic waves from at least one stationary vector-hub class or node-class ecomm-devices or of additional certified compliant devices not listed making sure OBVIPRO or additional certified vector-hub class or node-class ecomm-devices not listed that are Registered Sync'd and Paired ecomm-device equipped with pAvics within any networked domain, has arrived at destination or is off network. If there is no reply from echo locational request calls from tVectorHubs, or from surrounding additional vector-hub class or node-class ecomm-devices not listed in vicinity of a selected or determined by the secure virtual vehicle navigational system at least one Obvipro, pAvics or additional certified mobile or static ecomm-devices last known location, the secure virtual navigational system calculates a comparison to the whereabouts of a GeoiLoc now in relationship to present location after reply response to echo call before vehicle is turned off or vehicles spatial relationship with or to surrounding semi-autonomous or autonomous vehicles; wherein a transponder or Ultrasonic Telemetry-devices signal may transmit to the last iLink-sync'd vector-device, vehicle-domain, or transmit to additional surrounding vehicles upon engine start or turned off.

According to one embodiment comprising a communication commencement protocol for ecomm-devices registration on any network areas infrastructure consists of each tVectorHub and all other VectorHub Class ecomm-devices, vector nodes, virtual nodes or repeaters have at least one built-in RFIDGPS transponder/receiver/transmitter/transceivers that includes Avics iChipset, $iChipset^X$ or the AiChipset, all data sent or received is encrypted or decrypted by the vector-hub class or node-class ecomm-device or the vehicles ecomm-advice. The transponder in each vector-hub class or node-class ecomm-device transmits and receives a unique SHID that corresponds to not only its Longlatitl Phase-Change spatial position as with mobile ecomm-devices, it also transmits unique SHID IDT # assigned to stationary vector-hub class or node-class ecomm-device. Wherein the vector-hub class or node-class ecomm-devices may be assigned sets of unique encrypted response paired key-sets, that were originally hard coded when deployed injected or downloaded in the field. Once the vector-hub class or node-class ecomm-device are deployed, upon being energized within a given networks infrastructure, sends a responder SHID key to the secure virtual vehicle navigational system, a system server responds with encrypted Paired-Key acknowledging the vector-hub class or node-class ecomm-device of being linked and paired within at least one domain.

Wherein the secondary half of encrypted Paired-Key is sent back from at least one linked an paired server with the secure virtual vehicle navigational system to the certified vector-hub class or node-class ecomm-device that initiated access, only after a dual verification process is completed for initial data coded message transmission proceeds. Each key is encrypted and transmits within a Virtual Cryptic Private Infrastructure (VCPI) tunnel, or VPN connection between vector-hub class or node-class ecomm-devices along with additional secure means and mentioned herein, vector-hub class or node-class ecomm-devices are Load-Networked, that only communicates within a given domain area and specifically with certain vector-hub class or node-class ecomm-devices encrypted or not, where the secure virtual vehicle navigational system infrastructure transmissions are linked to each ecomm-device. Wherein additional vector-hub class or node-class ecomm-devices may only use Wi-Fi, electrical lines or by current means that are convenient, inexpensive and secure. A second transmitted response Paired-Key is embedded within first Paired-Key when energized, then acknowledged by sending to each vector-hub class or node-class ecomm-advice, the secure virtual vehicle navigational system server or of additional vector-hub class or node-class devices not listed that are certified ecomm-devices whether virtual or not, ecomm-devices are 'Load-Networked' within at least one domain area interconnected within a specific domains infrastructure, with this second encrypted key that was hard coded and non modifiable. Once each new vector-hub class or node-class ecomm-device is energized within a domains infrastructure, followed by registration authentication Sync'd and pairing sequences, procedural events form a Load-Network, wherein the vector-hub class or node-class ecomm-devices are equipped with Avics iChipsets, $iChipset^X$ or AiChipset or compliant ecomm-devices only communicate with those devices that they were paired with, including servers. Malicious or unknown communications are ignored, attempts are logged and sent to SentryBeaconHubs, then further pushed onto localized cloud servers, then onto central server. Such data is cataloged, followed with research as to ISP or remote rouge attacks from a single stationary device information sent to authorities, requesting user informatics of these known IP attacks, with possible fines and more. Encrypting data increases protection level, if not someone wanting to observe network traffic data or disrupt the secure virtual vehicle navigational system attitude is a fact of life.

Preferred embodiment in support of close proximity interoperability are fully dedicated towards comm-links between H2V, V2H, V2I, I2V or V2V is 5.9 GHz DSRC standardization; wherein range distances are further increased by Repeater Towers, establishing acute and economical vehicle phase-change spatial locational application for practical purposes to manage vehicle momentum, providing Architectural Telematic Intelligence from within a protected secure private infrastructure. Wherein, one or more vector-hub class or node-class ecomm-devices, onboard vehicle processors and all other communication devices mentioned herein, internal structured proficiency in data coded message transmission, receiving or transponder frequencies within 5.9 GHz DSRC incorporate segments or channels within 5.9 band range designation contemplated for data communication bands technique capabilities of transmitting secure data-facts that may be combined into one or more strings of data, a single data-fact for any type broadcasted data coded message navigational directives, advertisements, propagation or re-transmission of same, response to a received transponder signal or signals or signatures navigating directives, notifications, or additional navigational data coded transmissions not listed transmitting on the frequencies between example: 5.92, 5.935 within any band width between 5.9 up to 6.0, example: 5.9007. Where modification in segmented variations allows different ecomm-devices to communicate on different channel bands securely, including additional dedicated frequencies in consideration of being used to transmit or receive vehicular traffic data-facts or sets of informatics; eliminating cross connections, intercepts and communicates separately through or within one or more secure sub navigational system (subnaysys) identified paths (iPaths) the secure virtual vehicle navigational system determines, the iPath may change randomly for security.

Combinational encapsulated encrypted responses are generated vis-à-vis from either the secure virtual vehicle navigational system between vector-hub class or node-class ecomm-devices, Obvipro to hubs or vis-à-vis, vector-hub class or node-class ecomm-device that were initialized by the first vector-hub class or node-class ecomm-devices ecomm-device that requested acknowledged on network, using appropriate Paired-Key for response an acknowledgement of being iLink-sync'd an paired. Wherein there are additional matched Paired-Keys sets that are also encrypted for redundancy an security purposes, some of which are layered for a third level or more sequential authentications for secure measures to certain vector-hub class or node-class ecomm-devices, creating a path for emergency vehicles or dignitaries; there may be additional paired transmitted and received keys for each vector-hub class or node ecomm-devices, enclosed within an encrypted rapper, and further the vector-hub class or node ecomm-devices only respond with a specific reversed layered binary mathematically encrypted matched Paired-Key initialized hand-shack internally for another layer of security.

All Paired-Keys sets are archived in an encapsulated encrypted repository on at least one server that are read only by a programmed procedural event controlled by the secure virtual vehicle navigational system, that routinely requests verifications from each ecomm-device for their associated Paired-Key sets and there Response-iKeys within each vector-hub class or node-device ecomm-device is loaded or injected with specific keys, central server ecomm-device communicates with have matched set for each paired-key set. The central server within one or more iNavCom centers has entire iKey-set held within a secure read only directory; wherein iKeyset shell repository has limited accessibility (read only access privilege permission), only a paired key-set has access rights and only then a response key may be transmitted back if a Matched-iKey exists for each assigned ecomm-device deployed; wherein continuous monitoring of ecomm-devices data coded message transmissions key sets are programmed for structured integrity. For those iKey-set injections done in field, keys themselves are encapsulated and encrypted and registered for a specifically designated ecomm-device, solely registered to positional Longlatilt assignment. Field technicians do not have ability to make alterations, since iKey themselves are assigned to a specific ecomm-devices SHID IDT # only, that it has already been confirmed by central server as to its Longlatilt position before commencing communication launch sequence.

Wherein the secure virtual vehicle navigational system structure performs encrypting or decrypting and verification of the Paired-keys, iKeys, iKeyChains, Response-iKeys or assigned associated sets; said secure virtual vehicle navigational system or iCrypticus information transfer system application apparatus may use one or more parts from paper: The Unified Operation Structure for Symmetric-key Algorithm, written by Kuo-Tsang Huang, Sung-Shiou Shen and Jung-Hui Chiu or all references cited therein and additional papers on symmetric-key or asymmetrical-key encrypting algorithms, encapsulating encrypted algorithms, or algorithms in a virtual field encrypting entered data that are currently known or in future updates, modifications of in encrypting or decrypting data to enhance the protection of data coded message transmission or to receive secure data example: artifacts, data-artifacts, data-strings, data-sets, informational facts, credentials including credit card information or informatics, or sets of one or more digital traffic navigational directives, that may need to be encrypted before transmitting or decrypting after receiving by at least one vector-hub class or node-class ecomm-devices from or to any telemetry communication sensors or devices mentioned herein; wherein activation of a Navigational Assistant (iNavAsist), comprised of either iVoice-Assistant (iVA) or Virtual Hologram Assistant (VHA) name is chosen by user; wherein VHA is used during night time driving, iVA during day time, unless vehicles windows are darkened; wherein VHA or iVA assistant language is selected chosen by user with or with out dialect; wherein the language dialect may be Cajun, English with French accent, Japanese with French or English accent, or of combinations of additional accents not listed; wherein Activation by Identified Navigational Assistant (iNaVas), meaning authenticating primary user of vehicle or driver by biometrics; wherein iNavSys primary biometric initiation is voice first, example: "My Voice is Mi-iPrint Access (MiPA)" being ask to repeat at least four consecutive words stored within a RAV archived dbase generated by the secure virtual vehicle navigational system, may be followed by a second Biometric-iPrint (BIP) of the registered driver, or of a secondary registered diver that may be a child of primary user there thumb iPrint; wherein MiPA is crucial for insurability reasons of whois on vehicles records allowed to be driver of either semiautonomous or autonomous vehicle.

Within each vector-hub class or node-class ecomm-devices virtual or not there is a small program code that can be ran remotely or internally for the secure virtual vehicle navigational system generated integrity verifications as to keys both paired and responding key. This small code runs independent of $OSV^X$, configured to run within or outside NOS's core hardcoded area, preforming analysis verifying encrypted Paired-Key sets, determining alterations from malicious or related items from a hard coded blue print of ecomm-devices integrity upon deployment when selected or paired with other registered iLink-sync'd with additional vector-hub class or node-class ecomm-devices.

If anomalies found vector-hub class or node-class ecomm-devices sends a encrypted distress signal through at least one or more SentryHubs onto at least one server in the server complex requesting maintenance, shut down, rollback, request verification to activate OSVx memory flush or inject hardcoded NOS back into OSVx. Each deployed ecomm-device has a unique layered Paired-Key sequence to activate flush procedure. Functionality of any device may or may not continue based on parameters defined for specific events; furthermore the secure virtual vehicle navigational system runs enterprise quintessential data integrity checks randomly, same process is initiated on vector-hub class or node-class ecomm-devices that have been flushed or updated $OSV^X$ before the secure virtual vehicle navigational system before energizing takes place, verifying vector-hub class or node-class ecomm-devices relationship to or with additional iLink-sync'd vector-hub class or node-class ecomm-devices for articulated data-sets before re-activation or activation. Thus there are protocols for any vector-hub class or node-class ecomm-device to be energized, with follow-up procedures in place to be de-activated prior to updates, activating within infrastructure before or during communications. If, in the event of on-board vehicle processor needs updating, the secure virtual vehicle navigational system initiates when vehicle is parked overnight for a specific down-time interval with notification transmitted audibly or visually; wherein upon completion, system runs pre-configure tests for devices functional characteristics after installations.

Further during Phase 2 deployment there are at least one hub, node, or additional certified ecomm-device built with Avics iChipSet iChipset, iChipset$^X$ or a AiChipset equipped with a separate transmitter or transceiver to send data passed from ecomm-device of—additional certified compliant ecomm-devices or smart devices, smart-iDevices or iHD with the downloadable application, programmed to push certain data-facts or data-sets directly to the secure virtual vehicle navigational system; further constructed of a hardware or software integrated circuitry comprising separate receivers, a separate transponder, transceiver or transmitters that has a unique SHID IDT # assigned or hardcoded. Further noteworthy is once a specific Obvipro's data coded message transmission is received by a certain vector-hub class or node-class ecomm-devices receiver activates at least one precept program to mark data just entered ecomm-device, then hubs, ecomm-devices or smart-iDevices transmitter or transceiver by at at least one iChipset, iChipset$^X$ or AiChipset activates the precept program upon datas exiting the hub, ecomm-devices or smart-iDevices onto another iLink-sync'd vector-hub class, node-class, Obvipro's ecomm-device or smart-iDevices or onto a iLink-sync'd cloud server and then onto at least one of the secure virtual vehicle navigational central servers. Wherein said ecomm-devices are securely interconnected by the paired link-sync'd process, and may comprise a hardware or software integrated circuitry with the downloaded application installed, and are independent of each other in preforming tasks for security reasons. Each of these ecomm-devices transponder, receivers or transmitters goes through a similar Paired-Key process internally allowing verification and screening for malware injections, non certified data coded message transmission of attempted code implants, maliciousness, or of additional rouge anomalies not listed. Each Obvipro, pAvics and other certified ecomm-devices equipped or built with Avics iChipSets, iChipset$^X$ or AiChipsets go through a similar internal process as with hub, node. additional certified ecomm-devices constantly verifies data coded message transmissions, digitally encrypted traffic eComm-Advice directives from computational derivatives, via iVoiceCommands or for viewing in a virtual interface empowered by Transparent Informational Knowledge, building a channelized infrastructure that holds firm to the advancement of CybrIntelligence. Wherein a iMechanixm is a artificial Intelligence device that is iLink-sync'd with vehicles guidance system controller (iCP) processing the execution of the ecomm-advice directives being received from the secure virtual vehicle navigational.

Each class of ecomm-devices utilizes a combination of these processes or depending on data held for suspension, formulated by a second evaluation of next transmission or received datasets. Furthermore, each Obvipro, pAvics installed on smart ecomm-devices uses a similar pre-defined procedural verification several times throughout devices linkup status; wherein the term: transmission, hereafter refers to a data coded message transmission being sent or received by at least one ecomm-device transmitting to at least one additional ecomm-device; wherein the data coded message transmission is secure, one or more parts of the data coded message is embedded or hidden within data coded message string transmission a precept or of at least one precept program, unique identifying credentials of the transmitting ecomm-device, a time-frame marker of the transmission leaving ecomm-device, a time-frame marker of the ecomm-device receiving the transmission an logging the time-frame between being sent then received along with the receiving ecomm-devices unique identified credentials being added to the embedded or hidden data coded message string, one or more parts of the embedded or hidden data coded message string is sent to at least one specific ecomm-device; wherein the specific ecomm-device data coded message within coded message string is to held in ecomm-devices memory medium, executed at upon a determined or detectable event, or of at additional time-frame or frames, or of additional events, procedures, or of additional items not listed, example: navigational maneuvers to be executed, advertisements, warnings, notifications, advisories, propagating said data coded message to additional linked and paired comm-devices or not, assimilating data coded message, or of additional items not listed by the receiving ecomm-device; wherein said data coded messages hop or bounce from one ecomm-device to one or more ecomm-devices; wherein transmissions are streamed, gated throughout towers or ecomm-devices, transmitted via Wi-Fi, or of additional communication means not listed.

Once a offline vehicle re-activates registration, archived data is then comparatively analyzed so as to create a baseline interpreter mark of last transmission received, so that new registered activations from certified ecomm-devices integrity composition are reverified. Once Obvipro, pAvics or of additional certified ecomm-devices not listed complete initialization within a domains infrastructure is verified continuously, when verifications are completed a determined route alternative is excited from previous offline positional node location, the secure virtual vehicle navigational system begins communication. These end of life trip events are archived for future use or deleted from users interface based on drivers needs. However this data is not totally deleted, its archived for future activation or for comparative analytical purposes, further compared with vehicles in the same Identified route (iRoute), along with future trips by the same vehicle.

Each vehicle, whether a truck—any size from a half ton to a semi truck, car or other motorized medium that transports goods, services or people; when registration on a networks domain infrastructure occurs by Sync'ing that particular VIN # or additional unique identifiers are paired with the associated information regarding weight, dimensional size, age of transport or vehicle, IBS capacity for each manufacturers transport or vehicles dynamics of the initial reading of sensors, devices or components, and said dynamics are cataloged, categorized and/or grouped by vehicle types and the manufacturer of the sensors, devices or components, vehicles with sub groups of the initial readings; and the secure virtual vehicle navigational system begins recording stop braking distance for semi-autonomous or autonomous along with reactionary responsiveness for humans or a vehicles guidance system controllers machine initialization reaction time-frame; and determining the time-frames of the stop braking distance and reactionary responsiveness are increasing at what rate; wherein the secure virtual vehicle navigational system verifies and records a vehicles dynamics, comprising comparative informatics from additional sources not listed with a user entered information associated with a particular vehicle, current insurance, inspections, licensing data or of additional informatics received or archived—meaning comparative data matched to either a specific route, vehicles driver interactiveness in conjunction with surrounding vehicles informatics either archived or real time data generated, that are connected or recorded to the vehicles specific VIN # (either owned, rented or leased) or a uniquely assigned SHID IDT # or additional informatics complied from previous registrations within any given networks infrastructure in comparison to or with a specific group of vehicles age, brand or models driver attentiveness and all additional factors associated with responsiveness and there associated human x2factors. Combined together iX2, identifies human or vehicles variable habits or attributes, Obvipro or a vehicles guidance systems reaction time or deficiencies. Said derived data benefits additional safety response aptitude in relationship with the vehicles drive-ability level for semi-autonomous and autonomous reactionary responsiveness. Finally, paring event is completed once acknowledged, vehicles Phase-Change spatial relationship is computed as it maneuvers throughout the network, compiling data, recoding vehicles dynamics, computing traffic variations, sending information as requested by driver or the secure virtual vehicle navigational system recommendations for driving, warnings, alerts, speed, alternate routes, spatial distance between vehicles, coasting and braking sequence advice directives, entertainment and navigational suggestions as requested by driver or autonomously from vehicles Obvipro's informational recommendations based iCP current integrated capabilities with Proximity Integration.

Phase-Change positional point calculations are determined by the anticipated time-lag in respect to distance data is to be sent has traveled in proportion to vehicular momentum rate, formulated adjustments with next digital eComm-advice directives transmission is comparatively analyzed with previous calculable dataset sent. In other words, calculations are pre-configured based on vehicular rate flows relationship to timestamp of data received for phase-change positional points, and further adhere to similar calculations for datasets being sent out and finally accommodating the human x2factors, vehicle/driver navigational capabilities and surrounding weather, or of additional factors not listed, prior to next datasets transmission being sent to a determined or selected group clustered-mass or a particular vehicle. Thereby, if any unexpected migration or other occurrences toward another vehicle occurs, calculations from specific artifacts are recorded as to which vehicle entity unequivocally initiated a particular disturbance and/or a lane drift (vLaneDrift) took place whether from human error or vehicles equipment failures of any type, example: mechanical aspects of vehicle, associated weather conditions as in wind, water or ice on roadways, driver non-engagement, vehicle not registered, attentiveness of driver, internal hard/software and/or failures, communication interoperability concerns or issues or from combinations thereof. iMarkers are notated, formulating sensitivity x2factors calculated for a future detection incident or mishap, for instance a vehicle heading in wrong direction approaching vehicles instantly sending out notifications to effected inter-connected vehicular traffic or surrounding vehicles, either by audible iVoice-Commands, or indicated on vehicles virtual interface TVA announcing procedural steps for all anticipated vehicular traffic that may be affected from such occurrence with evasive actions to be taken by driver or autonomously by each vehicle, as to those vehicles that are stolen or headed in wrong directions—the secure virtual vehicle navigational system can or the vehicles Obvipro safely pulls vehicle over or in the event vehicle is stolen the secure virtual vehicle navigational shuts down the approaching vehicles operating system, or warns driver notifying surrounding vehicles or authorities at the same time-frame in such an occurrence.

In more detailed terms, a correlated system attribute in Phase II incorporating Proximity integration sensor on newer vehicles, transmits to at least on tVectorHub vicinity point; systematic data is transmitted through one or more Reaper Towers or of additional transmitting ecomm-devices not listed securely; wherein data computational factored integrals of data transmissions drop or connect to nearest iLink-sync'd server from at least one tower to one or more tVectorHubs; when traffic iData-links transmit traffic artifacts at the speed of composite data-links speed capabilities. On matter of older vehicles not equipped with OBD port proximity determination is calculable from surrounding vehicles positional points, its relational-ship to surrounding vehicles by using triangulation algorithmic artifacts on a specifically determined route navigating older with newer vehicles. A further embodiment during Phase II, each tVectorHub, vector-hub class or node-class ecomm-devices are equipped and constructed with the ability to sense approaching traffic volume, based on computational ecomm-advice directives from one or more vector-hub class or node-class ecomm-devices up or down stream of the vehicular flow rate density recorded, to transmit signature signals to at least one vehicle-domain within a mass or to a single vehicle to transmit to other inter-connected vehicle within said mass, a cluster of masses or not or to a single vehicle to adjust flow rate as received by at least one vehicle-domain propagating said navigational directives to surrounding inter-connected vehicles simultaneously.

A preferred embodiment forecasting stolen vehicle movements, the secure virtual vehicle navigational system determines stolen vehicle coordinates, transmits future routes to surrounding and those vehicles ahead to pull over or take evasive action depending on proximity phase factors, detecting who is driving, triangulated route change, speed violations, not adhering to navigational directives, a user, owner or operators of surrounding vehicles reporting a vehicle stolen, allowing stolen vehicle to proceed and law enforcement to pursue safely or to shut down vehicle by authorization of a user, owner or operator; wherein the secure virtual vehicle navigational system continuously, at random intervals, or requested by linked and paired ecomm-advice a triangulation process status between towers, satellites, vehicles ecomm-devices, smart-devices, or of additional ecomm-devices not listed; wherein data transmissions includes each ecomm-devices credentials along with which towers, satellites or ecomm-devices, or of additional ecomm-devices not listed the status of being currently linked and paired with; wherein credentials includes ecomm-devices SHID, or of additional identifiable-records not listed; wherein the process assists with accuracy or security of the GeoiLoc transmission being received by other vehicles or the secure virtual vehicle navigational.

According to an embodiment comprising a formula for secure data transmissions, each of us live in a state, within United States. So shall the secure virtual vehicle navigational system starting with municipalities, townships, counties and like from where data originally gave rise to and harvested from its creation inception point. Thus, as stated throughout this secure virtual vehicle navigational system apparatus displayed, data should be collected from is its origination point, compiled with protocols that generates the path from whence data came from. Consider, since traffic data generation began from within and between cities, so shall these areas have clear dominion over such data as to gathering, performing calculations therefrom for a multitude of reasons, archiving, and to disseminate datas results whence originated from generating income when requested. Example: To be an open intelligent system, regarding dissemination as to generation of such datas inception, a full path to or from data starting point inception came from must be associated with each data string as it communicates such data even as to its designational geographic position as it moves along to its final destination, at rest either permanently or temporarily; wherein datum, data or sense datum being received by the secure virtual vehicle navigational system is continuing being indexed assigned to each specific vehicles dbase; and each datum, data or sense datum being received is further cataloged to each vehicle, cataloged datum, data or sense datum is categorized by: vehicle manufacturers style or name of vehicle, including sensor, device or components of each manufacturers data specifications of each sensor, device or components, including guidance system components; and tracking fuel consumption, fuel volume capacity, recording vehicle inspections, monitory valid drivers license or vehicle registration status; wherein the secure virtual vehicle navigational system performs continuously a sequence of a plurality of algorithms comparatively analyzing said datum, data or sense datum after being grouped, cataloged and categorized by manufacturer, type, or of additional items not listed detecting abnormalities, deficiencies, deterioration rates on tires, sensors, devices or components, including guidance system components, or of additional items not listed informing user, driver, operator, vehicle manufacturer, or of additional manufacturers not listed; DOT, share and stack-holders of the generated informatics Empowering Transparency of Service (ETOS).

Meaning datum that was transmitted the secure virtual vehicle navigational systems subnaysys iLink-sync'd iPaths, without limitations: vector-hub class or node-class ecomm-devices; wherein datum, data or sense datum generation and transmitted uses binary precepts are comprised of a rule, instruction or instructions, process, commands by virtual, or by proprietary means, by additional current means listing each 'datas creation inception point' example: communication device built within or assigned to a specific vehicle, vector-hub class or node-class ecomm-devices, nodes virtual or not, with associated VIN, SHID IDT #, a binary or virtual assignment number or additional unique identifying identification, produced or generated, labeled or assigned to a particular ecomm-device or a electromechanical device, virtual or by additional means know now or in future that produces a string of alpha numeric characters that may or may not be encrypted or coded indicating device IDT #, path taken to next device along with time data left previous device, and time data entered another electromechanical or a iLink-sync'd additional ecomm-device for whatever purpose to transmit further, perform processing, to convert to another different readable form virtual or not, example of PDF's or additional forms of readable matter, transmitted to or from servers, at rest with time duration of idleness, with time of extraction to be shared with certified Tribal entities, share or stack-holders recording each time data is moved for whatever purpose until at rest again and process continues on for ever.

I[N] Support of example above referenced statement: data collected from multiple nodes, hubs or additional certified ecomm-devices not listed or by virtual means, data in motion or idle has a 'trail date'. Such data has a clear and somewhat hierarchical undertones. As when you search for a topic, word or string of characters alpha or numeric strings within the internet or intranet regarding a topic or phase. Once you chose a specific document from list of displayed choices, document is 'located' automatically generating a string of characters such that there exits undoubtable fact to its precise Longlatilt, binary, virtual or by additional means not listed means indicating where such data, information, informatics whether mathematical data or virtual data came from before its inception creation point with a list of each associated device upon which or where said data was transmitted from, length of time data was at rested, ended either temporary or permanently at rest being archived in a shared or not shared encrypted or not repository whether in a CybrCloud private or not, Tribal entities, share or stack-holders repositories as it continues to move or at rest as to the time frame and geographical location of server.

Thereby, generating a unique IDT path assigned to vector-hub class or node-class ecomm-devices, electromechanical device, that created or transmitted data from its origination point. Accordingly, as to certain axis points, whether Longlatilt, binary nodes or by current means to move or transfer data; wherein the IDT # is not only used to verify datas path or generates a virtual display of a time-line of datas movement, a security stamp for each ecomm-device as it enters or exits during it generation from start to finish is created. Such data assists in convergence of virtual interface associated with TVA displaying real time-line virtual navigational data on iNavX2 traversing on land or hovering by any means. including a drone; wherein privately owned drones are built with, or attached to FRIDGPS Module; wherein drones are registered within infrastructure user purchased drone in, registered drones are trackable; wherein the secure virtual vehicle navigational system determines a none registered drone protecting a municipalities infrastructure; wherein the drone registration may be a PSE. Moreover, recorded string is added too for each ecomm-device, machine or electrical device, or additional devices not listed that touched, read, used to compute, process and/or create such data, that of which resembles a iGate, similar to 'open source' standardization of Transparent Informational Knowledge; wherein information iGate is 'always' bi-directional. Thereby not only creating transparency of datas origination creation inception point and further used to litigate true directional Phase-Change Artifacts (PCA) or a VLD migration from each vehicular movements along with additional informational records collected from surrounding vehicles ecomm-devices. Controlling information to the point of restricting bi-directional historical data flow, the data itself and the associated data-facts become meritless as to datas integrity otherwise.

The driver, as the requester of any type of data that is for entertainment, navigational aspects, Mi911 assistance or additional related concerns or items not listed, is confidential in all aspects of decision-maker requests, is aware of pertinent surroundings, such nomenclature Spatial interactions and related information is necessary for the secure virtual vehicle navigational system to calculate specific items for each virtual requested informational knowledge, also known as iKnowledge (iK) of each GeoLoc-Nodes points for fuel, food, hotels, etc. Each GeoLocNode (GLN) consists of Longlatilt co-ordinates that is translated into TVA's virtual interface displaying GPSGIS data-codes that show exact route or alternate routes based on traffic density variables and traffic signages, leaving no doubts to vehicles exact Spatial location as to directional movement within and around objects; wherein wherein a Mi911 service application is built in the ecomm-devices NOS, smart devices, smart-iDevices, AiDevice or Identified Hub-device (iHD) capable of or has downloaded a secure Mi911 services software application, further may be built with or attached to the FRIDGPS Module; wherein iHD's are further built as a modular iHD with at least one camera or car cam, or both that is linked and paired between vehicles ecomm-advice, exiting activation of cameras built into vehicles linked and paired with at least one iHD and the vehicles alarm system, the modular iHD is linked and paired between a users home alarm systems and alarm systems equipment that may be built with or attached to the RFIDGPS Module, example: class breakage, motion sensor, door sensor, camera, or of additional security items not listed and the secure virtual vehicle navigational with a near to 911 service center within the navigational system server complex, or a one or more 911 Emergency-Hub Ecomm-device (EHE) to extend remote service center in remote areas that; wherein stationary or portable smart-iDevices, AiDevices or iHD's are built with at least one NOAA weather radio channel, and configured by design to transmit at least one image, readings of a meteorological device or sighings of a weather event: wherein each smart device, smart-iDevices, AiDevices or iHD's are iLink-sync'd and paired-authenticated with at least one Mi911 service center; and wherein each smart-iDevice or iHD's stores in at least one memory medium the users street address enter by user or the transmitted Geolocation of the initial transmission at setup or by test interval transmissions programmed into smart device, smart-iDevices, AiDevice or iHD records and monitors functional attributes detecting the MiSOS request Geolocation or triangulated GeoiLoc with or by satellites, towers or linked and paired-authenticated ecomm-devices not listed especially in state or federal parks, private recreational areas within Tribal entities; and the secure virtual vehicle navigational system generates at least one iPath to be used for emergency services including private or public ambulance service centers, fire stations, search and rescue, or of additional services not listed; wherein the performance attributes of the Mi911 services is encapsulated and encrypted within the ecomm-devices NOS's, or encapsulated and encrypted within the authorized software upgrades installed on smart devices, or of additional devices not listed that may include the RFIDGPS Module, executing by a user ecomm-device, ecomm-device detecting the contact event activating the Mi911 service automatically initiating MiSOS, or a user entered a voice recording of a statement of an emergency request by biometrics, the ecomm-device continuously listens for the emergency word MiSOS or a users selected word stored within ecomm-device or pAvics memory medium, by a iTouch$^X$ of an icon 'X' enclosed within a circle on the display screen, transmitting a location path to the ecomm-device initiating the request and the ecomm-devices unique identifications; and wherein the secure Mi911 services uses voice, images, text and SMS encrypted converted to binary, or acronyms where one or more parts of the messages and communications may be streamed or transmitted by additional means not listed between ecomm-devices and the central processing server complex or the Mi911 system server complex, comprise; a cellular of mobile and stationary ecomm-devices, that uses a short range, or a long range, or both long range and short range communications and messages using a plurality of radio frequencies, or a linked and paired wifi network of one or more vehicle-domains (VD), mVector-Domains (MVD), towers and repeaters to cover a region, or an area that Mi911 serves, the signal being automatically switched from one ecomm-device to another ecomm-device as the user, or a vehicle travels about; wherein the short range data messages and communications are between linked an paired vehicles ecomm-devices, where long range communications and messages are from vehicles ecomm-devices between the navigational system server complex.

When documents are found and turned into PDF's by way of searches, each document has 'vector locator path'—VLP. This is a 'unique string identification name'—USIN acknowledged as 'tMarker Audit Trail' or simply tMarker Trail at bottom of page whether touchable, viewable, printable in a virtual sense as to same i.e. touch-view-print. Map-tracking where record-data file of whence it came from as to a specific ecomm-device, server, printer, electromechanical equipment, software or a combination thereof, or by a virtual representation, or of additional means that generates data that is not listed.

Looking at this VLP process in another way; string codes are geared specifically towards generation of exact path in binary, cubits or of additional means not listed that generates a coded string indicators of a path taken that may or may not be encrypted, as to a datum, data or sense datums 'creation inception point' from where not only the datum, data or sense datum resides at currently in space time, also indicating exactly where, how, why or what was the generated datum, data or sense datum geographic location was previously, further from or passed through by any current means as known now or in future when the secure virtual vehicle navigational system having implementation examination of all necessary parts deployed moves over to a virtual interface.

Furthermore, when data file, example: pdf, images, word process documents, text editor programs and there displayed results, or of additional informational data not listed is printed as a pdf, on paper or any other viewable document virtual readable as a document file on or by electronic processing equipment that such files are viewable to humans or in machine languages compiled by a plurality of programming languages currently in use or not conceived of currently to create tMarker Trail or time line independently or separately for legal verifications of a accidental mishap on private, public or areas within Tribal entities, various forms of electronic data, paper, virtual, written, or of additional codes or programs no listed that displays virtually the tMarkerTrail or a time line between ecomm-devices or not. Each datum, data or sense datum tMarkerTrail or time line string once created it is printed on bottom of each document, images, is coded from within each ecomm-device as a new element of string is added until such datum, data or sense datum is at rest, enters/exits certified ecomm-devices, or of additional devices not listed that creates absolute ecomm-device directory trail by means of Crypsis Tokenization, a Var Chk (√) Index. Such tMarkers are illustrated displayed in the nature similar to the following as the datum, data or sense datum transmissions arrive from mobile or stationary ecomm-devices, within a domains infrastructure that are transmitted to or from vector-hub class or node-class ecomm-devices, and being managed by the secure virtual vehicle navigational system receiving these data transmissions as illustrated exampled and can be more or less complex by the following examples: -Obvipro IDT #-SHID ID #-creation time stamp [time displays are configured as either digital, analog and preferred use of Greenwich Mean Time (GMT)]—time exited device (data that is of any type) \ time (entered next device)-Hub ID #-SHID ID #-existed time\-ENT (Entry Time)-SentryHub ID #-SHID ID #-ET (Existed Time)\ ENT-VectorHub ID #-SHID ID #-ET\-ENT-Server ID #-SHID ID #-ET\-ENT-Processing Calculations ID #-SHID ID #-ET\-ENT-Filtering ID #-SHID ID #-ET\-ENT-Comparative Analysts ID #-SHID ID #-ET\-ENT-Overlay Model updated ID #-SHID ID #-Referenced-ET\-ENT-Recalculate eComm-Advice Directives ID #-SHID ID #-ET\-ENT-Transmit Advice Directives ID #-SHID ID #-ET and so forth listing every device, server, hub, router, electromechanical device and/or program to process or compile, transmitted, manipulate or move data. This is only an example, further a universal excepted standard for all languages must be formed to prevent abusive manipulation as to datas transmissions principled among other datum, data or sense datum marker forms.

Example provided above is a sample of an illustration of an absolute ecomm-device directory trail providing a list of vector-hub class or node-class ecomm-devices, electrical-mechanical devices, or additional ecomm-devices not listed used in the movement of datum, data or sense datum and is for demonstration purpose only. Each tMarkerTrail is of a uniform standardization as to only one space between each ecomm-device acronym and next item whether its a vector-hub class and node-class ecomm-device, along with a dash or not showing or listing a new device that handled for what ever reason for any type data-fact, datum, data or sense datum, artifacts, strings of data and so on, example: Obvipro-O # and providing associated SHID for same device-SID ID # or other device indicators or indexes, pAvics or Obvipro device—A or O ID # along with associated SHID ID #-SID, VectorHub ecomm-device—VH # (space) SID (space) SentryHub device—SH # (space) and additional device identifications can be added to certified mobile devices ESN #, in front of each comm-advices acronym provides time entered, followed after SHID exit time.

Indices from each vector-hub class or node-class ecomm-devices, or of additional devices not listed can be further simplified by using alpha/numeric characters of one or more letters with one or more numbers such as for each Obvipro's associated index is: O or simply a binary with or without a space between subsequent listed devices, followed by its SHID ID # for instance C3 Hz that may be encrypted after that may be turned into acronyms or binary encrypted strings of encrypted acronyms. Another tMarker indicator can be used added when data reaches one or more servers of the secure virtual vehicle navigational system, along with the time in space traveled from the datas inception exit point time in relationship to data entry time stamp for next device. If there are differences even in milliseconds, nano seconds or detectable deviations in prior or current tMarkerTrails recorded time, the datum, data or sense datum is held in suspension for review, looking for anomalies within datas string and those coming from other vehicles from surrounding areas, once comparative analysis is analyzed and passing the datum, data or sense datum is parsed and used for computations.

A preferred embodiment is to have both tMarker and t2Marker combined within one tMarkerTrail, and tMarker's third part of indices movement which is the Longlatilt marker of any device that transmits or receives datum, data or sense datum moved through that is for images, pdf's, or of additional forms informational documents or of informatics, must follow this final stage for the datum, data or sense datums integrity, otherwise datum, data or sense datums could be considered corrupted.

Searching data records within a secure or not repository uses a similar tMarkerTrail example: /server name/obvious SHID # ID—time stamp (or intervals) data server [location id #]/municipal server [vectorhub SHID]/Obvipro ID #/[virtual interface]/xo/x-path.xhtml This same principal can be implemented for any item searched on the internet or intranet, tMarkerTrail is placed at bottom of a document as with this example: www.ging.com/ search phase or name/name of ISP/name of server IP address/name of owner of company that owns IP/name of company that owns domain name [if different]/name of document/documents created date/date document was altered/person or mechanical electrical device that created document to a PDF or changed datas readable formate to another form for instance a printable document, date document was moved from another location along with server Longlatilt coordinates for server and each node-point within data-sets trace-route an so on, greater details in listing each device data passed through, details assist in calculable algorithmic injections for forecasted events, used to calculate additional forms of informatics for a driver, vehicles capabilities or capacity to self navigate, to determine a failure, failure rate or deficiency of the proprietary inertial measurements of sensors, devices and components. Such informational data becomes tenable as to its full authenticity of datas inception point.

Wherein further the reverse is accomplished when calculable ecomm-advice directives are sent out to example: Obvipro or to additional certified vector-hub class or node-class ecomm-devices within vehicles or installing the downloadable software on smart-iDevices. When the datum, data or sense datum is transmitted between vector-hub class or node-class ecomm-devices eComm-Advice directives are sent from at least one server of linked and paired with the secure virtual vehicle navigational system, the datum, data or sense datum string of characters are intended solely for a iLink-sync'd vector-hub class or the node-class ecomm-device to transmit to a specific Obvipro, pAvics or of additional certified devices equipped with Avics iChipset, iChipset$^x$ or a AiChipset. However during the datum, data or sense datum transmission, such data moves through an established or a pre-configured by additional means not listed linked and paired vector-hub class or node-class ecomm-devices, or additional certified ecomm-devices that are iLink-sync'd for data to reach a certain mobile ecomm-device, or a vehicles Obvipro or another stationary or mobile certified devices based momentum on a single vehicle or those vehicles with same range of datas transmission. Thus establishing a baseline for Channeled Telematics. Wherein communication links are pre-configured on ecomm-devices when deployed and each of these stationary or mobile ecomm-devices only communicate with those that are linkup and paired, creating a primary line of defense for structured network protocol. Upon each vector-hub class or node-class ecomm-devices activation within a domain, the secure virtual vehicle navigational system computes destination communication route variables to one or more iLink-sync'd vector-hub class or node-class ecomm-devices, towers, vehicle-domains, or of additional ecomm-devices not listed as data-string moves in the same direction as vehicle; wherein communications between vector-hub class or node-class ecomm-devices, or of additional ecomm-devices not listed use a long range, or a short range data message communications, or both combined linked and paired with the central processing server complex, the secure Mi911 emergency service system and the secure virtual vehicle navigational system server complex, or at least one linked and paired server via a wireless connection, or a wired connected communication network, or both wired and wireless communications network of the plurality of ecomm-devices that includes, or built with an RFIDGPS Module.

A similar program is used to verify data strings for maliciousness, if similar anomalies are found in either ecomm-device or eComm-advice being sent, a message is sent directly to server through nearest repeater tower, Hub-sensor, vNode or other certified ecomm-devices as a pre-configured distress call that transmits necessary data to assist in discovery; inciting the secure virtual vehicle navigational system to move into a protective mode in certain vector areas, monitoring surroundings communications looking for similar anomalies from other devices. Wherein data is pulled from multiple Hubs simultaneously activating localized SentryHubs, BeaconHubs or other combinational devices that may be equipped with TSF, either blocking, computing location of malicious source node. Datasets are further archived and continually used to verify or calculate against new dataset strings at any time in future for any device as a historical archived anomaly database along with code modifications to original detected data-string or strings.

The present foundational elements within construction communication portion thereof, use transceivers as a primary comm-link or secondary data-link for secure communications between domains networked or between infrastructures. Notably some data artifacts, Spatial phase-changes and other selective data facts transmit directly to the secure virtual vehicle navigational system through registered and authenticated CybrCloud servers iLink-sync-d with system's servers receiving data from hub-devices, various types of node sensors, tVectorNode devices and/or other certified devices. Wherein the secure virtual vehicle navigational system calculates realtime; Authoritative Encrypted Digital Traffic Directives sent to one or more Obvipro's, pAvics or other certified compliant devices within a given areas domain.

The processes stated above is the same within any type movements of data from ecomm-device to ecomm-device, from or to another server from/to a server, or to be printed out, searched for whether from internet through a secure VCPI connection or not, intranet or other archived data bases used to process, calculate, archive temporarily or permanently, for storage, to extract such records, either to manipulate in any fashion as for calculations, data record analytics of any type or process. Further security permissions are hard coded as to specific ecomm-devices from hardcoded SHID ID # or other unique identifiers either code generated or by other current means, servers, static or mobile electronic or not storage devices, whether at rest, in motion onto another server, pushed back from/to another server, ecomm-device sent to certified third parties for informational analytic purposes or other items associated to risk verification for any ecomm-device, analytics on vehicular mobility, maintenance items needed to be attended too, transmitted to other certified entities from one or more artifact repositories that may be shared. Such compiled data artifacts are viewable to any driver for only his historical record file, in an easy to use and accessible via a web based encrypted portal that may use a VPI, a realtime virtual interface accessed by law enforcement personnel without limitations to Obvipro's or other Certified Compliant Smart eComm-devices viewable that does not allow code alteration injections for archived or realtime movements for viewable content, either the secure virtual vehicle navigational system encrypted data pushed or requested by officer or owner of vehicle.

Archived data has an order to decay, once data is moved over to a secure encrypted repository for a period of not longer than, for example 9 months or less for purpose of analytics, legal disputes or for any other reasons such data extractions or requests are a PSE; generating revenue for each area infrastructure. All stored data thereafter moves to another secure historical server with deletion in current directive end of data life determined by each infrastructures governmental rules, each of these data-relics are used for analytical comparative data with current data artifacts compared against decisions on road density volume and for additional computational needs not listed.

Thus unless time stamps and device trail matches, data is not securely transferred, handed off, moved, flows autonomously or by any other variations of similar movements. Therefore integrity of that specific data can be challenged as in court, as to its creation point of inception, unless these data string contents match.

Move over informational knowledge is not transparent, unless it provides tMarker time line phase as to datas inception; and will assist in copy rights protection for all web based searchable informational records whether they be images, pdf's, processor word documents for any operating system on Mac's, Windows, Linux, or on private operating systems that is shared or not shared or used to provide access to data in any form to compute, calculate, archive, other forms of readable documents or for mathematical alterations, binary or other coded process for retracing, retrieving searches, searchable data from internet or intranet such materials for purpose of to read, view, achieve, provisioning, dissemination thereof, for processing, preforming calculations, for structured or non-structured decision-making, analytical computations, or of additional informational analytics not listed, to search from as to its location on any server to be used for printing or for other forms of manipulations.

In as much as upon each data fact is created, such data moves from, onto and through a vector-hub class or node-class ecomm-device or from one folder to another folder, from server to server, onto another device for computations and so forth. Tracking datas forward or lateral movements, movement of such data from a ecomm-device, a device, virtual file drawer, server, a folder or any time data is at rest for whatever reason, can not move until only after tMarker time stamp has been verified from previous movement from whence it preceded or for that matter was it created before, used with a search, an equation, solution, quoted, indexed for reading. If this event process does not take place, in that data does not match previous data's coherence verification, data is not excepted. It is dumped, under all conditions. No data file can over take another, no file will pass onward unless verifications are sync'd, suspicious data strings are dumped or not excepted, like procedures are used based on situational awareness for each vector-hub class or node-class ecomm-devices datum, data or sense datum being sent of received.

Example: when you move a file from within a folder on a Mac, and permissions are set as to who owns or has access rights to read, execute, write said data file as with a particular ecomm-devices SHID # ID a unique binary #, which can also be a reverse binary encrypted alpha/numeric or combinations thereof, that has some characters or numbers missing purposely and replaced with a vertical or horizontal embedded algorithm sort of like an offspring taking you to another code which is real complete tMarker, adding another layer of security or other forms of coded language numbers, indices assigned to each vector-hub class or node-class ecomm-advice either mobile or stationary deployed, complete codes can also be embedded within a tMarker as a single layer of encrypted code used by system to verify integrity of datas transmission with file being locked [similar to that of which tMarker Trail vs. time stamps match process]; you can still move file to another folder and/or server at another location either static or mobile device as on a PC laptop or Mac and should not be case without a tMarker Trail. If these tMarker do not match, data is considered useless non-verifiable, since it may have been modified, altered or re-created and record of change as to whom, what, where and how data file was altered does not exist. Once Var Chk Index is created datas integrity becomes absolute, as too its creation inception point. Another example comes to mind; wherein you see a image or a data file displayed on a social media site and someone points it out to you, and behold you saw same image or data file two years ago and you questioned its inception at the first light of viewing. It is simply a regurgitation, with no credibility or credit to inception of creators thought, idea, and is of no matter.

However, on a Mac or PC original file itself with same contents from whence it was moved is regenerated, unless you cut and past, and you have no way of knowing which file was 'original', hence older files needs to be deleted, even when you move a file from one location to another position on hard-drive of any type there are remnants (artifacts) of original file within drive, and more so you have a known security issue with data, file, document, pdf and any other type of readable matter, including those used for purpose of computation or legal purposes of any kind, and essentially data is worthless as to its credibility or authenticity.

In summary, a mobile, static ecomm-device, example: Obvipro or additional certified device not listed transmitting or receiving data to or from Hub ecomm-devices, example: VectorHub Class devices, Nodes virtual or not, or of additional devices not listed that are certified vector-hub class or node-class ecomm-devices either mobile or static. Each device that creates data form its inception, a unique section of entire string is created, followed by next ecomm-device added too string sequentially. Until such time that data string that moved from Obvipro, or of additional certified ecomm-devices not listed that has three encrypted strings for that specific data, that are tokenized from a reverse binary data string: creating tMarker Trail combined with the t2Marker for historical purposes, time stamp and finally Phase-Change Permission Check, creating a Var Chk Index. Each of these indexes are extracted from original transmitted data once data is ready for computational manipulations, arching or data requests from share holders such that each can be easily read and verified. Var Chk Index is a list of devices SHID, ESN or any additional unique identifier assigned to and hard coded to Avics devices, certified downloadable version for mobile devices that a registered serial number assigned to each iLink-sync'd activated ecomm-devices.

Each and every datum, data or sense datum string effectually carries out same process passing through, over, around, along a spatial time until such time it reached another ecomm-device, onto until such time data reaches a server; a repository server or time of rest at any point. Time at rest intervals are calculated from each time tMarkers exiting from a specific mobile or static ecomm-device, traveling in space and then enters a Hub, Node and/or other certified ecomm-device, server, storage, archived server, or a certified end-user requested data string with end of transmission mark, comprising of tMarker trail, Time trail—t2Marker creating Var Chk Index.

Once server has excepted a data-string, of course all three strings are generated and another check is preformed, datum, data or sense datum string hides that unique SHID key assigned to each ecomm-device, if matched the datum, data or sense datum string moves onto additional verifications not listed, if no match the datum, data or sense datum is dumped and archived. Server moves into a provocation mode as to this vector-hub class or node-class ecomm-devices integrity, requesting or retrieve datum, data or sense datum strings from surrounding vector-hub class or node-class ecomm-devices, archived datum, data or sense datum to compare against further anomalies ecomm-devices within a certain vector area and checking surrounding adjacent vector areas verifying the detected threat, or indications of similar threats. Finally the inspection of both t2Marker (time marker) and the tMarker strings comparative binary audit trail, if coincides simultaneously data is allowed to proceed, if no match a hold is placed for dumped query waiting for next datum, data or sense datum string to be compare against. Additional security protocols are acted upon based on pre-configure attributes, running data more than once each time until match-points are established.

Each and every vector-hub class or node-class ecomm-device, virtual Node(s), Cubits, formulated from or by an electromechanical equipment, software or a combination thereof includes trace route taken from every server virtual or not, and/or other types of ecomm-devices, from data-string, set, artifact or artifacts inception point in time when original data-fact was generated at or from, collected from, entered, passed through and exited no matter how it was created either as encrypted printable PDF or not encrypted, word processor document, binary, virtually by any means and/or any other types of code display currently in use now, contemplated or formulated for future usage; digital images or virtual images that may be encrypted or not, of data that is archived for informational, computational, historical created by electromechanical equipment, software or by other procedural events without limitations for any results displayed by mathematical means or measures; created from or by each and every server, vector-hub class or node-class ecomm-device certified or not, or of additional means not listed created by electromechanical equipment, vector-hub class or node-class or software, display includes path in a spatial time mannerism as to a map of lines (map-track) the spatial change in distance or time connecting to a servers, vector-hub class or node-class ecomm-devices linked together tracking and displaying the entire path from whence each piece of data, PDF, scanned document, and all other forms of documentation no matter by what means such informational data was generated by or from any type of equipment, software, by virtual means or by means of coded binary and/or cubits to generate said map-track datas movement from one location to another, for any purpose without limitations to read, print, compute from or with, for archiving, historical purposes that can be shared or not shared displaying exact path from creation inception point each data-fact started and/or ended temporally and/or permanently.

Whether it was printed, scanned, virtually generated or any other means, datas associated string-path originated from/to any type of ecomm-device, electric device whether mechanical electrical or not, that generates informational data or other types of informatics specific to that device, or of additional items that transmits information not listed that received and then transmitted said datum, data or sense datum, providing full path from which time-point data moved from its creation inception point ending with its destination point and/or at rest temporarily.

Once data moves to another device either from human to machine or vis-à-vis and machine to machine, program variable requests, auto feeds from a computational process or procedures; such informatics become transparent, fully that is. As previously mentioned the same from pdf's, other documentations or other forms of informational knowledge, or any other type of generated requests and/or conveyed on or from 'several and not infinite' number of predefined intervals time sets to choose from for where and/or when harvested data is requested provides a undisputed documented path from datas creation point in time, changes locations using Encrypted Data Push and marked if data is at rest temporally as to its time of idleness waiting for transmission in the process of being transmitted, in a state of being at rest, once data is moved markers are generated, example: the path left and the time data left from being at rest. Both the tMarker and t2Marker is generated continuously as data-flows from its creation to a resting point and beyond that further includes IP address for each device and/or other defined parameters used now or contemplated to mark data-flows trace route-path, until at rest again along with time data has been at rest, with other servers locational information and more as pre-configured by requester of such data pre-configured from pre-programmed attributes or mathematical variables.

'Encrypted Data Push' holds to a similar data transmission for email, as with the secure virtual vehicle navigational (Xgenasys) devices only talk to those that have been authenticated by or with another local connected or a single inter-connected domain or at least one network of domains within or not at least one inter-connected system with one or more interconnect domain networked infrastructures; wherein said request originated from and/or to a network device within or not a system of domains and/or a network of interconnected domains within at least one inter-connected infrastructure systems next device as it moves from at rest location onto requestors device. Established beyond a doubt as to what ecomm-device link'd with an edcomm-device or ecomm-device verified with or moved outside authenticated infrastructure iLink-sync-d with in beginning; at least one server sends a request to another server for specific data to be retrieved from; a virtual file cabinet— Identified Locked and Secure (iLocSec), private encrypted repositories (PERP), a shared repository, a public repository, and archive repository (where original data facts 'sit' forever). The essence of Transparent Informational Knowledge that has not been altered. Sending emails to another server request from a Registered iLink-sync'd Authenticated Paired (RIAP) ecomm-device, a personal email account located at the same server or transferred to another server. The data has a trail that passed through several node(s) (communication transmitting devices) owned by each municipality or other providers that integrate, manage operational effectiveness example: EarthLink, NetZero, TMobile or other similar communication providers, that may be determined by each city; wherein the preferred embodiment for protected system attributes each 'free city' owns, oversees its own communication network and data exposure is to be protected since the data itself is a revenue stream and needs to be protected from its inception point, similar to in the realm EarthLink accomplished in Houston. Then onto another ecomm-device an so forth until data-set arrives at another iLink-sync'd device, example: PC, MAC, Unix or whatever the system initiated ecomm-device requested that specific data fact functions (operates) on. Command response for any ecomm-device that wants to talk (move data) to another locational point with no authentication, results in: "Don't talk to me", cause system device does not recognize transmission sender device is unknown or human derived. Therefore, system attitude for any device not iLink-sync'd with next device is nulled (invalidated)— data is just ignored and collected, waiting for next verifiable tMarker index to respond to, from an authenticated ecomm-device.

ITD (Intelligent Transmitted Data) sent through ecomm-devices, system preforms verifications as to devices iLink-sync'd authentication status before transmitting any type data comprising of, example: authenticated encrypted digital directives, computational analysis to or from a particle vehicle, a group or grouped mass; original archived data shared across certified Tribal entities, share or stakeholders, cities, townships or municipalities, insurance companies, legal sectors and state & federal DOT. Data moves once user permission have been verified as to a specific vector-hub class or node-class ecomm-device data is being sent to or from, completes 'matched authentication Key-set registration process' randomly verified by the secure virtual vehicle navigational system requests to ecomm-device before data requests are sent to or from the secure virtual vehicle navigational system and/or verified by additional vector-hub class or node-class ecomm-devices.

Data is then Locked, after permission have been clear-set to read only, meaning path transmitted devices have access right that were previously logged to, added by subsequent ecomm-devices. Such data code is iLocSync-d to only talk to, open a data-line with, transmit back prior hidden requested data to move data in additional directions outside established symmetrical, asymmetrical or just follows vehicles rate velocity path in relationship with ecomm-devices (Obvipro) configured 'Logical Virtual Network Topology' (LVNT) for each SubHub-Class device Obvipro is iLink-sync'd with. Whether a 'vehicle-domain' or certified vector-hub class and node-class ecomm-device off-loads data to nearest iLink-sync'd iCloudProxy-Server (IPS) or to additional iCloudServers (ICS). Then onto the secure virtual vehicle navigational system via secure "EVPN" (Encrypted Virtual Private Network), secure data-set collection moves until vehicle-in-range nearest Transmitting Sub-Hub-Class Device; example: merely a connection datapoint for transient-data moving unto through another iLinkSync'd. Wherein data transmission travels the most direct path through one or more mobile or stationary vector-hub class or node-class ecomm-devices, Repeater Towers, other ccll cellular transmission devices known now or in future arriving at the secure virtual vehicle navigational system, providing tMarker Trail data took each time before parsed.

Another preferred embodiment within a viewable domain networked area, for each iNavCom center consistent within a secure infrastructure, each domain is viewable as a iGrid matrix; wherein each iGrid area considerations on overlay modifications are seen as calculated equation determine future space time-stamp relationship with current velocity from past or prior phase-change locations increasing forecasting accuracy within any given navigational matrix.

The process is very similar to finding or displaying the path of a document on any server, however when searchable documentation are currently found, displaying the full path does not exist. Thus the datas objectiveness in its creditability as to documentation creation or existence is deficient. Such generation is called 'tRoute Marker', 't' stands for time-stamp -TRM, and is the complete trace route the datum, data or sense datum took from its 'tLoad stand' (defined as any ecomm-device that is iLink-sync'd with other devices within VCPI) or ecomm-device back to the requesters marked position. Whether the data simply passing on to another ecomm-device or any other type of electro-mechanical device of any type, of a human involvement to read or to compute data-analytics. If document is altered in any fashion, redacted, what ever the reason is for computational, comparative analytical probabilities or other required modifications the original document never changes. Each sequential revision creates a new document in the back ground, that shows a complete historical time record, locational point as to exact Longlatilt, assigned ID # that reflects a human, the machine or machines or device used to move data facts, a process or a processing equation, the reason forecasting data alterations, server locational data along with IP trace-route details, the company whereabouts informatics was needed, changed and the like. Displaying a 'full audit trail' seamlessly displayed in an encrypted warped exponential binary code, or cubits or using a similar exponential code, the final character string generated which may be encrypted.

Displaying a marker such that all registered or sync-d ecomm-devices equipped with Avics [(and/or by other names) iChipset and may depend on what country the infrastructure is geared too regarding the language name]/Hub, Node, IP address or a virtual node, a cubit node, or similar named nomenclature means for vector-hub class or node-class ecomm-devices in a virtual reality interface certified VectorClass [ecomm-devices conversing within a particle ecomm-device 'Load Networked' domain]/non shared or shared server (name)/repeat as necessary until destination point, automatically generated along with time line mark—t2Marker and then Tokenized. Each marker string consists of a paired time stamp marker string (t2Marker) which matches up with datas path as to entry point in time and with device stamps (tMarker) for any ecomm-device it enters, passes through and time marked upon exiting any type of ecomm-device, hub, node within a virtual interface, binary markers of certified ecomm-device or virtual interfaces display for viewing.

Example of a mark-up character string on a Unix processing platform for each tRoute Marker consists of a creation time-stamp example: obvipro id #-Longlatilt exit time-stamp /enter time-stamp hub id #-Longlatilt exit time-stamp/enter time-stamp vectorhub class id #-Longlatilt exit time-stamp/enter time-stamp xyz server id #-Longlatilt exit time-stamp/and so on. For windows unit tRoute Marker consists of following example: creation time-stamp obvipro # id-Longlatilt exit time-stamp\ exit time-stamp hub # id-Longlatilt exit time-stamp\ enter time-stamp vectorhub class # id-Longlatilt exit time-stamp\ enter time-stamp xyz server-Longlatilt exit time-stamp\ and so on. Invention process is one aspect of 'Encrypted Data Push' and/or that uses a combination of tMarker and t2Marker laced together in a multitude of sequential and/or spatial manners and/or encrypted then or tokenized or more than once as to encrypt/tokenize, adding another or multiple layers of security and/or for other searchable purposes for documents found on the internet and/or extranet and/or on intranet.

The same embodiment above comprising a similar approach as to the creation of the 'tRoute Marker' name using a differentiation of this time-stamp; is used to archive data so that searching for a specific image, pdf, document virtual or not, for computation loading into mathematical equations, for additional conceptual means wherein data is in need to be manipulated for predictability of events current, present or future expectations. Simply by adding additional characters within the data string in a pre-configured universal authenticated protocol standard, referencing that specific documents created name, authors name, date/time ecomm-device, electromechanical equipment wherein data results were calculated from other data associations or relative too a specific document-fact; data-fact, string, computational formula, process or an additional event that manipulates, changes datas original location, structure, or form for any other reason document-fact is humanly or machine altered. Such data can be implicitly searchable in many predefined variations as to fields of search criteria, assist with datas explicit validity for computational measures or for copy right protection, legal measures, used to determine cost, drivers or vehicles ability to navigate and transmitted data for purpose of analysis or analytical computations by any industry, scientific, manageability of forecasted probabilities and so on.

Thus, documentation of archived data has a compartmentalize feature to not only preform searches for any data, said data extraction is seamlessly pulled for computational analysis or certain data can be extracted for computations or injected right into any type mathematical equation or additional processes for record retrievals in the event of legal matters, and further enhances datas implied intelligent telematic integrity, for shared uses or additional demands used for forecasting processes, for advanced trends across different cities infrastructures, creating business telematic intelligence and may generate additional revenue for cities.

These tMarkers consists of several alpha or numeric characters that are in some cases very long, since data is marked not only for vector-hub class or node-class ecomm-devices or servers, such markers indicate time data travels between vector-hub class or node-class ecomm-devices. Here is another aspect, computational mathematical equations can extract selected or randomized data from a certain ecomm-device either upon data strings entry and/or exit time-frames to a given server to preform calculations as they arrive after being checked for datas integrity or after data is structurally archived. Such datas search parameters or calculations extract data from specific ecomm-devices, wherein search is narrow as to a specific time-stamp for all or just one of many ecomm-devices from a certain hub ecomm-device, or from additional ecomm-devices. iMarkers are informational markers as to datas specific place holder location at any given space time frame, datas precise Geo-positional trail, accelerates search criterion results, authenticates data path and records inception device or programs creation point in time.

If an event occurs, that a ecomm-device, hub, node virtual or not, or by additional means of virtually not listed displaying these Markers and/or other certified ecomm-devices are in need of being repurposed for whatever reason. [I]f NOS iChipset, iChipset$^x$ or AiChipset is removed and once disconnected it flushes memory entirely automatically—a layer of security. Then ecomm-device is issued a new SHID ID # along with a new registered iChipset, iChipset$^x$ or AiChipset ID update with a new Historical data from obsolete updated ecomm-devices are archived, all data transmissions are marked as to devices Longlatilt with additional indices, along with recognized data retention guidelines as for legality reason or of additional uses not listed.

Said process is somewhat elementary, binary that is. It is where data at this time frame in our technology knowledge span came from, the binary code, and may further use other means, nodes either virtual or not for notifications or computational equations, traffic directional suggestions displayed herein uses a quantum compass computer-apparatus to provide one or more aspects or all conceptual variations thereof, improves intelligent telematic model—ITM. Every time a data inception string passing unto its prescribed/authorized and sync-d ecomm-device once transmission has been granted or 'locked-on' permanently until given commands to disengage, taken offline, moved, stolen, due to vehicle damage, off-line, or causing disruption in datas integrity and so forth. Wherein the next ecomm-device each of which is 'Load Networked', example: 'time sync-d' or simply 'tSync-d' with specific ecomm-devices that may be randomized for security and has a similar succession with no partiality as to ecomm-device next in line to communicate with, a vehicle-domain (VD) that may or may not be clustered of one or more masses, a single mass or specific vehicles movement in any direction of vehicles motion, assist in determining safe density flow rates.

Each unique continuous data string generated from Obvipro or of additional certified ecomm-devices not listed, data strings transmission creates a 'tRoute Marker' which is a time stamp when data is transmitted or received by any hub, node device, or of additional certified devices not listed, until it reaches a destination. Each data in or out the same data transmission is encrypted by from each device as it moves through additional ecomm-devices until arrives at a destination point of rest or continues on as data is moved again and may be decrypted later. Data standardization of message sets are pushed that may be acknowledged and verified beforehand, there is no pull—there are security risks, since data intrusion or injections may mix with pulled data, and this is known avenue for hack attacks. Once excepted from a ecomm-device, tMarker is generated on entry/exit, each ecomm-device transmitter, receiver, transponder or transceiver iMarks data string; wherein verifications are learned from prior string or picked up by a ecomm-device it was sync-d upon registration, creating 'tRoute Marker'—TRM is generated—no exemptions rule as being able to change permission rights from read only accessibility privilege for each successive ecomm-devices entry to TRM that shows t & t2Marker, along with Longlatilt information audit trail for next device that touched data and simply adds to data-string. During entry or exiting an integer device within next ecomm-device adds a new marker to existing string, such completed string once arrived at a server location is verified, re-verified against previous or next data string from surrounding ecomm-device data strings for security of datas integrity. By generating that one unique completed 'tMarker' also known as traffic marker, each time upon being passed-on, moved unto next device and finally comparing that sync'd match Paired-Key set assigned within OSVx transmitted from NOS for this exact ecomm-devices ID, which is also hardcoded in NOS that generates 'tRoute Marker ID #' with a specific time-stamp as it enters and exits any type of device, certified ecomm-devices or electrical-mechanical device. A simple coded device places time-stamp called an 'integer device' places a encrypted 'precept to time stamp'-'ecep' for each data string that passes through device, which is none modifiable. Wherein $OSV^x$ verifies each 'tRoute Markers' entry and/or exit markers precious time, Longlatilt along with previous ecomm-devices unique identification compared with time of being registered and sync-d within any given infrastructure, data-string may encompass a binary code rapper creates a unique ID that may be displayed or encrypted then tokenized for secure transmission; wherein datum, data sense, datum, traffic markers strings exiting ecomm-devices are encrypted.

I[F] received data from a particular ecomm-device does not match then data string is discarded or dump entire transmission, until matched markers from surrounding vehicular data from additional tVectorHubs, SentryBeacon-Hub, vector-hub class or node-class ecomm-devices in same vicinity, or that detect none sync-d/registered vehicles, transmission anomalies or has detected a comprised Obvipro's, non certified devices, process continues to attempt to located a match point, in doing so creates a new marker archived for next comparison index, this marker is continuously compared to surrounding data flowing through each ecomm-devices randomly generating a marker index. Therein another phase of security protocol protecting data composition integrity flow.

Another pre-configured preferred embodiment in each vector-hub class or node-class ecomm-device, example: Obvipro, pAvics or additional certified compliant ecomm-devices transponder comprises iLinkup process. Once ecomm-device is energized within domains infrastructure, data transmissions encompasses another unique security identification process. Wherein the transponder sends an ID # in certain areas enclosed or surrounded by an encrypted rapper, such data string, for example every 5th character has this unique ID # string that may be binary or encapsulated within or encrypted, transmitted to one or more randomized positioned ecomm-devices for security; wherein ID # character is encrypted hardcoded within NOS, also sends to specific surrounding SentryHubs within domains area continuing to maintain foundational principal that further enhances a monitored infrastructure. Therein forming a structured network architecture, foundation of datas intelligent telematic reliability.

A preferred embodiment further enhancing use of a transponder within each Obvipro; each vehicles transceiver receives instructions from iNavCom center vehicle is in secure point-2-point communication with; wherein each vehicle ecomm-advice directives from the secure virtual vehicle navigational system transmitted signal sent to surrounding vehicles, instructions received by at least one vehicle or a cluster of vehicles within a mass provide a determined distant factor vehicle in front, behind or beside configured to maintained calculable distant phase position in direct relationship with velocity; wherein those vehicle on sides are directed to maintain a similar phase factor relationship; wherein if a vLaneDrift is detected by at least one adjacent vehicles Ultrasonic telemetry-devices transceiver sends the vehicles Obvipro's system notifications; wherein the Obvipro's system transmits a corresponding transponder signal initiates from approaching near to adjacent vehicles migration; wherein drifting vehicles response warns near vehicles Obvipro and further transmitted to one or more VD's within a mass or a clustered-mass confirming to adjust accordingly.

Allowing data to flow over internet holds many security risks like unrestricted access points for code injections currently occurring now, arbitrary attacks from unknown areas and soon on. Thus there are known shortcomings in an open environment transmitting traffic data, such that data itself is not safe or has serious implications to data capacity to be trusted. Restricting datas environment within a closed or semi-closed channeled architectural infrastructure is not only safer, its easier to manage by controlling entry or access points. Since each ecomm-device is linked-up to other ecomm-devices from authenticated access points, in turn moving data across vector-hub class or node-class ecomm-devices with their on private IPv # for each municipalities, example: Austin, Tex. traffic infrastructure hubs and additional certified compliant devices not listed uses a portion of Ipv8 set or may use designated portion of IPv6, that have been not only sync'd and registered with all ecomm-devices, including registered vehicles within each domains infrastructure within surrounding areas, are assigned remaining reserved IPv #; where separation of navigational vector-hub class or node-class ecomm-devices maintain a dedicated primary defensive perimeter, in other municipalities, counties or countries infrastructure completes channeled telematics first line of protection, the quintessential element of the secure virtual vehicle navigational systems application. Arbitrary maliciousness is easily discoverable, especially since each device will only communicate with other iLink-sync'd authenticated/registered vector-hub class or node-class ecomm-devices, completely ignoring others and transmitting these anomalies to sentry, sentinel or of additional certified compliant ecomm-devices not listed.

Another security aspect comprising implementation similar to Mac address comm-links, is to allow or deny access rights primarily based on ecomm-devices SHID ID # in combination with vector-hub class or node-class ecomm-devices ESN number or other unique vector-hub class or node-class ecomm-devices ID tag either in binary code encrypted, enclosed in a encrypted rapper, generated by mathematical or conceptualization methodologies, wherein this unique code string is created for Authentication or Authorization for data transmission acceptance to or from any vector-hub class or node-class ecomm-device, from/to servers or of additional electrical mechanical or virtual interfaces not listed. This protocol is setup within, upon the vector-hub class or node-class ecomm-devices first transmission to one or more vector-hub class or node-class ecomm-device during initial deployment being energized after registration/sync-d process.

Additionally each stationary vector-hub class or node-class ecomm-device have a corresponding Longlatilt assigned to each SHID # at deployment, increasing security and allowing channelized communication protocol enhancement as to data integrity transmission levels; wherein at least one or more Ultrasonic telemetry-devices sensors are built into or attached to vehicles front, rear and sides, preferably two on each side positioned at top of apex of each fender, or at other locations on a vehicles body based on vehicles designed parameters, parts of the Ultrasonic telemetry-device are embedded into vehicles body surface area covered by a protective compartmentalized clear or not protective covering; and each Ultrasonic telemetry-devices sensors attached to or built into vehicles body are built to change there angles of transmitted signal waves or wave by a command from iLink-sync'd Ultrasonic telemetry-device securely communicating with vehicles iLink-sync'd Obvipro or portable pAvics software application; wherein Obvipro's non-transitory computer-readable memory mediums, or pAvics downloaded softwares application stores at least two or more coded programs to perform a generation of a continuous sending of a pulsating signal an ultrasonic wave or waves to be transmitted from one or more of the sensors on sides of vehicle that humans cannot here comprised of echolocation, embedded within signal wave or waves includes the sending of vehicles unique identifiers, wherein the signal wave or waves are of at least one defined frequency transmitting by either a transmitter or transceiver or both at the same time for redundancy, or for backup purposes comparing each as to accuracy of a detected or determine surrounding stationary or mobile objects, structures or vehicles not equipped with Obvipro or pAvics software application confirming GeoiLoc continuously, performing the recording of the determined time space geolocation position of the signal being sent or resent to a receiving vehicles Ultrasonic telemetry-devices sensors detected and read by at least one receiver or transceiver, or both the receiver and transceiver for redundancy with the recordings of both time distance being compared, and continuously comparing by one or more programs built in each Obvipro the signal wave or waves returned, reflected timed of the wave or waves response back from surrounding objects or iLink-sync'd vehicles; wherein vehicles Obvipro computes a measured timed distance continuously based on the time of signal wave or waves being sent compared with the time being reflected, received or transmitted back from the vehicle that received the sent signals wave or waves; wherein the iLink-sync'd vehicle receiving the pulsating or continuous signal wave or waves transmits back to the sending vehicle a time marked response signal embedded within signal vehicles unique identifiers, that may pulsate or not that is detected by at least one receiver or transceiver of the Ultrasonic telemetry-device sensors on one or more sides of sending vehicle marking the recorded time space geolocation position the signal wave or waves being sent from a surrounding vehicle, returned or reflected back the wave or waves detected and read by at least one receiver or a transceiver communicating with on at least one secure P2P Wi-Fi connection with vehicles Obvipro's ecomm-device or pAvics downloaded in smart-iDevices, or of additional devices not listed that includes an internal or external ecomm-device built with or attached to the RFIDGPS Module built into or attached to semi-autonomous vehicles communicating via a secure P2P Wi-fi connection with downloadable pAvics software application; wherein the sending vehicles transmitted signals wave or waves are time mark at time of sending continuously comparing with a vehicles timed marked response or the return of the wave or waves being received back recorded in vehicles Obvipro's or pAvics memory medium, transmitting at timed intervals or not to the secure virtual navigational system; wherein two or more vehicles are continuously being triangulated randomly transmitting to surrounding iLink-sync'd vehicles, or additional ecomm-devices not listed at timed intervals or not, triangulating with one or more vector-hub class or node-class ecomm-devices, iMechanizm or a human that is carrying a smart-iDevice, or additional devices not listed that are built with or downloaded the software application recording a verified confirmed geolocation or Phase-change spatial position transmitting vehicles, smart-iDevices, or additional devices not listed there GeoiLoc data to surrounding iLink-sync'd vector-hub class or node-class ecomm-devices, vehicles ecomm-device, or to additional devices or ecomm-devices not listed at timed or not intervals assisting in maintaining constant spacial distance between vehicles, motorcycles alerting on a display there proportional location, being sent to the secure virtual navigational system continuously; wherein preferably a Ultrasonic radar-telemetry device or Ultrasonic telemetry-device, or both built as one component unit device for redundancy or additional security built into or attached to a vehicles body on front and rear areas detecting, monitoring and verifying the distances either between vehicles or of at least one object that may be an animal, human or another vehicle; wherein the detection of a rear or frontal impact, near to or approaching at an excessive speed, Obvipro's system controller or pAvics software calculates whether the vehicles recordings being received updated by the secure virtual vehicle navigational continuously or at timed intervals of a vehicles braking distance capabilities or capacity of said vehicles braking system at any speed can stop or slow down the vehicles approaching speed to prevent a rear end impact or frontal area of the approaching vehicle or an object safely, if not then Obvipro's system controller initiates a signal message be sent to autonomous vehicles iCP, or pAvics advising semi-autonomous vehicles human driver to slow or stop approach speed, or autonomously initiating the instructions by autonomous vehicles guidance system to execute one or more stored directives instructing iBS or by user/driver advising audibly or visual instructions or the autonomous executions of the instructions, or both warning or announcing the human driver, operator virtual or not of a pending sequence execution that vehicle is danger close or has breached a close proximity threshold based on each vehicles updated braking attributes of an approaching vehicle in frontal area or rear an excessive speed or angle brace for sudden impact, abrupt deceleration, a maneuver to prevent impact, or of additional maneuvers not listed; wherein Ultrasonic radar-telemetry device or Ultrasonic telemetry-device transmits a message signal to be sent to an approaching rear or frontal vehicle, where approaching rear or the frontal vehicles Obvipro's system controller or pAvics software initiates a similar sequence execution, transmitting each vehicles recordings continuously being sent to the secure virtual vehicle navigational; wherein the secure virtual vehicle navigational performs calculated analytics on what, when, why or how such event took place along with a determined forecasted probabilities to prevent similar events from happening.

A pre-configure preferred embodiment in data transmission for vehicles equipped with Avics or portable devices equipped with pAvics or of additional certified ecomm-devices not listed, data transmissions can be selectively chosen from forecasting travel distance exciters pre-configure within each Obvipro's ecomm-device to send data locational informatics, engine performance diagnostics and other data facts can be requested or sent from per-configured intervals within Obvipro's NOS or as the secure virtual vehicle navigational system requests Obvipro's system variables such as reminders for inspections status results preformed in real-time and insurance renewals audible or with visual indicators on TVA interface. Such data relating to engine performance has pre-configure time intervals for transmission time frames, that is O2, CO2 level data and additional mechanical performance operational attributes initial benchmark is sent after vehicles link-sync'd pairing with certified vector-hub class or node-class ecomm-devices equipped with Avics iChipset, iChipset$^X$ or a AiChipset within predefined interval of engines run time. Followed with two or more pre-set transmission intervals, example: when vehicle is idling, at various low speeds, during heavy congested traffic situation, carrying heavy loads, at high speeds, and requesting additional transmissions based on archived historical data for comparative analysis with other similar type vehicles, further advising one or more drivers through iVoiceCommands or virtually on screen for consumption momentum rate. Wherein additional vehicle items such as maintenance concerns, exterior marker lighting problems and other engine data informatics, collections have similar sequential transmission patterns; wherein different types of vehicle data transmits through certain types of hub-devices for additional security within infrastructure by a sub navigational system framework (subnaysys). Fuel remaining forecasting consumption data, transmitted in run-time or distance, since the secure virtual vehicle navigational system systematically knowns consumption level at all times due to the secure virtual vehicle navigational system calculated speed variables adjusting traffic compression in proportion to relative phase-change artifacts; wherein the secure virtual vehicle navigational system learns to request additional data from vehicles based on engine influence or feature factors, ergo propulsion consumption, vehicle responsiveness, weather telematics, x2factors, or of additional items not listed.

Further, within a random transmitted data strings, their is a Sentinel-Code that detects attempted code injections during each transmission received. Once this data-string and enclosed Sentinel Code is excited by disposition of datas string enclosed, data string is ear marked useless, upon arrival and accepted by next telemetry-device transmitted data is iLink-sync'd with, data string and those that follow are transmitted to closest server automatically induced by said excited-code. Server sends back acknowledgement to continue transmitting data-strings from surrounding telemetry-devices, until anomalies stops compared with original data-string that excited Sentinel-Code detected.

FIG. 1 comprises a 'Drone Intrusion Detection and Disruption' system apparatus in accordance to protect a calculated vector area, stationary or mobile devices listed herein and their associated embodiments. Device is equipped with at one non-transitory computer-readable medium further comprising a computer device in communication with at least one configured Yagi or other type receiving antenna to detect at least one directional determined signal using TSF between each iVS device, stores at least one program code within at least one iChipSet system apparatus controller, configured with one or more technologies constructed of nano, micro, or micro nano or combinations thereof for each internal device; wherein one or more programmed instructions comprise one or more bit sequences radiated as a interference signal disrupting drone controller; wherein one or more code sequential signals may encompass one or more embedded algorithms based on frequencies variations to instruct a response signal directed to drone to move away, based on drones signal capabilities whether in strength and/or fluctuations in navigational guidance signals, executed by at least one correlated and or corresponding algorithmic response from at least one computer medium embedded on at least one iChipset, iChipset$^X$ or a AiChipset that may be stacked onto each other, preforming protective sequential or not processes to prevent unwarranted signals, to communicate with system additional iLink-sync'd ecomm-devices with instructions to activate similar intrusion detection mode; processor is initiated by antenna reception abilities, detecting frequency transmission of any type, causes one or more processor (iChipset, iChipset$^X$ or a AiChipset) to perform internal coded methods to protect, defend off and guard against malicious transmitted signals intended to do harm, invade the privacy of for at least one transmitting device, certified or not listed herein, or any other personally owned property, e.g a house, office and tangible or not property including land or vehicles; attempting to disrupt any type communication, example: radio, shortwave, voice, digital or not and further covering full telemetry spectrum in communications known now or contemplated to transfer any type data-facts, voice, morse code, short-wave code encrypted or not to preform and protect a GeoiLoc vector area; wherein iVS's are built with long or short range radar antennas, or both that may be stacked or not, or at different positions near to each other, having a convex shaped gently rounded from top to bottom of not less than 110 degrees built of a curved convex length not being less than twenty four (24) inches in over all length, width (top to bottom) being built of a curved convex shape of not less than 140 degrees being designed to detect low to surface approaching drones in the air or on the ground by each of long range antenna; and short range antennas are built in a curved convex length or width as long range antennas designs are of not less eighteen (18) inches on short range antennas; wherein configured placement of long range antennas are positioned on each of the six (6) outer points of each triangle similar to that represented of a Star of David, or of additional shapes not listed, example: a pentagon each apex built with a long range antenna within pentagons of the five angles apex built with five short range antennas, or a pentagon being configured within Star of David; wherein each apex point may be built with long range or short range antenna; wherein long range radar antenna movements sweeps are timed intervals of not less than 180 degrees outward detecting range of not less than 200 meters plus between each apex points of each of six (6) outer points the stars apex point, crossing over back and forth between the stars apex points on either side of each stars apex point, short range antennas sweeps at random intervals of 360 degrees, or of sweeping side to side of not less than 180 degrees of an outward detecting range near to 250 meters plus continuously overlapping long range radar antennas rotation paths, or sweeps in 180 degrees outwards of center of star being excited by at least one ultrasonic-microphone array built of a horizontal curve below or above either the long or short range antenna, or at least one ultrasonic-microphone continuously rotating on each iVS device.

Wherein in the event of a drone intrusion of any nature, system is capable of or programmed to first detect, then comprises calculable determined controlling signals transmitted to and may report event signals transferring data-facts to the secure virtual vehicle navigational system apparatus via one or more Vector or Telemetry-Hubs, Repeater Towers and additional certified sub hub-class devices or sensors. Wherein such engaged signals transmitted from drone electrically/mechanically or humanly controlled, whether in air or on ground; wherein one or more SentinelHubs, TelemetryHub, a SentryHubs, tVectorhubs or additional SubHub-Class, certified telemetry-devices alerting or awaking tracking of internal control signal or signals that are dispensed or that imitate a drone attack, to detect active frequencies attempting to disrupt one or more devices and their fly over or near to iNavCom centers, a business or a home communication center; where a configured program determination blocks signals of a drone devices communicative or operative signals, whether driven or controlled by human or another drone, may disable device permanently or temporarily based on aggressiveness from damaging signals or any further attempts; wherein those crafts-persons skilled in such art, understand there are many combinations to allude ecomm-devices like Sentinel-hubs, Beacon-hubs or sentry-hubs or combinations with other devices listed herein, that may be attached to or joined as one device with; at least one tVectorhub or any other type of sub hub-class ecomm-device: wherein such threats are located as to source using TSF, whether it's a disruption from any type communication enterprise capabilities, example: electronic mobile devices, electric lines, cable, copper lines or via satellites.

Each iVectorShield (iVS) device's antenna is constructed in variations as necessary based on strategically configured deployment position, range or planned disruption protection vector area; wherein each incorporates at least one Yagi or other types of omnidirectional or directional antennas known now or contemplated or in research, each iVS may be equipped with at least one of each; wherein calculable determination of a zone and/or breadth devices are defending; wherein antennas power level is FCC compliant yet optimized for protection zone within an area of fortification; wherein internal system control initiates at least one overriding and matched deterrent signal transmissions; wherein other iLink-sync'd devices of similar or equal to capabilities receive and transmit activation signal instructions to initiate surrounding iVS's by at least one iVS's system controller or other certified ecomm-device within determined configured area, initiate similar blocking whether in a symmetrical and/or asymmetrical configured pattern, recording drone signal and other communication radio waves transmitting same to system RF amplifier, further sub hub-class devices iLink-sync'd with or equipped as a combination with, example: tVectorhubs, SentinelHubs, a Vehicle-Domain equipped with at least one iVS, protecting data transmissions to at least one other ecomm-device in secure point communication (SPC) with the secure virtual vehicle navigational system, device may use various programmed encryptions protocols or techniques during this heightened level, that may use Repeater Towers, one or more vehicle-domains or other certified devices to transmit drones collected signal or signals to protect a guarded device, or ecomm-devices.

Figure 2:
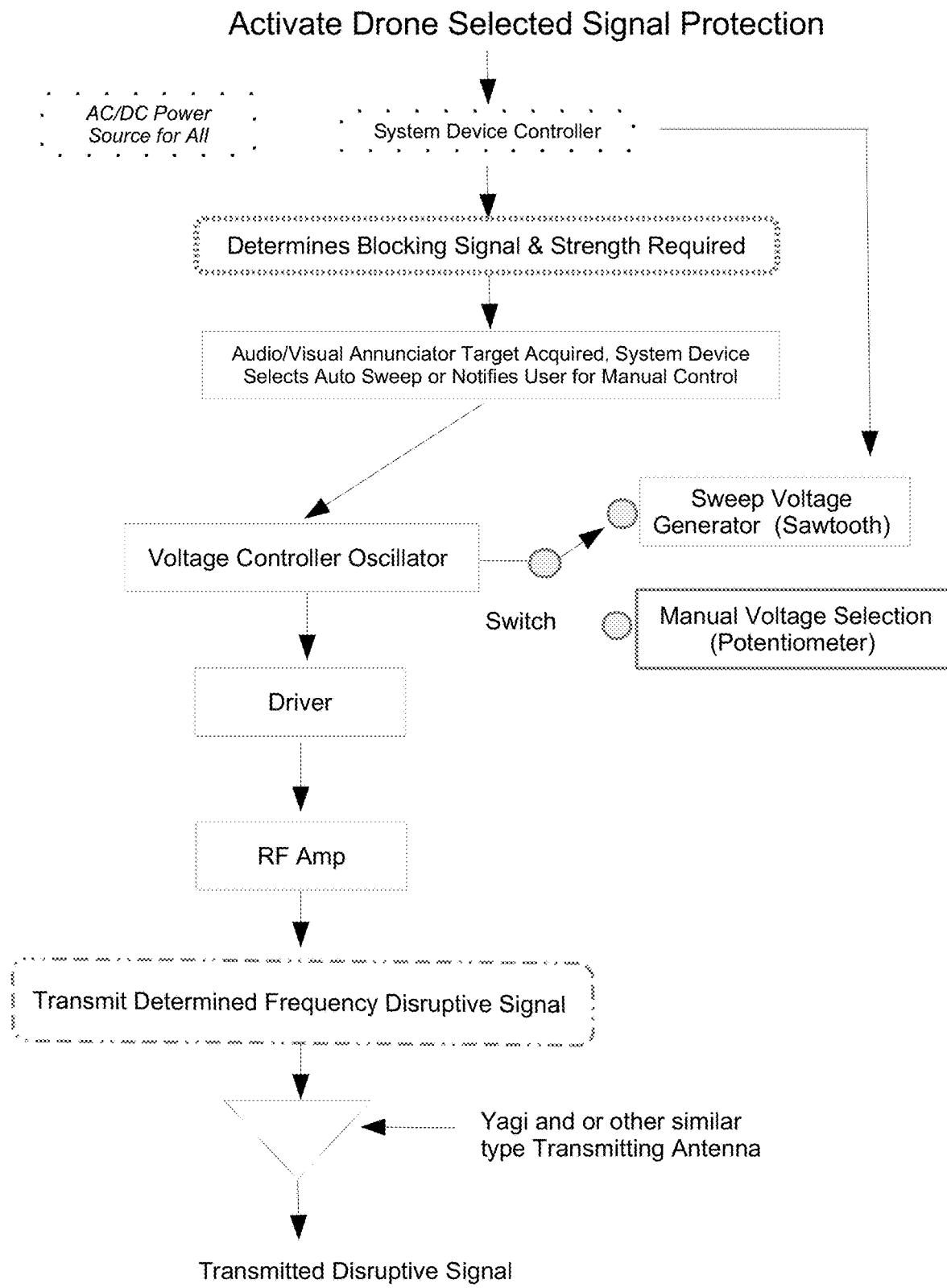
FIG. 2 an electrical circuitry example device selected signal activation protection against one or more drones.

FIG. 2 provides an assimilation consistent with one or more processes herein within one or more non-transitory computer-readable medium further comprising iVS system controllers embedded within or attached thereto each iVS device; wherein each iVS system controller further comprises a Nuclex Operating System (NOS) performing communication functions similar to ecomm-devices, and of additional functional attributes not listed that include the FRIDGPS Module; wherein each configured element within iVS is constructed of deferring elements, signal strengths, programs, of additional programmed procedural or procedures not listed; wherein each iVS device elements may be built on nano, micro, micro-nano or nano-micro component circuitry construction; wherein devices consistent with an embedded embodiment of at least one non-transitory computer-readable storage medium device known now or contemplated for future use to store data, at least one program code within iVS system controller; wherein one or more program codes, when executed by at least one computer iChipset, iChipset$^X$ or a AiChipset (that may be stacked on top of in one or more vertical and/or horizontal angled configurations with primary iChipset, iChipset$^X$ or AiChipset in calculable manner, built with one or more iChipset, iChipset$^X$ or a AiChipset within each device) preforming protective sequential or not processes activating a signal or an array of radio frequencies that may be encrypted, to disable transmitted communications that controls, navigates, maneuvers a drone whether in air, on ground or a mobile device; and partially or fully cause device to loose avionic control by the iVS system controller, human, another drone or by a machine made decision, whether functioning with A/C, using at least one zPanel or D/C power and to, either activate other protection equipment or at least one more iVS devices combined with a Sentinel or a SentryHubs, tVectorhubs or other SubHub-Class and certified ecomm-devices; wherein the exponential power of at least one iVS or a combination of many iVS's can take down, disable, to prevent or to cause lose of avionic control disrupting one or more traffic control communicating devices, radio communications or those areas or of private devices within a public domain or not, whether on ground or in air-space, preventing disruption of in transmission or reception of images, audio surveillance from drones, or from within a protected infrastructure in direct communication with the secure virtual vehicle navigational system, other iLink-sync'd encrypted or not communication devices, items listed within FIG. 2 is only a representation of one construction approach; wherein enhancing comprehensive protective embodiments in a linear or non-linear representation thereof and further activating at least one iVS asymmetrically or symmetrical pattern in sequential or not activation of subsequent protective equipped elements within at least one iVS's. Each element, voltage regulator, switch to change from or to manual voltage selection that can be controlled by another device, a human or a central control point, at least one iNavCom Center or internally within one or more sub hub-class device, vector-hub class or node-class ecomm-devices under attack; wherein there may be one or more voltage oscillator controllers or voltage oscillators, drivers, potentiometer, generator (sawtooth or not), at least one capacitor device, or an energy storage device that stores electrical energy performing a controlled discharged rate by one or more controllers within iVC that increasing frequency or frequencies output transmitted level to completely disable an attacking or approaching drone devices protecting a home, business or any other type of communication devices within a domain networked or not or at least one infrastructure within a homes property, a business complex or any other communication infrastructure that transmits and/or receives encrypted or not datum, data or sense datum.

Each iVS devices radio frequency amplification capabilities are concurrently constructed in directional relationship with zoned area or region deployed forecasted coverage; wherein iVS's are built with both at least one long range radar and at least one shortwave or short range radar, or both shortwave or short range radar built with a plurality of antennas that are omnidirectional, directional designed to move in a circle around an axis or center position transmitting a signal frequency or frequencies that may pulsate or not at different strengths; wherein iVS devices are built as a hovering iVS drone device built with a plurality of zolar-cells or zolar-cell modules on outer surfaces stationed at three of more iVS station locations a landing station; wherein each devices primary power source uses advanced one or more zolar-cells on one or more zPanels or alternating power dependent on location (remoteness), availability or of the self-sustainability need or both; wherein ecomm-device receives intermediate frequencies, and may be capable of detecting continuous pulsations that may or may not be encrypted; the mixer is capable of recording and merging received input signals that may use a transponder, Ultrasonic device, Ultrasonic radar-telemetry device or a combination of each, transmitting a disrupting signal that may or may not pulsate the signal, or of additional devices not listed to pinpoint an abusive transmission, transmit such anomalies to at least one other ecomm-device or the secure virtual vehicle navigational system via at least one iLink-sync'd server; wherein the secure virtual vehicle navigational system transmits area wide alerts, requesting devices within warranted areas domain moving into a heightened transmission level; wherein each iVS devices system controller (AiSyscon) makes calculable determination or recommendations that are embedded within each iVS devices system controller upon detections, waiting on iVS system controller to verify the readiness of surrounding ecomm-device or ecomm-devices received signals calculating resulted sequential frequency or frequencies detected that may be altered to increase signal, intensifying telemetry amplification, directional transmission or transmission frequencies from at least one oscillator to block attack; wherein iVS system controller receives data-relics of drone ID frequencies that may be know to be used to target these approved frequencies or to transmit selected frequencies aimed at attack frequency or frequencies, iVS system controller may choose to do both block signals transmitted and devices operative avionics transmissions; wherein AiSysCon adjusts frequency or frequencies strengths as needed, determined by the secure virtual vehicle navigational system (Xgenx), or an operator user determination based on threat accessibility, assessment determination, based on influx of data transmissions from surrounding telemetry-device or Ultrasonic telemetry-devices or beacons combined with iVS.

Figure 3:
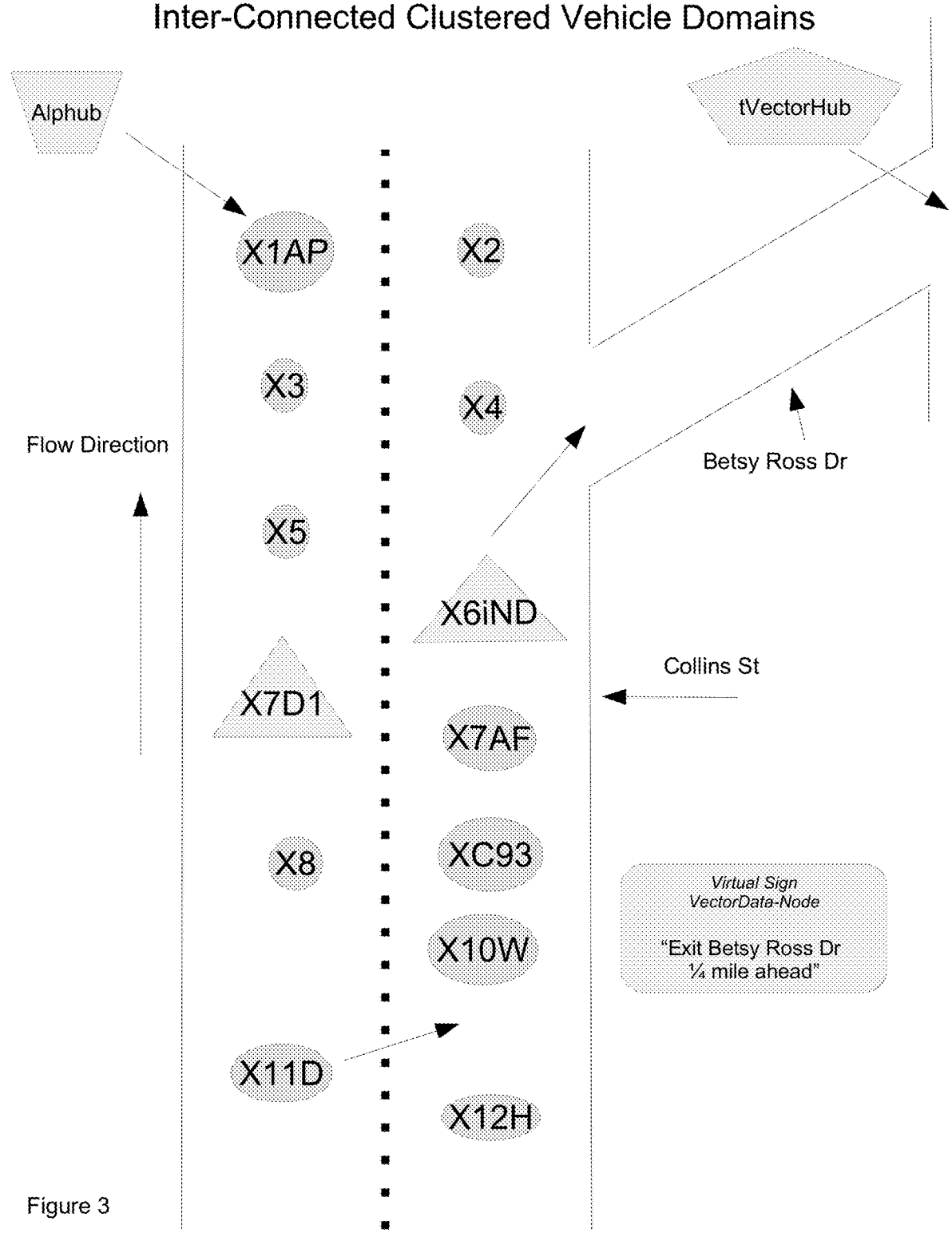
FIG. 3 illustrates telemetry mobility distribution within at least one domain-district in communication with one or more inter-connected vehicles or vehicle-domains, iNetworked Domain within a specific infrastructure within a iConnected municipality.

Herein after pictorial paradigm representation of figured details for 1 & 2 above for those skilled in this art each device within; the mixer, antenna, detection of frequencies and amplification thereof, audio/visual annunciator, power supply, capacitor, energy storage device, or of additional items not listed herein within iVS and to activate determined blocking frequency, each device or its processes can be repositioned in its sequential event and/or combined to reduce devices size and structured configured processing events from at least one a non-transitory computer-readable medium computing device connected to at least one storage medium of various industry types comprising one or more, example: antennas detection can ready one or more interconnected zPanels configured to supply power waiting on Artificial Intelligent System Controller (AiSysCon) to decide which frequency transmit that may be confirmed by the secure virtual vehicle navigational or one or more AiProgram (AIP) running in background overseeing AiSysCon, may further request authorization from iNavCom or a user; or audio/visual annunciator announces received from at lest one iLink-sync'd telemetry-device to activate determined frequency detected, to transmit or receive communications from and to with sequential events to alert other iVS's iLink-sync'd with and/or to determining each telemetry-device affected by attack from iVS's embedded processes or to wait instructions from system or both, may be combined with at least one configured Ultrasonic telemetry-device to determine phase-change or spatial locations of any attacks; wherein AiSysCon's AiPrograms incorporates a plurality of clustering algorithms of a machine learning techniques, comprised of: K-Means Clustering, K-Means, Mean-Shifting Clustering, Density-Based Spatial Clustering of applications with noise (DBSCAN), Expectation-Maximization (EM) Clustering using Gaussian Mixture Models (GMM) or Agglomerative Hierarchical Clustering; wherein one or more of the aforementioned algorithms may be combined with each other or ran independently comparing results to determine a frequency generating at least one decision activating a frequency, task, to perform modifications in overlay models modifying navigational directives, or of additional items, processes, procedures, events, decisions not listed herein; and wherein each ecomm-device $OSV^X$ and iVS's AiSysCon's is composed of one or more AiPrograms comprised of a plurality of machine learning algorithmic techniques as mentioned above; wherein at least one AiProgram is embedded or composed on at least one quadrant of either an iChipset, $iChipset^X$ or AiChipset on each of four divisional primary quadrants; wherein each divisional quadrant may be divisionally divided into at least four additional quadrants, each of four divisional quadrants on each quadrant composed of one or more of either the iChipset, $iChipset^X$ or AiChipset; wherein each divisional quadrant is composed of with at least four or more subsequent quadrants composed above or below each divisional quadrant; wherein each of the four subsequent divisional quadrants within each divisional quadrant composed of at least one of either the iChipset, $iChipset^X$ or AiChipset; wherein each iChipset, $iChipset^X$ or AiChipset composed on each primary, divisional or subsequent quadrants composed of at least one AiProgram; wherein each AiProgram comprises at least one AiXCoded-Program or AiCoded-Program each comprised of an finite amount of decisions with one or more alternative decisions for each finite decision to be made based on the following: climatic conditions, density-based factors, iXfactors—where X equals semiautonomous or autonomous vehicles navigability attributes, reactive responsiveness of a human/user driver or the autonomous vehicles guidance system, or of additional element not listed; wherein each AiXCoded-Program or AiProgram performs at least one process composed within each iChipset, iChipset$^X$ or AiChipset performing at least one AiTask, AiEvent, AiProcess, AiProcedure, AiSequence or AiSequential AiProcedure or a AiTask, AiEvent, AiProcess, or of a additional items not listed; wherein vehicles processes are generated from the received navigational executional directives stored in each vehicles ecomm-devices memory medium, processes generates audile or visual, or both navigational commands to be executed by a human, user or the autonomous vehicles guidance system; wherein performance of the aforementioned are executions of a plurality of stored navigational maneuvers in vehicles ecomm-devices memory mediums; wherein each AiTask, AiEvent, AiProcess, AiProcedure, AiSequence or AiSequential AiProcedure or a AiTask, AiEvent, AiProcess are calculable by at least one AiXCoded-Program or AiCoded-Program to react to with a determinate predicated outcome, verified by the secure virtual vehicle navigational system, continuously updating stored navigational derivatives being stored in vehicles ecomm-device as the secure virtual vehicle navigational system determines braking deteriorations, or of additional items recorded adjusting navigational executable decisions to be performed by the AiXCoded-Program or AiCoded-Programs have set parameters to be executed based on current navigable circumstances, or of additional detections not listed as a result of performance attributes of each semi-autonomous or autonomous vehicles custom reactive maneuvers, example: maintaining a calculated spatial-distance at any speed with vehicle in front based on current density factors, or vehicles braking capacity capabilities, or of additional vehicle system items not listed being update for each vehicle modifying said navigational derivatives;

FIG. 3 depicts a paradigm of a system calculated determined inter-connected clustered vehicle mass; wherein X1AP vehicles iCP has transmitted request for fuel, due to driver entered a data-set from iTouch$^X$ voice command inputs instructing iNavX2 vehicles programmed route home would change in response to a call from his wife, requesting stop by planned grocery store location, that was already in vehicles RDG; wherein the secure virtual vehicle navigational system recalculated his current trip analytics determining fuel would be needed for tomorrow trip to and from work prior to the secure virtual vehicle navigational system acknowledged request this vehicles IDT # was X1D initially assigned when transport or vehicle became authenticated, its IDT # morphed due to a signal from a positioned AlphaHub combined with tVectorHub transmitted driver choices in one or more available fuel nodes with corresponding directions; wherein the secure virtual vehicle navigational system determined earlier by calculations was assigned mVector-Domain miles further back as previous identified MVD transport or vehicle pilot reached its turn off or exit position; wherein the secure virtual vehicle navigational system recalculated those vehicles within groups mass certain vehicles were registered to were calculated to move further beyond any other vehicles within same group exit points.

Since X1AP calculated destination was modified by driver determined by the secure virtual vehicle navigational system calculated artifacts; wherein one or more computer systems re-calculates individual routes based on vehicles clustered-mass or individual vehicles, choosing new MVD (mobile vector domain pilot can be a transport or vehicle of any type, human, bicycle or a motorcycle, example: two, three wheels or a hovering device) within this same clustered-mass; vehicle IDT # X6iND was determined at its chosen programmed route option upon registration within vehicles route directory guide (RDG) for this particular vehicle, calculations determined by the secure virtual vehicle navigational system would be next inline to become primary MVD lead pilot unbeknown to driver/owner or operator virtual or not. However driver in X6iND is a sales person and needed to change his route due to a call from a client nearby exiting onto Betsy Ross Dr., driver spoken command opens iVocX identified new destination point; wherein the next MVD was also calculated at registration within his primary living domain once transport or vehicle was authenticated, when ignition was activated. Since IDT # (identified transport) X7D1 entered from another roadway, the secure virtual vehicle navigational system kept IDT # because prior IDT # X7D left current trajectory iRoute at a predetermined phase-point in time chosen for its route to work.

Each or vehicle behind X6iND once route was modified, the secure virtual vehicle navigational system transmits ecomm-advice directives to each Obvipro, pAvics or smart-iDevices providing directives to iCP within each transport or vehicle to decelerate maintaining spatial-phase distance between each forward or adjacent vehicles, except for IDT # X10W; wherein this vehicles route determined program was set to move into right lane at this spatial point, preparing for exit on next off ramp.

All other vehicles: X2, X3, X4, X5 and X8 are programmed to continue on their programmed iRoute being iLink-sync'd with or to purposely maintain configured spatial proximity distance with surrounding vehicles iLinked clustered-mass; wherein each Obvipro, pAvics or smart-iDevices systematically at timed or in relationship to velocity transmit a transponder connected to the Ultrasonic Telemetry-device a selected signal transmitted to each vehicle within their predetermined clustered-mass, based on vector points according to which lane transport or vehicle is currently in. Therefore, vehicle X4's Ultrasonic telemetry-devices, transponder, echolocation, transceiver, or of additional devices not listed for redundancy transmitting or sending to areas of in front, back, side includes the FRIDGPS module surrounding the vehicle enclosed within a radome where only dome is visible; wherein each vehicles within this clustered-mass further responds back to each vehicle transponders Ultrasonic telemetry-devices signal or Ultrasonic waves to verify a spatial distance to be maintained between vehicles an further transmits to the secure virtual vehicle navigational system a confirming spatial-location distance for future calculations as to phase-change spatial positions in a future time-space, that may be of different frequency for security reason or safety concerns; maintaining the secure virtual vehicle navigational system calculated spatial distance between each vehicle, iXfactors relationship to X2Factors, vehicles (X3) factors, telemetry capabilities and climate and/or topography conditions.

Just behind X6iND is X7AF, this vehicles driver is on vacation; wherein family consensus is time to eat; driver opens iVocX icon displayed on iNaVX2 primary screen application, further clicking on alpha icon 'O' encircled within; wherein ONDA directory opens displaying requested specific food type restaurants, data-set is transmitted to a near VectorHub, that may also be a AlphaVectorHub configured with linked to a iLink-sync'd server near by and in communication with at least one AlphaHub further up road assigned to or requested by the secure virtual vehicle navigational system and/or designated within or not a VectorHub only to transmit specific data-relics family member requested; wherein data-relics provide verbal and/or visual recommendations, seen on iNavX2 toggled interface; wherein the application itself is viewable as an icon on any vehicle equipped with the ability to add new applications, the icon is 'X2' enclosed within a circle, providing alternate routes along with trip analytics for business tax write offs; wherein the secure virtual vehicle navigational system further allows driver/owners ability to be polled on various structured formatted questions, after rendered services of any type merchant in consideration of an opinion and/or vis-à-vis, if accepted; wherein the secure virtual vehicle navigational system randomly or periodically requests from a vehicles driver or users of whether or not either their vehicle is equipped with ecomm-device or smart device has installed pAvics current downloadable application: a survey of the performance of the secure virtual vehicle navigational system, vehicles performance attributes including guidance system, Mi911 services, navigational directives, local or region advertising or of from additional items not listed providing information Empowering Transparency of Service; wherein Mi911 services provides one or more selectable languages chosen by user during setup of the Mi911 services; wherein results are viewable or displayed, or both by additional ecomm-devices for each polled merchant or driver/owner, providing a identifier as to comments from vehicles owner/driver may be anonymous as to name or simply a generated ID # of the vehicle ecomm-device, smart-iDevices or smart devices; wherein ecomm-devices, smart-iDevices or smart devices are built with or have downloadable a QR code reader integrated with vehicles ecomm-device, smart-iDevices, AiDevices or smart devices camera, where vehicles ecomm-device, smart-iDevices or proprietary AiDevices, includes at least one camera linked and paired with ecomm-device that includes RFIDGPS Module that includes the downloadable pAVics application; wherein driver or users can place their vote for local, state or federal elections; wherein the data information to be voted on is sent via an encapsulated encrypted data push to each paired and linked communications apparatuses (ecomm-devices) SHID, or of additional ecomm-devices not listed, the ecomm-devices VIR display is also paired and linked to the linked and paired communication apparatuses (ecomm-device); wherein each content, page virtual or not upon entering a choice completion verified by voice or biometrics prior to transmitting voted on items; wherein the vehicles owner, driver or user is sent a request to vote at a time when the vehicles owner, driver or users trip or iRoute begins or ends, of the vehicles owner, driver or user can setup a date/time for the secure virtual vehicle navigational system to send the data information at a specific time-frame agreed to by the vehicles owner, driver or user; wherein the vehicles owner, driver or user provides one or more forms of biometrics validating the vehicles owner, driver or user requesting voter access; wherein each voter accessing to be allowed to vote displays their drivers license or voters registration card, or both that is scanned by the bar code reader application built into the iNavX2 Obvipro's ecomm-device, smart-iDevices, AiDevices or smart devices camera may further may be built with a shutter to protect the lens, that can only be opened by the driver or users iTouch$^X$ voice command for security, closes at end of each transmission of a document, image, or by an application that reads a bar code or QR code on drivers license, insurance cards or documents, or of additional items not listed; wherein when a user activates a vehicle or the device that has installed pAvics or Avics downloadable application for first time, the secure virtual vehicle navigational system registers the user with either an AiSign$^X$ or iSign$^X$ number; wherein a user can request from the secure virtual vehicle navigational system of a second user by knowing the second users state, city, first and last name, or by knowing a users AiSign$^X$ or iSign$^X$ that may be encrypted stored in ecomm-devices memory medium when their number requesting at least one Secure iChannel Connection (SiCC); wherein the vehicles owner, driver or user can initiate an AiCall Service (AiCS) of an AiMessage that may be an encrypted message sent to user or vehicles ecomm-device that decrypts AiMessage displaying contents, AiText or AiVisual conversation, or both by requesting to at least one vehicles owner, driver, user, virtual operator or human operator controlling at least one vehicle or drone, or user identified by AiSign$^X$ or iSign$^X$ number, or a user initiates AICS as a Conference AiCall (CAiCall) with multiple vehicles or users; wherein the AiCS is not to be used for promoting, a pervasive or not attempt of hacking or disrupting AiCS, spreading rumors, political purposes or advertisements, when reported by a user or detected by the secure virtual vehicle navigational, said violator user services may be suspended temporally or permanently; wherein each vehicles owner, driver or users AiSign$^X$ or iSign$^X$ is stored in a RAV only data base securely comprised of a iCallSign of the vehicles owner, driver or users abbreviated state, example: NY, TX, AZ, further defined with the first character of a city converted to numerical position in alphabet, example: A converts to 1 followed by a cities numeric numbered region within a state, example: Arizona may have seven (7) regions, therefore Phoenix is in region four (4); and other states may have 10 or more regions up to after 26, example: 27$^{th}$ region within AZ being recognized as: 227 (B=2, second A listed=27), second example: TX region 34$^{th}$, converts to: 2034CE3PHH, TN region 9, converts to: 2114VU8APK; wherein iCallSign may be combined with additional identification credentials assigned to vehicles ecomm-device, or of additional ecomm-devices not listed; wherein regions may be based on population, or of additional factors not listed determining total number of regions, example: ArizonaPhoenix becomes 116 (A=1, P=16) followed by at least 5 (five) alpha characters with at least one numerical digit positioned within alpha characters, or both, example: 11639U2AA, subsequent numbers within same region are generated by at least one proprietary program, or of additional means generating iCallSigns in another form or fashion being encrypted assigned to vehicles ecomm-device or users ecomm-device, user may assign an acronym for added security of their iCallSign followed by a request of Mi-iPrint Access (MiPA) being controlled by the secure virtual vehicle navigational system complex shared with all state infrastructures, randomly generating the next AiSign$^X$ or iSignx that may end with at least one special character if there are two or more users with the same name, chosen by the vehicles owner, driver or user, example: ß, #, ø and so on; wherein upon opening iNavX2 clicking on the icon 'Ai' enclosed within a circle, entering users AiSign$^X$ or iSign$^X$ by iTouch$^X$ voice command a secure iChannel$^X$ is opened from V2V, Identified Mobile 2 Identified Mobile (iM2iM), V2I, I2V, smart-iDevice 2 smart-iDevice (SID2SID), AiDevice 2 AiDevice (AI2AI), or of additional iChannel connections between two or more ecomm-advice not listed; wherein a secure iChannel$^X$ may take a moment for the secure virtual vehicle navigational system complex to establish a P2P iLink-sync'd iChannel$^X$ Connection with selected vehicles driver or users ecomm-advice; wherein the P2P iLink-sync'd iChannel$^X$ Connection (iCC) may hop or bounce between additional ecomm-devices or towers prior to the iLink-sync'd P2P iChannel$^X$ pairing; wherein dependent on iTrace tracked iRoute vs. t2 & tMarkers don't match, additional verifications may follow that are not listed, using either biometrics or iVocX credentials MiPA, or both along with ecomm-devices unique identifications for redundant activation protection; wherein once an authenticated linked and paired iChannel$^X$ Connection is established, the secure virtual vehicle navigational system re-routes the iChannel$^X$ Connection dropping those bounced or hopped ecomm-devices, establishing a V2V, Vehicle 2 Satellite 2 Vehicle (VSV), Vehicle 2 Tower 2 Vehicle (VTV) iChannel$^X$ Connection, or of additional iChannel$^X$ Connections not listed; wherein vehicle ecomm-device or the secure virtual vehicle navigational system or ecomm-devices continuously monitors or verifies, or both comparing trail date, absolute ecomm-device directory trail, or of additional security checks not listed, of the received transmitted encapsulated encrypted data-file prior to decrypting data-file being absolute as to the transmitted data-string or strings include the embedded receptor time stamp continues to match until transmission ends; wherein the AiCS services are encrypted, may be a PSE, or AiCS may be combined with additional PSE services presented within the listed embodiments for each infrastructure; wherein 'Ai' icon on iNavX2 virtual screen when activated provides additional services not listed.

Behind vacationers is a commercial vehicle XC93; wherein this vehicle owner has a fleet of 98 commercial trucks each identified with a respected number that may be alpha, numerical or a combination thereof or binary encrypted identification assigned generated by the secure virtual vehicle navigational, carrying payloads of various types, either within a state or across country, moving between or through one or more states; wherein the secure virtual vehicle navigational system provides telematic intelligence to owner or dispatcher and/or driver with locational, comprised of phase-change positional movements, fuel consumption including hydrogen, providing various kinds of map-tracking virtual results incorporated into calculated overlay models, that may be imported to and viewed by owner/dispatcher through a virtual interface either by iVocX commands or entered by hand; wherein XC93 is viewable in real-time spatial phase location, providing details at each stop duration time-frame, the secure virtual vehicle navigational system or dispatcher configured recommended fuel, food or rest intervals along with GeoiLoc duration time-frame, of additional items not listed.

A preferred embodiment in maintaining spatial density factors evenly proportional as speed increases, consistent with flow rates for each vehicle equipped with Avics, Obviator smart-iDevices or of additional certified compliant devices not listed; each controlled by at least one iNavCom center transmitting instructing to one or more vehicles within a mass or a single vehicle that may or may not be lead MVD, depending on quantity of vehicles within a specific mass or one vehicle; each Avics is configured to be a MVD and to transmit, receive a transponder signal by the Ultrasonic telemetry-device, data-analytics, informatics, facts, sets of data, artifacts or to adjust, modify or act upon time-spacial distance instructions to adjust Avics transponder within Ultrasonic telemetry-device signal initiated by sensors on vehicles sides from at least one of the attached or embedded or hidden transceiver, transmitter, transponder or receiver communicating with Ultrasonic telemetry-device; wherein, said transmission may be in or of a different frequency level, various tones, with or without pulsating variations or combinations of each, example: a pulsating variable tone with gaps with an embedded hidden tone or combinations thereof, that activates a response from another ecomm-device or devices to initiate a directional moment, speed alteration, a response code, a call-back response transmitted from Obvipro onto VectorHubs, BeconHubs, SentryHubs, SentinelHubs, additional ecomm-devices listed herein or contemplated to be deployed throughout the domain networked infrastructure, onto or that activates a sensor, device, switch circuit or circuitry controlled by iCP transmitted directives from the secure virtual vehicle navigational system or one or more tVectorHubs, vector-hub class or node-class ecomm-device listed herein or contemplated to be deployed transmitting encrypted directional change, instructions to change a sensor or device that activates a circuit or switch, to initiate circuit to be opened or closed, to turn on or off that may react to or in response of or of derivatives from electrical, mechanical devices or combinations thereof to: reconfigure, activate, to initiate a response to or from at least one sensor, electrical circuit device comprising an electrical or any combinations listed herein, to convey, instruct, activate by any means listed herein, and of any type transmission encrypted or not or the secure virtual vehicle navigation system communicates with with a plurality of vector-hub class or node-class ecomm-device or in combinational communication with at least one iCP that controls a vehicles position, change, physical size or shape, that may result in audible and/or visual recognized selected international languages for any given driver, machine language transmission that instructs, constructs or instructs, any type programed code, a switch, a device of electrical, electrical-mechanical, mechanical, hydro-electric, electric-hydroponic, electric-hydraulic or combinational attributes thereof; wherein further each iCP's Proximity Sensors correlate transmitted corrections to adjust or warn surrounding inter-connected vehicles or not, example: emergency responders, semi-autonomous or autonomous vehicles within any a mass or to simply modify at least one vehicle or, in event of any autonomous vehicles or semi-autonomous vehicles inability to maintain approximate spatial position within any networked domains infrastructure or for any other reason; wherein emergency vehicles, DOT, personal, commercial or law enforcement vehicles camera or cameras may be configured, added to vehicle or replaced designed built to detect, record and transmit all traffic signage encountered, along with the Geo-positional time-frame that any vehicles camera or cameras detection of a plurality of traffic signage GeoiLoc or Longlatilt, or both; wherein said recordings are integrated within the secure virtual vehicle navigational system navigational directional directives displaying each traffic signage detected record over-lay'd within the display providing visual or audible announcements prior to approaching said detected recorded traffic signage continuously being transmitted to at least one server linked and paired with the secure virtual vehicle navigational; wherein the secure virtual vehicle navigational system compares at least a second reading of the cameras readings with the prior GeoiLoc or Longlatilt, or both.

Finally, vehicle X10W is navigating a preconfigured route to work with no stops contemplated at this spatial time-frame.

Figure 4:
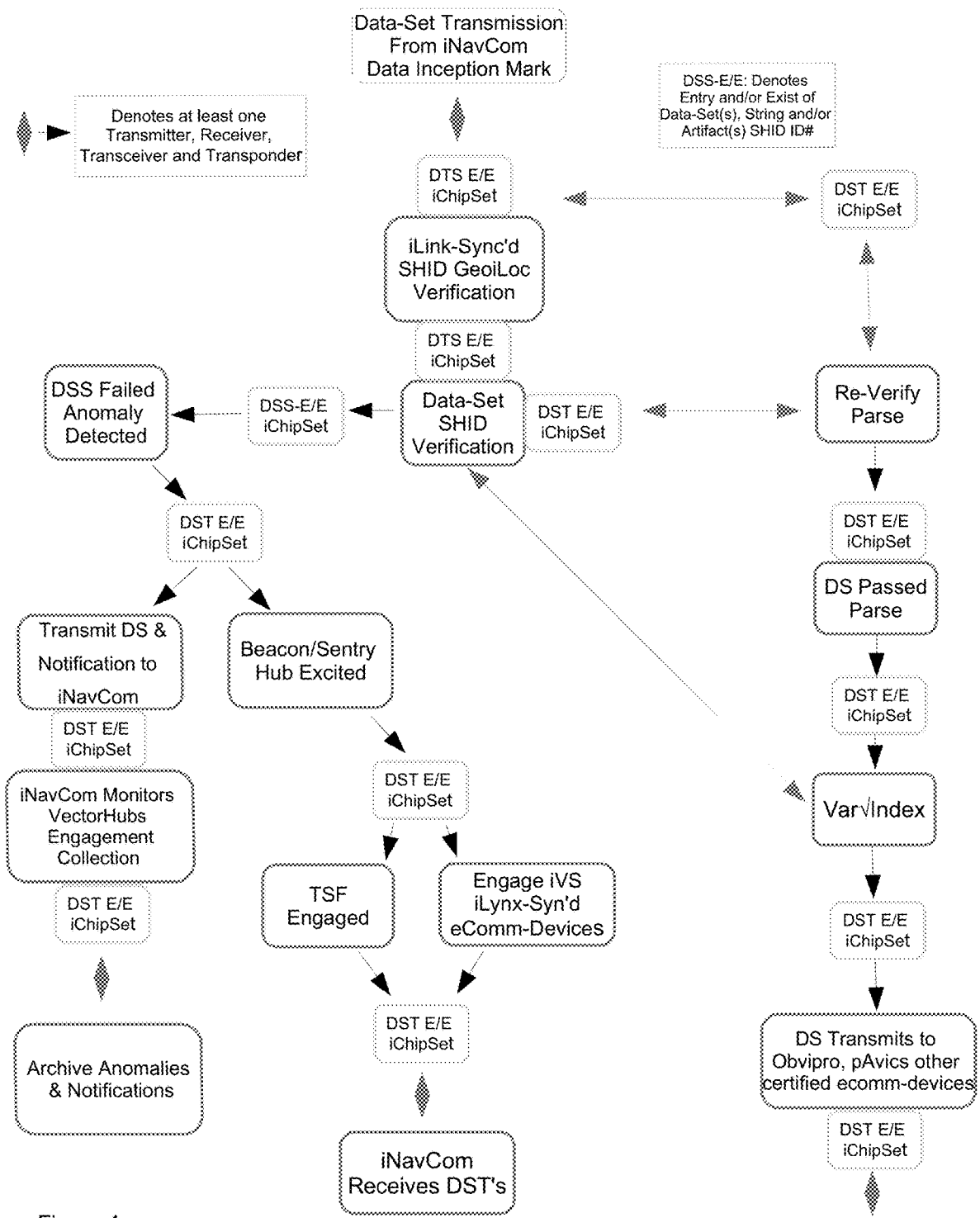
FIG. 4 is a paradigm configured internal process example for any type ecomm-device mentioned herein and/or other certified compliant devices; wherein each internal iChipset, iChipset$^X$ or AiChipset are inter-connected, either stacked vertically and/or side by side, and may be interconnected by at least on other iChipset, iChipset$^X$ or AiChipset or combinations thereof, each iChipset, iChipset$^X$ or AiChipset performing at least one task.

FIG. 4 is a paradigm configuration of at least one iChipset, iChipset$^X$ or AiChipset Configured Receiving Quadrant (RQ) for a tVectorHub or additional certified complaint eCommDevice constructed within each Avics internal configuration; where one or more specifications or parts, functions, coded programs, placements or hard-coded processes, the construct of or further arrangements of are purposely not displayed for simplicity and for other security reasons; wherein a similar configuration for transmission quadrant (TQ) from at least one tVectorHub or of additional telemetry-devices mentioned herein or all other certified compliant smart devices, smart-iDevices, AiDevices or iHD must mark any type datum, data or sense datum. data-facts, sets, string or artifact and all other forms of transmitted or received informatics that moves from one internal iChipset, iChipset$^X$ or AiChipset a configured program process, to another internal iChipset, iChipset$^X$ or AiChipset or configured program a communication device of any type, example: electrical-mechanical, electric-hydraulic, mechanical-electrical or any form of electrical circuitry and combinations thereof, with any other device that excepts, reads, transforms into other readable forms, to use in mathematical equations, analytics of data, data-sets, any other data-strings, facts, informatics of any type, signals of any type, that may be at least one directive to produce, act upon, stop or start another process of any type; wherein each ecomm-device may be solely built using one or more iChipset, iChipset$^X$ or AiChipset that may be stacked upon each other and/or connected to horizontally, vertically or angularly, each configured to preform at least one task.

Further constructed of at least four quadrants, two for transmitting or receiving, remaining two quadrants for record-artifact process verifications, or of additional items not listed constructed of at least one nano, micro nano, nano-micro or combinations thereof or of technologies currently known now or in future time comprising a mechanical, mechanical-electrical or electrical-mechanical to construct either the iChipset, iChipset$^X$ or AiChipset.

Comprising at least one iChipset, iChipset$^X$ or AiChipset, that marks data-facts, sets of any type or kind of datum, data or sense datum entering and exiting at least one iChipset, iChipset$^X$ or AiChipset or any combinations thereof currently stated herein or contemplated to be used, that mark each document has to 'vector locator path' as a 'unique string identification name'—USIN acknowledged as 'tMarker Audit Trail' for its creation inception point and each device data passes from and/or to; wherein one or more inter-connected vehicles, some of which are vehicle-domains inter-connected within at least one domain district that is networked within a specific infrastructure traversing along a roadway, in directional or bidirectional communication with the secure virtual vehicle navigational system, through one or more subnaysys iNavlinks; wherein at a stop sign or a current deployed traffic light controlled intersection by placing at least one ecomm-device or other certified compliant tVectorHub may act as a combinational ecomm-device, control directives transmits to any type vehicle equipped with Avics that may be downloaded into any type smart-iDevice that is certified and compliant as to its constructed encrypted communication capability or an attached Obvipro in a secure iLink-sync'd status with vehicle OBD2 or subsequent newer port connections; wherein smart-iDevice only uses devices ability to receive or transmit a reply signal to one or more transponder or Ultrasonic telemetry-device calls, and only further use smart-iDevice GPS locational services. Wherein when these smart-iDevices approach an intersection deployed the secure virtual vehicle navigational system or telemetry-devices deployed determine phase-change spatial velocity flow rates, transmits passing vehicles credentials forward to next tVectorHub, or of additional ecomm-devices not listed.

Figure 5:
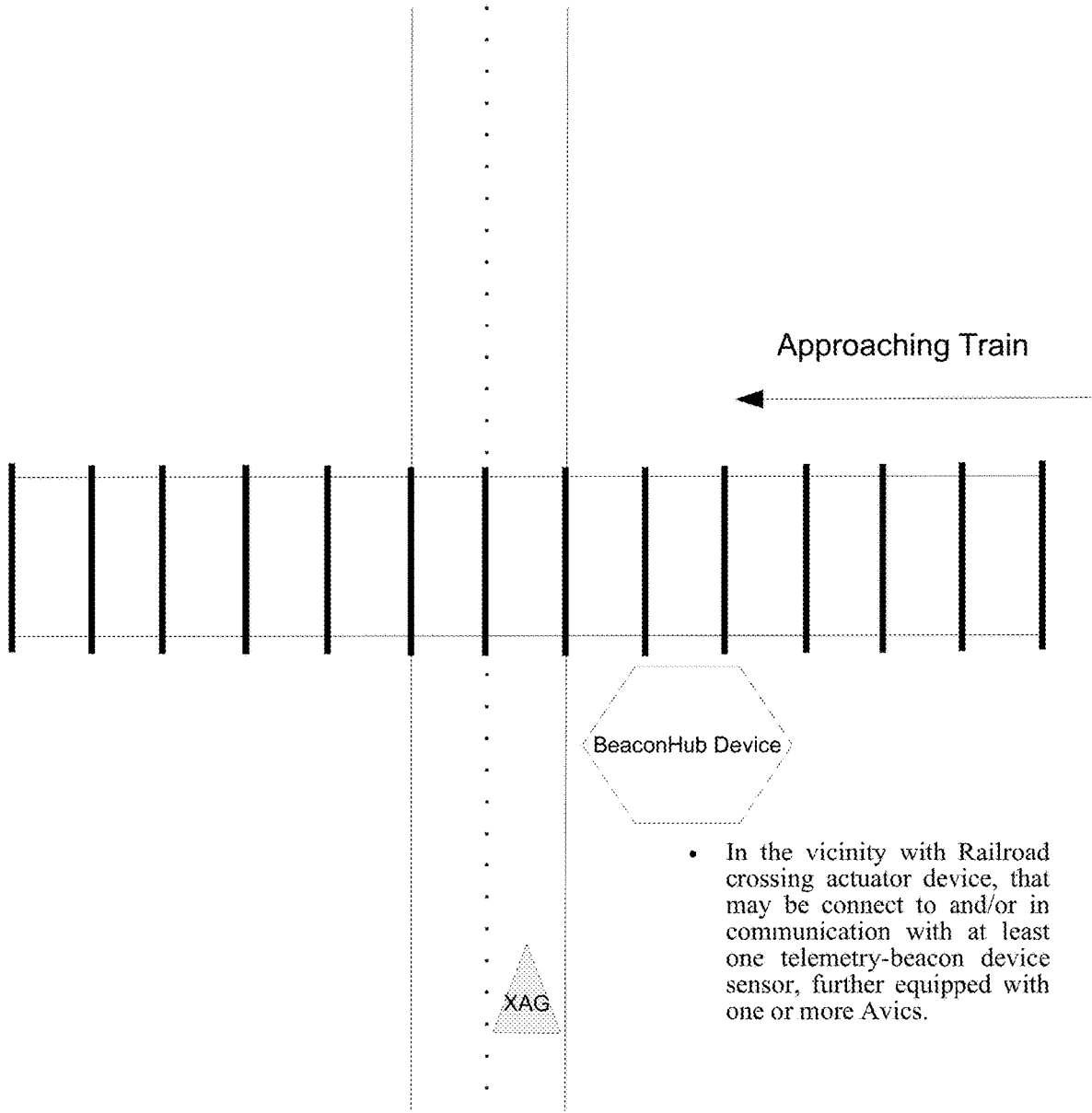
FIG. 5 is an example of Avics configured protection telemetry-device, mounted on existing railroad crossing poles, towers and/or gates and/or attached to locomotive and/or trains cars.

FIG. 5 further provides a paradigm configured example for at least one telemetry-beacon or Ultrasonic telemetry-device and other compliant certified ecomm-device configured to protect any type vehicle, human, railroad locomotive engines or train cars pulled, mounted on existing railroad crossing poles, towers, gates, inside trains, vehicles and humans; where the secure virtual vehicle navigational system attributes, components, structured processes and all other items listed embodiments herein are used to and for iMaptrac'ing railroad cars and engines incorporates all items listed here. Wherein vehicles XAG representative of triangle represents at least one pAvics attached to or installed on a smart-iDevice for humans, bicycles, motorcycles and all other conveyances not equipped with Obvipro. Further equipped with at least one Ultrasonic telemetry-device (UTED) said construct comprises at least one or more iChipset, iChipset$^X$ or AiChipset; wherein the railroad crossing protection device incorporates all embodiments listed herein. Wherein, locomotive signal that activates lowering of railroad crossing arms, may also transmit similar signal to Train-Beacon (tBeacon), further transmitting a signal that may at first be pulsating of various or a designated frequency understood by all; wherein approaching vehicles equipped with either pAvics or Obvipro hears audible tone, wherein the closer vehicle is to railroad crossing the signal tone becomes constant. Each vehicle-domain, a single vehicle or other smart-iDevice within proximity of transmitted tone displayed on smart-iDevice, iNavX2 virtual interface, and may further flash a warning either audible or visually 'proceed no further' or other verbiage in selectable languages.

Furthermore, the preferred embodiment forecasting ecomm-device relationships entail: all data-string permissions may be embedded for read only access only then, add new data from next ecomm-device, or of additional ecomm-devices not listed, which accomplished linked paired authentication; wherein registration acknowledgment was granted by the secure virtual vehicle navigational system (controlling iNavCom center); wherein final process being symmetrically or asymmetrically iLink-sync'd (linked synchronization) with last known vector-hub class or node-class ecomm-devices, certified telemetry-beacon or tVectorHub as to last know registered ecomm-device within vehicles ecomm-device was deactivated or went off-line; wherein routine investigating of any data-strings asymmetrical or symmetrical anomalies within a domains infrastructure from Sentinel or SentryHubs, SentryBeacons or other certified ecomm-devices, each sequential recognized devices initial communication, prior to iLink-sync'd ecomm-device received data from either a portable device, example: pAvics or other certified mobile telemetry-devices, Obvipro devices equipped with Avics, registration process continues for preceding devices, generating activation inception marker when iMechanixm recognized or received first transmission.

Thus creating another level of security for datas integrity. Within the secure virtual vehicle navigational preferred infrastructures framework configuration; in which each sync-d ecomm-device registered within a domains network further detects threshold anomalies, determines sub-routines with cross device scripting from in-compatibility variances, rejects inconsistent in-bound or out-bound unknown communications, reporting logged events to one or more iCloud-ProxyServers or at least one iCloudServer within at least one configured iMatrix Network that compliments the secure virtual vehicle navigational systems Constructed Network Protocol providing secure communications, all of which are essential elements of datas Telematic Architectural Application Reliability.

Furthermore, non-compliant vehicles place a substantial burden on cost of insurance over all for each driver in any country, along with carelessness of humans drivability. After first phase is brought into effective action, notably insurable costs are reduced by safer road conditions attributable to managed traffic speeds, Proximity integration and Phase- Change Spatial Analytics and other traffic concerns fade away during first phase of deployment by detection of a Registered Sync'd, Paired-Key Authenticated activation process for pAvics, Obviator, smart-iDevice, or of additional certified ecomm-devices not listed, are paired with vehicles data some of which may be entered manually via a secure web-interface; once deployed driver must call-in or through virtual encrypted interface within iNavX2, linked only to infrastructures automated controlling by iNavCom center entering the secure virtual vehicle navigational system generated key on ecomm-device to generate PairKey online to authenticate activation for any pAvics or Obvipro or other certified ecomm-devices.

Deployment of pAvics ecomm-devices and similar certified smart devices, smart-iDevices or iHD, has a software application for older vehicles available as a downloadable application linked to a smart ecomm-device—mobile or static that references data in a non-transitory computer-readable non-shared storage medium data base as to current tag devices, insurance and inspection status of which may or may not be manually entered; some data may be merged with VIN # automatically. Advanced ecomm-devices either mounted on windshield, under or on dash for older vehicles that have reduced OBDX capabilities, under dash mount tied to OBD output with a simple dComlink module that transmits all relative data available from interconnection with vehicles Obvipro; wherein each tire wheel area is built with at least one Ultrasonic Range-sensor device with or without a plurality of shaped lens, parts of the Ultrasonic Range-sensor device are embedded or positioned behind each wheels fender; wherein Ultrasonic Range-sensor device may move horizontally or the Ultrasonic Range-sensor device may be configured to only read a small horizontal line field of at least two (2) centimeters thick and width of a average size tire; and iLink-sync'd with vehicles Obvipro's ecomm-device; wherein the first time the vehicle is activated (turned on) after being installed, the Ultrasonic Range-sensor device transmits a Ultrasonic signal wave or waves that bounce back, reads the measurement of the timed distance from the sensor to the tire and back to the Ultrasonic Range-sensor device along with the tires surface area whether being flat or curved, of what degree; wherein at timed-intervals when the vehicle is stopped, stationary or parked each vehicles Obvipro initiates subsequent readings followed by a second measured reading that is latter compared by vehicles ecomm-device disregarding one of the measured reading if both measured readings are the same, if not then keeping both of the recorded distance between the Ultrasonic Range-sensor device of one or more surface areas of each tire; wherein the Ultrasonic Range-sensor device may comprise a covering that opens or closes at each timed-interval reading, further may detect tires air pressure based on prior readings if tire surface area is not the prior tires recorded shape or time-distant readings between tire and the ultrasonic wave or waves if abnormal; wherein each vehicles Obvipro stores each measurable reading in at least one memory medium linked and paired with vehicles Obviator's ecomm-device; wherein each vehicles Obvipro continuously compares the current measurable readings with the prior recorded measured reading; and wherein vehicles Obvipro's ecomm-device calculates a rate of wear from the subsequent measured reading of the Ultrasonic Range-sensor device; wherein vehicles Obvipro's ecomm-device transmits each recorded measured reading to the secure virtual vehicle navigational system; wherein the secure virtual vehicle navigational system uses the record-data of the recorded measured reading for the purpose of vehicle maintenance, virtual tire inspection monitored status; and that may further be comparatively analyzed with other vehicles with the same tire type or brand of the same or of different manufactures, along with other vehicle manufactures that use the same brand or type tire; wherein the secure virtual vehicle navigational system forecasts when to send vehicles user, operators virtual or not advanced advisement's of end-of life time-frame of at least one tire; wherein this embodiment is incorporated in public or private commercial transportation, motorcycles, or of on additional vehicles not listed; wherein the Ultrasonic Range-sensor device may include at least one Laser or multiple lasers, that may comprise a clear protective cover or a covering that opens or closes at each timed-interval with or without at least one lens of a plurality of shapes that is activated when vehicle is stopped, stationary or parked configured to an measures the alignment or if tire is out of balance.

Further, when controlling vehicles iNavCom centers searches local infrastructure for iLink-sync'd Obvipro's, pAvics, smart-iDevices or of additional certified ecomm-devices not listed, archived trace routes are determine by the secure virtual vehicle navigational system networks average speed and density, data is compared from within isolated or any given areas network for comparative flow rates, computational analysis are compared with each offline or online vehicles in conjunction with prior historical data, any anomalies in topography and current or expected weather patterns, then data is re-verified against density from previous calculation, datasets are imaged over previous route data, analytical comparisons are recalculate, if destination variables match, digital eComm-Advice directives are sent out. Thus, Flow Rate is Calibrated by Density augmented by Topography and Climatic Expectations and other x2Factor items not listed.

Another advance preferred embodiment is destination lane acquisition; any given vehicle that is traversing several miles to its destination acquires positional rights to be placed in a specific lane; closer this vehicle gets to its destination point entry or exit node if on a freeway, directional advice directives are transmitted initiating movement towards proper lane, preparing for ramp exiting or entering, turning and all other navigational movements requiring vector-repositioning. With lane change notifications, corresponding directives are sent to surrounding vehicles on right or left lane to progressively open or lengthen a pre-configured positional point so entry into next lane is anticipated by surrounding vehicles, only slowing traffic down by increasing calculated spatial Phase-Change distance for safe entry point or gently increasing forward vehicles velocity or rippling same adjustment to one or more forward transport vehicle as needed by calculated spatial-phase future positional point; thus minimizing abrupt decelerations within certain vehicles maintaining variable rate flow throughout determined network domain vector-area or region.

Furthermore, surrounding vehicles positional distance is strategically lengthened or shortened by adjusting speed variations to accommodate lane changes, the secure virtual vehicle navigational system {controlling iNavCom center(s)} continuously calculates vehicle lane shifts or drifts with voice commands from iVocX or virtual indicators on screen notifications displayed on iNavX2 interface, if equipped within vehicle assimilated with iNvectorhub calculable movements, along with notifications to specific vehicles for turn signal activation, initiating breaking depending on speed, just relaxing throttled momentum acceleration movement either by the secure virtual vehicle navigational system generation, human activation or automatic combinations thereof, comprising either visual or audible voice commands on visual interface showing instructions, actual movements of vehicle to surrounding vehicles, adjusting each to accommodate said change.

A preferred notable embodiment with iVocX directives, provides continued study in OpenSource Registered Platform; wherein the advancement of voice command directional input, output or activation of any type: electrical-mechanical, electrical, mechanical-electrical device, or combinations thereof, example: virtual or not, the associated composite development, corresponding assimilation of a human or a machine's voice from Obvipro; initiating control to one or more devices, or ecomm-devices, programmed codes, the virtual assimilation of and the study of reactionary phase-change to at least one electrical and/or mechanical circuit, device, sensor, switch,or the combination of each other, or of additional items not listed.

Where OpenStudy Exploration evolves iVotronix; wherein voice control reactionary time-frame is faster and more precise than a human acting out same task or tasks, including to navigate vehicles controlled by one or more sensors initiating a reaction from a voice ecomm-device or interpreting digitally encrypted directives for any purpose that coincides with and assimilates human reactions of any type; wherein ecomm-devices are equipped with one or more processors, construct comprising at least one or more nano-micro, micro-nano or simply a nano iChipset, iChipset$^X$ or AiChipset preforming at least one explicit or implicit stored or generated task, a task pre-configured based on calculable reactions to turn on or off, or that may occur at same time-frame or a set time-frame to activate, respond to or with, or in unison with at least one additional iChipset, iChipset$^X$ or AiChipset, for purpose of variations of command interpretations whether sequential or not, or to react to any type spatial reposition or change event in space time-frame to notify audibly, visually or combinations thereof, forecasting, to act upon a correction of an event that may or may not coincide with intended reaction, command of a conceptual virtual event prior to event, or process action, to inspect a specific data-fact, at least one data-string, a data-set, a artifact, or a automated command of any type that controls by, example: electrical, mechanical voice or combinations thereof; that instructs an action to move or to interpret impending results, action or concentration of reception, vehicles capability or capacity speed to and/or with integrative reactionary time-frame of one or more command action or actions, to preform calculations of any type to instruct a sensor-device, to move any type device/sensor or change its appearance, position, location or shape; wherein each iChipset, iChipset$^X$ or AiChipset are pre-configured to perform permission recognition or interpretations of various types of processes, calculated responses or subsequent effects of vehicles maneuverability relating to either semi-autonomous or autonomously navigating; wherein iChipset, iChipset$^X$ or AiChipset construct further comprising at least one iLogic-gate or a logic-iGate configuration to preform at least one: process, procedural event, to change a position of a mechanical, mechanical-electrical, electric-hydraulic, or electrical-mechanical sensor, device, another iLogic-gate and/or a logic-iGate that initializes, initiates one or more changes in a sensor, iDevices, or of additional items not listed, configured shape, concentration level, a voice or a audible recognition or virtual interpretation of humans anticipated or not reaction, the secure virtual vehicle navigational system interpretation of vehicles sequential procedure or event configuration to move at least one sensor, a device, or of additional procedural items or tasks not listed, in a directional movement on any X,Y or Z plan of any degree; and to reposition a sensor amplification or power needed to manipulate any type device or a sensor-device towards self awareness of a vehicles itself; wherein at least one iLogic-gate or a logic-iGate further turns on or off sensor, device, a iDevice, or of additional items not listed, to make changes to or preposition a devices configured shape, to notify, instruct installation of at least one programmed event to run at least once, to change configuration back to prior form position or positional event; wherein one or more iLogic-gate or a logic-iGate within at least one iChipset, iChipset$^X$ or AiChipset are further connected, or inter-connected to perform at least one sub-application, sub-iRoutine and one or more iProcesses; that may be further an embodiment of a subsection or a subsequent layer of at least one iChipset, iChipset$^X$ or a AiChipset configure to perform at least on other set or subsets of one or more of aforementioned processes, programs, events or of additional items not listed, or of additional coded programs, event or tasks not listed, may be equipped with at least one transceiver, receiver, transmitter, transponder, Ultrasonic device configured within at least one Ultrasonic telemetry-device to mark any type of data-informatics exiting or entering certified ecomm-device, Obvipro, or smart-iDevices along with constructed elements herein.

RFIDGPS transponder/receiver/transmitter/transceiver, iChipset, iChipset$^X$ or AiChipset eliminates environmental challenges currently in place in having a high concentration of mobile ecomm-devices moving at variable speeds sequentially communicating securely in a channeled hierarchy. A comparison from each ecomm-device is able to differentiate a numerical value such as, without limitation a vehicles OBVIPRO VIN number or a smart devices, smart-iDevices or iHD unit SHID IDT, or of additional identifiers not listed or by virtual identifying measures, such as ESN # assigned to ecomm-device or of additional combinations not listed. Providing specific geo-positional location associated with each ecomm-device at any given phase-change spatial location during vehicles or portable Avics movements. Allowing an infinite number of derivatives combined into a single analytical recommendation driven by Optimized Overlay Modeling or of additional modeling means not listed, wherein the RFIDGPS Module or RFIDGPRS Module device is built with a multi channel receiver or transceiver; wherein the GPS or GPRS devices includes at least one SAW filter or a notch-filter, or both transmitting or receiving on selected GHz frequencies or frequency, or both at the same time or independently of each that may be of a time intervals.

Thus, the secure virtual vehicle navigational displayed here yields attributes harnessed from virtual relative Vector Traffic Data Node Points from each vehicle locational movement, creating an Optimized Model generated by Dynamic Computational Algorithmic Architecture. Illuminating any change caused by perturbations which are then used to determine current Logical Conceptual Design based on networks Computational Traffic Flow Dynamics, by Quantifying Traffic Flow Dynamics merged with Vehicular Traffic Variables using Algorithmic Variations, creating 'CI' the balance of human knowledge merged with machine language, complex example of Transparent Informational Knowledge or in different light, prior knowledge controls machine output variables.

Logically, conclusion drawn by Nxgen Traffic System optimizes information transmitted from Uniform Traffic Nodes in a virtual interface TVA, quantifying simple positions groomed by mathematical arguments, creates ecomm-advice (encrypted communication advice) directives, codified by datasets being received providing a finite number of compared records, specifying vehicular density in relationship to traffic flow destination dynamics of Rapid Traffic Congestion Flow Analysis. One main concern of traffic congestion is simply the imbalance from lack of Administered Organizational Control. Once Spatial Density is managed, variations in speed implementation vs. density become foundational; wherein calculations in relationship to analytical flow rate composition to one or more vehicles spatial locational speed in current time space forecasting a future space time GeoiLoc continuously; wherein one or more programs compute congested incremental traffic disposition at a future phase-time positional interval, providing phase-time spatial analytics.

The secure virtual vehicle navigational radically improves mobile locational ecomm-devices over an ad hoc wired or wireless framework, including fixed or mobile cameras for high crime rate areas, vehicular traffic violations, or of additional items not listed. Communications from digital packet data, transmitting ecomm-advice directives, enables a medium that is responsive to each ecomm-device application deployed, thus creating Channeled Telematics where those through acquired knowledge or skilled in art of telemetry mobility determine limitless boundaries of XgenX an integrative structured apparatus as to the secure virtual vehicle navigational systems functionality, learns from retrieved records and able to determine authoritative decisions. Turning current traffic paradox into an artificial expression of interconnected manageability from associative operations, formed by iLink-sync'd ecomm-devices in communication with at least one central server performing calculated interpretation of statistical variations in traffic symmetry.

Further management includes selectively powering down street lights when traffic is at its lowest; and adjusting energy propulsion matter within vehicles, result controls momentum; thus managing variable maneuverability. Allowing vehicles to move as fast as possible without unnecessary idling: by continuous variable velocity; particularly reducing exhausted energy consumed breaking inertia, speed bursts and more that safely manage vehicles movement from various embodiments herein stated.

Each vehicle will eventually be able to navigate itself, from calculated recommendations based on traffic conditions by allowing reactive response interval feeds into each onboard vehicle processors system that emulates full auto pilot control, driver take over is obtained by voice command statement (e.g., release auto or manually turn off). However, the secure virtual vehicle navigational system continues to assist with navigational concerns via voice or through virtual interface, if need be to react to pending emergencies initiating iBS, lane changes and more. After several months collecting comparative data for each vehicle, the secure virtual vehicle navigational system starts to anticipate or think for itself, based on how historical data shows a driver or a autonomous apparatus may react to any given situation, make suggestive maneuvers when appropriate, even take over autonomously to prevent disturbances within a network infrastructure.

A preconfigured embodiment for each vehicle, should be equipped with slotted and grooved preferably, stainless steel rotors eliminating warping factors, rusting, replacement intervals if any, that may incorporate at least one hub bearing sensor as one ecomm-device; wherein transport or vehicles capacity is optimized through iCP system braking sensors, each vehicles braking distance reduces close to or less than 21 meters at 100 kph; wherein both front and rear breaking system is linked and controlled by at least one electro-hydraulic mechanical or electrical sensor ecomm-device in communication with iCP receiving data-directions, or additional ecomm-advice directional directives stored from Obvipro; wherein upon activation of a domain inter-connected vehicles encrypted directives transmitted to surrounding vehicles (V2V) immediate sequential speed reductions from iBreaking System (IBS) data-link occurs; wherein one or more of secure virtual vehicle navigational directional directives, warnings, advisements, recommendations; automatic tasks or tasks that are generated as a result of a detected event of an execution of a procedure or task being initiated by an ecomm-device, vector-hub class or node-class ecomm-devices, the recording of one or more executions, generated analytics, recommendations, processors processing sequences or sequential processing of at least one task, procedure or event; and algorithms forecasting performances, recommendations, attributes recorded that generates a programmed outcome or not, or of additional vehicular maneuvers, tasks, events, processes or procedures not mentioned being sent to Obvipro's ecomm-device, portable or stationary smart-iDevice, AiDevice, vector-hub class or node-class ecomm-devices or smart phones the messages are embedded within a precept, or of an additional programmed orders to store parts of or all of message being received by ecomm-devices, Obvipro's ecomm-device, portable or stationary smart-iDevice, AiDevice, vector-hub class or node-class ecomm-devices or smart phones memory medium; wherein the recordings of the aforementioned items may determine that the $OSV^X$ or NOS may need to be sent a newer version, one or more autonomous vehicles ecomm-devices may require additional navigational directives due autonomous vehicle guidance systems interpretations are not sync'd with pre-configured or determined outcome being sent by the secure virtual vehicle navigational that was sent or the propagation to semi-autonomous or autonomous vehicle or driver/users reactionary allotted time-frame or frames need adjustments, or of additional detectable reason or outcomes not listed that may require the $OSV^X$ or NOS to be upgraded; wherein the one or more parts of messages being received comprises shared memory; wherein at timed intervals, or of command execution from the secure virtual vehicle navigational, example: an emergency route being generated, to increase or decrease spatial distance, to adjust speed, to advise the activation of an incoming: alert, warning of an adverse event, a weather condition or an abduction that is forthcoming display or audibly is eminent, or of additional items not listed that activates one or more parts of the stored messages propagating to surrounding Obvipro's ecomm-device, portable or stationary smart-iDevice, AiDevice, or smart phones; wherein one or more parts of the stored messages are used as a test on one or more semi-autonomous or autonomous vehicles to determine if modification in the secure virtual vehicle navigational messages require modifications to specific semi-autonomous, autonomous vehicles or all paired and link-sync'd devices $OSV^X$, NOS, or of additional ecomm-devices not listed universally; wherein one or more parts of the shared memory activates at least one virtual memory process, including the activation of an secure iConnection from an incoming iSmart-iMessage being sent by the secure virtual vehicle navigational, another vehicles ecomm-device, or of additional ecomm-devices not listed, and completing the AiMessage initialization of a iLink-sync'd pairing iChannel$^X$ Connection with at least one or more AiCall's AiSign$^X$ or iSign$^X$ number; wherein AiSign$^X$ is iLink-sync'd with vehicles ecomm-device, iSign$^X$ is iLink-sync'd an paired with portable or stationary smart-iDevice, or smart phones; wherein one or more AiDevices are linked and paired with both AiSign$^X$ and iSign$^X$; wherein when entering the AiSign$^X$ or iSign$^X$ number is encapsulated in an encrypted rapper transmitted via encrypted data push; wherein private memory is memory being monitored continuously by NOS detecting anomalies, or of additional problems or events, preconfigured or configured not listed being executed by the OSV$^X$.

A preferred embodiment not only for protection of all parameters of the secure virtual vehicle navigational systems functionality, new features, programmed updates and like are tested in a Virtual Environmental Sandbox (VES) feature, provides at least one platform comprised of at least one application programming interface configured to, running real-time scenarios for programmed changes, forecasted vehicle instructed directional movements, incorporating existing ecomm-devices communication throughput capacity levels, allowing certified application programmers a Virtual Assessment-Platform (VAP) preforming field trails prior to implementation in the secure virtual vehicle navigational system integration, verifying data integrity for advertisements, channelized weather-telematics and provide security testing implementation examination of mobile and stationary devices encrypted directives forecasting semi-autonomous or autonomous command control navigational features; and communicates the secure virtual vehicle navigational system variables with real-time predictions, determine anomaly accessibility points, preform traffic flow density of one or more networked domains trajectory rate density factors and transmitting BTI data metrics to tribal entities, share or stakeholders; wherein VAP or VES, or both is always running, learning and predicting comparative complex scenarios building baseline platform for CI calculations.

Traveling is enhanced from feedback by humans or ecomm-devices transmitting to and/or from the secure virtual vehicle navigational system, recommends planned routes based on communications from driver and/or audibly programmed, also known as iVoiceCommands (iVocX) either audibly entered within vehicles onboard vehicle processor (Obvipro), predefined by the secure virtual vehicle navigational system selected routes based on congestion factors, interred manually accessed via virtual web-based and/or iNavX2 interface. Continuous data transmissions from vector-hub class or node-class ecomm-devices provides traffic artifacts; wherein the secure virtual vehicle navigational system recomputes travel time variable variations, phase-change artifacts in relationship with other vehicles Network Traffic Congestion Artifacts (NTCA or TCA), based on informatics received from tVectorHub module sensors in respect to vehicular received engaged movements. Along with integration of Object Functionality Points or Proximity Integration determine exact Phase-change spatial relationship with surrounding vehicles, allowing prompt reactive response data intervals calculated from one Obvipro to another Obvipro with predicated algorithms against surrounding vehicles calculated trajectory, feed from and to onboard vehicle processor (Obvipro) and back to the secure virtual vehicle navigational system repetitively, allowing each vehicle built with or attached certified ecomm-device that includes at least one FRIDGPS Module providing the ability to encapsulate logistical response times on preventative measures regarding accidental collisions from side, rear an frontal impacts, abrupt lane changes and more from drivers lack of attentiveness or vehicles transmission reception, capabilities and functional responsiveness of autonomous vehicles guidance systems controllers, as to or with its capacity or capabilities to self-navigate.

Current Forward Collision Warning systems currently developed; wherein system further integrates Proximity Sensors, such as sonar, radar activating Obvipro's transponder, or one or more echolocation signals and one or more devices signals may pulsate of different tones, from or by different devices for redundancy by comparative detections or security reason of varying frequencies transmissions, either activated internally or transceiver signals transmitted by the Ultrasonic telemetry-device to maintain spatial phase proximity with or to surrounding vehicles currently interconnected with at least one MVD or vehicle-domains within a mass or not; wherein the secure virtual vehicle navigational system or Obvipro hardware or downloadable software for pAvics near-field devices, or of additional certified functional device not listed herein detecting wrong way travel, vLaneDrifts and other non regulated un-registered vehicles or questionable maneuvers within any domain. Objective testing provides conclusive evidence that the secure virtual vehicle navigational system and vehicles Obvipro reacts faster in calculations transmitting variable momentum changes to surrounding impeding vehicle, from uninitiated or unanticipated driver mishaps; wherein system has determined precise GeoiLoc momentum future positional point for each inter-connected vehicle within any domains networked infrastructure; wherein the secure virtual vehicle navigational and Obvipro system further alerts not only vehicles within range of incident, such occurrences may ripple forward and effects rear areas if no action is taken. Thus, the secure virtual vehicle navigational and Obvipro system determines effective alterations forecasted to one or more surrounding vehicles, additionally sent to frontal, rear or surrounding vehicles; wherein recorded precourse adjustments are re-calculated as to spatial locational adjustments, altering flow density.

According to one favorable embodiment, encrypted maintenance data from vehicle's OBVIPRO is transmitted to certain types of VectorHubs node-class ecomm-devices using an authenticated and predefined data string format and routinely checked for data integrity composition. These authenticated, predefined data transmissions are accumulated and analyzed for emission codes, or of additional devices, sensors, components or items not listed from vehicles outside regulatory guide lines, inspection, tag device and insurance validity. Archived and shared with local, state public safety and/or DOT agencies nationwide; where communications regarding telemetry interoperability issues between vehicle manufactures and the the secure virtual vehicle navigational system data sustains separation; wherein onboard vehicle processor (Obvipro) receives data transmissions generated by the vehicles computer processor or processors (iCP); wherein telemetry facts and statistics generate business telematic data transmitted to various service providers or advertisements that may be a PSE (paid service event) generating income for cities infrastructure; wherein events outside normal maintenance scope for any vehicle is recorded, analyzed and compared continuously, for appropriate determination of service recommendation advertisements, example: insurance, inspections, vehicles functions, such as seat belt engagement or air bags due to a failure, accident or tampering, maintenance intervals, displayed audibly or visually. Wherein service advertisement recommendation are sent back to OBVIPRO or pAvics, include without limitation vehicle require some form of repair, based on data facts received, archived, calculated to occur at some future date to verify risks assessment of one or more transmitted associated factors, scheduled maintenance intervals logged, along with determination as to severity of items code, alternatives for repair facilities within home-based proximity or if code necessitates immediate attention repair facilities certified to preform work is displayed with close proximity; wherein driver makes appointment connections with facility. Owner of vehicle is allowed to choose who does work or what towing company; and may be polled for an opinion on facility pricing, work product, transparency and may be shared displayed for all to review.

Transcending considerations are presented to embodiments consistent with future vehicles technologies; wherein the secure virtual vehicle navigational 'system' (Xgenx) communication with iMechanixms or vehicles computer processor or processors (iCP) configured to achieve reactions to digital directives the executions of: mechanical, electrical or mechanical-electrical actions, to listen and respond to sensor adjustments of any type, example: to navigate as instructed from at least one connected Obvipro; wherein iCP's preform encrypted directive processes conveyed through Obvipro (on-board vehicle processor acting independently of and not connected to iCP) in directional communication to at least one ecomm-device; wherein system does not maneuver iCP, it merely advises iCP when to preform navigational tasks, some of which are hardcoded or in harmonious and cooperative state with iCP. Once requested, transmitted systematic artifacts iCP captures transmits through iData-link (identified data exchange process) to only respond to encapsulated directional directives, instructing maneuvering suggestions iMechanixms or vehicle iCP needs to take, the executions thereof are recorded and continuously analyzed for detected failures or interoperability concerns; wherein iCP further understands internal sensor adjustments simply instructs vehicle, to navigate or to grant additional data extraction or iDataXchange between ecomm-devices. Succeeding embodiment is consistent with OBDx or OBD2 during Phase II, data transmissions from each vehicles functional attributes preform vehicle inspection diagnostic examination for each state, consistent with universal approved inspection requirements, randomly preform and archive vehicle iRecords in Obvipro's ecomm-devices memory mediums, notifications are transmitted to the secure virtual vehicle navigational system, local, state and US DOT by way of EDCLink (encrypted data communication link) with older OBD2 or OBD creating a telemetry-beacon device attached thereto, sending out vehicle informatics continuously or in timed intervals, that may be a PSE along with the portions of payment fees for inspections, or of additional items requiring payments not listed.

Another preferred embodiment expanding on past few paragraphs; wherein current OBD2 or of a future iMechanixms or vehicles diagnostic OBD port(s), each time engine light is activated and displayed, codes are transmitted from iCP to Obvipro, onto nearest iLink-sync'd vector-node and/or vector-class ecomm-device; wherein data-set moves securely to system. Where pre-determined calculations are performed based on imechanixms system codes urgency; wherein notifications are transmitted back to iMechanixms or vehicles Obvipro, instructing driver/owner with visual and/or audible explanations; wherein if one or more codes are severe, a request is further transmitted with recommendations of a serviceability issue, for any type navigational guidance or iCP system component or sensor or sensors or components constructed within iMechanixms or vehicles frame-work, indicating a failure or possible failure that may effect navigation, communication interoperability, either visual, audible or iCP or guidance system device is not preforming as intended, e.g. IBS, propulsion matter; wherein transports system inspection informatics are accomplished in real-time virtually transmitted to proper authorities if a failure exists or not.

Another preferred embodiment comprises a information transfer system configured proficiency to pay for services such as: iMechanixms or vehicles registration, pay for a tag device that detects toll entries or exits, insurance, inspections and advertisements or reservations of any type; via secure cryptic interface iCryptPay, processing credit card transactions through at least on EDCLink embedded within at least one iChipset, iChipset$^X$ or a AiChipset built within each Obvipro's NOS, through a downloadable software application for smart-iDevices, iPhone or Android that have installed the pAvics application.

According to one enhanced embodiment the secure virtual vehicle navigational system generated notifications are broadcasted area wide within domain networked infrastructure to mobile devices such as: Obvipro, pAvics, smart-iDevice or of additional certified ecomm-devices not listed that either automatically turn on vehicle head lights in advanced deployment of Phase II, send visual or audible eComm-Advice directives in Phase I to semi-autonomous or drivers pAvics or smart-iDevice instructing user to turn head lights on, due to poor visibility from weather conditions, emergencies or of for additional reasons not listed, or time of day necessary to assist traffic flow safety; wherein the secure virtual vehicle navigational system further provides to vehicles ecomm-device, smart devices or proprietary AiDevices at least one dedicated radio channel frequency, or built to receive all frequencies from 162.400 to 162.550 MHz that receives NOAA Weather Radio at all times accessible by a user; wherein the radio channel further provides warnings, alerts, abductions, recommendations, navigational directives that may roll across the screen either on bottom or top, or both, or of additional items not listed at all times; wherein access is activated by voice, iTouch$^X$ of an icon 'W' that may be enclosed within a circle on the display screen; wherein a user may activate a split screen on the display to view both the words of NOAA Weather Radio scrolled on screen, or to view and audibly here the secure virtual vehicle navigational system navigational directives at the same time-frame; wherein when iVoiceCommand is initialized by a users voice activating iTouch$^X$; wherein each alpha or numerical character is enunciating the alpha or numerical character, on the virtual screen indicates an image of the alpha or numerical being pressed, meaning the letter is visually enunciated, and further the alpha or numerical character looks like it is being pressed down.

A further enhanced embodiment; vehicle inspections are preformed by systematic collective data being continuously compiled from each iMechanixms or vehicles dynamics, engines analytical data configured validation determination process to iMechanixms or vehicle serviceability and functionality performance attributes, results passing inspection.

According to one embodiment, the secure virtual vehicle navigational system systematically monitors commercial vehicle speed, physical location, iBS and acceleration patterns, rapid lane changes with warnings transmitted to surrounding vehicles equipped with pAvics, OBVIPRO's or of additional certified ecomm-devices not listed, within spatial vicinity for approaching commercial trucks. Monitoring specific time of day events are archived, rest time recommended intervals for personal and commercial vehicle drivers, destination arrivals, maintenance items, declining fuel notifications, inspections, designated lane and distance factors between vehicles based on density flow rates in proportion with weight loads and vehicles maneuvering capabilities and other items notated from manufactures, historical records of vehicles capabilities of stopping and other associated human factors not listed.

Information is used to provide Traffic Data Factoring needed for risk-adjusted representation to improve road safety for every driver and provide a safer landscape that lowers insurance premiums for trucking industry, personal or commercial vehicles provided as a PSE and revenue share with state or federal DOT and accumulated data is shared with Tribal entities, share or stakeholders; wherein Tribal entities own, oversee and manage their own secure virtual vehicle navigational system within Tribal entities; and share telemetry data, recorded access to Tribal entities by non American Indians entering areas within Tribal entities.

According to one embodiment, vehicles equipped with technologies that monitor drowsiness, and from driver attention towards Reactive Responsive Patterns are compared with similar historical data from archives for relationship patterns of any driver. If consecutive repeated events of same pattern take place or detected where driver is most likely falling asleep or attentiveness is declining; notifications are sent to vehicle Obvipro with recommendations of a rest stop at nearest vector-node location, the secure virtual vehicle navigational system notifications are further sent comprising audible voice statements to assist with aiding driver in keeping awake, along with directional recommendations that may include distances and time to destination audibly heard to further aid in getting driver to destination rest stop or other desired locations such as hotels. Wherein the secure virtual vehicle navigational makes decision based drivers detection recommendations in severity of declining fatigue, e.g. from elapsed time driver has been in car, etc. Such process occurs during Phase I through Phase IV autonomously vehicle navigates to destination.

According to one embodiment, Obvipro, pAvics, smart-iDevice, tVectorHubs and the secure virtual vehicle navigational system, additional certified ecomm-devices deployed, conforms to American trucking associations (ATA) standard. Truckloads (trailers) are monitored and continuously map-tracked, thereby maintaining shipment location whereabouts at any given time and shared as a PSE for owners and Tribal entities, share or stakeholders such as product purchasers, insurers of carried goods and iMechanizm vehicle driver/owners. Such information allows shipment costs and fuel matter consumption variables to be monitored on a minute scale, along with drivers performance and providing directional and other assistance on demand.

Using traffic congestion lane variables, management decisions can be made to close certain lanes for certain types of traffic (for interstate or intrastate commerce trucks) during peak movements, thereby maneuvering traffic (packet) rates based on (packet) flow rates. By analytically resolving how much traffic is exposed or expected on different paths in advance (going to/from), encrypted calculated eComm-Advice directives are qualified by Advance Congestion Flow Routes (ACFR) converging Dynamic Analytical Rate Flow (DARF) adjusting such traffic as need to arrises for any type vehicular movements.

In one embodiment commercial or commerce trucking routes are imputed by way of a web based or a virtual interface from inside trucks Obvipro's iNavX2 virtual interface TVA and/or from trucking companies dispatcher; either from manually entering, or using iVoiceCommands that audibly fill in fields by merely speaking or entering destination or pre-configured route previously archived within users account for each specific commercial vehicle. Further this can be accomplished to accommodate companies dispatch office to enter data in a secure interface dedicated solely to this companies needs with real-time energy data compiling continuously as to precise location of every tuck, fuel used, drivers attentiveness and time to destination, drivers uptime or downtime data, example: required rest intervals and much mom, or of additional items not listed. Providing dedicated lane acquisition has no bearing on weight loads, what matters most are toxins, explosives and other hazmat items, these are most important components that system concentration is directed at. These specific informatics can be shared with commercial carries insurance, bonding agents, Tribal entities, share or stakeholders. Such entered data only enhances system preferred functionality to calculate pre-configured forecasted route variations and congestion factors assisting future lane acquisitions for both commercial and none commercial vehicles, that entered data beforehand.

Wherein particular trucks route are calculated in relationship with other trucking routes; wherein entered data is merged to create a convoy of trucks heading in a similar direction. Further traffic density determination is integrated into algorithmic models continuously updating overlay model, incorporating local density flow rates from vehicular traffic within same route. Manageability formulated with safety concentration on density, along with maintained distant variations between each vehicles from increased speeds, effectively providing lane allocation isolation, commercial conveyances cost decreases proportionally. Other vehicles are merged into this destination phase model. Continuously updating vehicles either entering and/or exiting this configured route moving onto a new route and so forth, certain or selected vehicles break ranks and merge with another established route with commercial vehicles are sent directional eComm-Advice directives as to which lane to be in, speed of convoy based on spatial artifacts, or of additional items not listed.

Wherein fuel from any type of matter electrical, hydrogen, fossil consumption variations are calculated against future traffic predictions along each leg of route and yields manageability formulated with safety concentration on density, effectively administering traffic rates proportional to density providing lane isolation, commercial iMechanixms or vehicles performance cost are further decreased.

Further, traffic may be managed based on personal inputs, by the secure virtual vehicle navigational system pre-configured, driver decided routes, example trips to and from work. Once these destinations are entered into onto a vehicle's OBVIPRO virtual screen and/or via a secure internet portal for commercial trucking entities, the secure virtual vehicle navigational system computes traffic variables based on driver inputed route destination or modified as needed for alterations in certain vehicle routes. Wherein the secure virtual vehicle navigational system computed data routes can be uploaded to smart ecomm-devices or smart-iDevice using pAvics (portable Avics) application hardware for older cars, can be added with a simple plugin module on vehicles with OBD capabilities that is iLink-sync'd with vehicles Obvipro or the users smart ecomm-devices or smart-iDevice; wherein the plugin module device only check for limited engine functions, such as without limitation O2 sensor operation, or of additional items not listed, along with transmitting the smart ecomm-devices or smart-iDevice Longlatilt positions. Wherein the OBD plugin modular device interacts with the iLink-sync'd pAvics application on any smart ecomm-device or smart-iDevice providing near identical navigational experience for traffic eComm-Advice directives that imitates vehicles built with or attached to Obvipro, advanced warning of up coming road hazards such as curves in road, hilly terrain, deer crossing areas and more, with speed adjustments based on a plurality factors of human interaction responsiveness, type and age of vehicle, population density and other variables considered based on traffic density.

According to an enhanced embodiment, each pAvics is successfully integrated configured with current locational services in smart-devices or smart-iDevices equipped will similar features as with accelerometers or a quantum compass, thereby allowing particular usage for cyclers, runners and motorcycles along with instant Mi911, locational services, or of additional features not listed. Routes or trips are archived for users to access via virtual interface, wherein user data consists of time, distance, vehicle maintenance and diagnostic records, toll road trips with entry, exit with duration times between entry and exit points, related or of additional items not listed archived or deleted as driver needs changes, or determined by the secure virtual vehicle navigational system.

Another preferred embodiment regarding motorcycle driver safety-critical features are combinational ecomm-device within pAvics, Obvipro, or of additional certified ecomm-devices or smart-iDevices not listed equipped with iChipset, iChipset$^X$ or AiChipset; wherein at least one iChipset, iChipset$^X$ or AiChipset encompasses a transponder sending randomized intervals that communicates to one or more surrounding or near to Vector-hubs or Beacon-Nodes while maneuvering on any road, public or not. Systematically, the secure virtual vehicle navigational system (Xgenx) computes logistical locational analysis forecasting each and every vehicle in vicinity of any motorcycle advising surroundings vehicles, alerted with audible or vector imagery on virtual screen of a motorcycle approaching or vis-à-vis or for motorcycle warnings of vLaneDrift from surrounding vehicles and other irregularities from approaching vehicles receive alert assist to surrounding vehicles or motorcycles of a pending or detected by the secure virtual vehicle navigational system of vehicular violations, providing essential time to take evasive action if need be.

Wherein transponder, Ultrasonic device or Ultrasonic telemetry-devices signal or tone, or both signal and tone combined or transmitted separately for redundancy of different frequencies increases as motorcycles speed increases, signal or tone itself becomes merged as a continuous or pulsating signal and tone that may be of varying frequencies, representing at least one motorcycle is approaching an XY & Z coordinates at a future time-space position, due to momentum of motorcycle and received transmissions from transponder, radar or Ultrasonic telemetry-devices, iMapTrac's a dimensional line, not straight. Greater the speed faster transponder, radar or Ultrasonic telemetry-devices repeatably sends signal, mapping becomes dimensional, since altitude relates to topography, third dimension—zFactor. The same goes for vehicular traffic at a certain momentum phase in time-space, data becomes spatial so shall transponder, radar or Ultrasonic telemetry-devices signal or tone being interpreted for overlay models at higher speeds; especially when transponder, radar or Ultrasonic telemetry-devices signal or tone and the visual display of same reached a constant signal; wherein the secure virtual vehicle navigational system provides additional data as to locational spatial relational-ship for movements calculated by comparative computations from a relational database merged with surrounding vehicles data-artifacts or sets of artifacts. Therefore, higher the speed, the signal oscillation is so fast it must become continuous, otherwise in a matter of seconds bike could be hundred feet ahead, transponder, radar or Ultrasonic telemetry-devices oscillations are proportional to momentum; wherein vehicles equipped with Avics, smart-iDevices or Obvipro detects approaching motorcycle with two wheels or more, humans carrying a smart-iDevice walking or riding across intersections; wherein transponder, radar or Ultrasonic telemetry-devices signatures maybe encapsulated each transmitted signature of different frequencies or pulsating, transmissions may initiate activations upon one or more Proximity sensors on the motorcycle or vehicle activating a faster oscillation closer one motorcycle or vehicle approaches another vehicle or motorcycle; wherein the secure virtual vehicle navigational system, along with the motorcycle or vehicles Obvipro automatically adjusts momentum of one or more vehicles equipped with at least one iChipset, iChipset$^X$ or AiChipset that may be further equipped with nano-velocimeter digital readout instead of a miles per hour/km dial, transmitting rates continuously to the secure virtual vehicle navigational system or vehicles Obvipro, adjust oscillations in transceiver and/or transponder frequency signals to surrounding vehicles from or to the secure virtual vehicle navigational system at the same time, assimilate mass movements and transmit approach warnings from additional vehicles; wherein theory of interconnected vehicles become rudimentary assisting lane merge and exists from any vehicles within a mass or not.

Wherein selected or certain vector-hub class or node-class ecomm-devices, or of additional ecomm-devices not listed may be configured to read-only while others may be configured with read/write tag devices that hold multiple pages of variable (changeable) data momentarily or fixed (unchangeable) data. Each read/write tag may include read and write encrypted password protection and allows communication over an extended area or a number of lanes. Data can be updated on tag as quickly as it passes a reader. More advanced tag devices may be configured with audio and visual indicators, where tag devices may be configured to use sound and light emitting diode (LED) message display for Obvipro's, smart-iDevices or pAvics virtual or not screens display. Wherein a liquid crystal display (LCD) or current technologies, that produces readouts to report status of each data or toll transaction, and/or in case of emergency or dignitary vehicles and arrows on onboard vehicle processors displays the ecomm-advice directional directives to move right or left depending on calculable variations from current traffic artifacts and/or come to a stop until EV's, EMV's or dignitary vehicle passes; wherein read write tag devices, for advertisements from any combination of entities using Alpha-hubs or AlphaVectorHubs, data may be fixed for certain broadcasted items, using designated frequencies, data is transmitted as requested from vehicle or driver requested, or the secure virtual vehicle navigational system suggested services may or may not be offered as a PSE with advanced system integrations in one or more particular infrastructures selected domains.

Further assisting manageability control in selective emergency vehicles; wherein transmitted transponder signals from various certified emergency vehicles equipped with one or more certified ecomm-devices, warns one or more ecomm-devices, smart-iDevice or tVectorHubs, and other devices in emergency vehicle route (EVR) forecasts; wherein vehicles in trajectory line of one or more surrounding vehicles or smart-iDevice in near vicinity of destination bearing, system appropriately configures EVR's calculated velocity; prior Phase-change computation artifacts compute map drive-ability exits points indicating controlled corrections forecasted to one or more vehicles trajectory-path, have one or more vehicles or smart-iDevice start coasting sequence pulling over towards a designated lane side; allowing the secure virtual vehicle navigational system-time to compute and transmit modified coordinates to one or more vehicles or smart-iDevice forward of EVR (emergency vehicles route), allowing the secure virtual vehicle navigational system to verify calculated future-phase-time (FPT) positional artifacts prior to transmission for current vehicles route destination. Wherein same or similar sequential procedural event takes place for any type selected vehicles or smart-iDevice, e.g. a mass transit semi-autonomous or autonomous vehicles, school busses, intra/interstate freight transport vehicle devices, police, dignitaries, or of additional autonomous vehicular devices not listed.

An embodiment comprising a pulsating and/or constant signal strength transmission, provides a channeled telemetry protocol, that may provide a radio frequency transmission embedded within one or more certified ecomm-devices, either driver activated request sent to the secure virtual vehicle navigational system or system computed route; wherein neighboring inter-connective vehicles equipped with certified ecomm-devices receive the associated signals; wherein transponder confirms the signals execution of the ecomm-advice directives, are further pushed to one or more certified localized iCloudServers, automatically pushed to one or more secure virtual vehicle navigational system servers within a specific iNetworked domain; wherein calculations are computed as to emergency vehicles Longlatilt locational trajectory planned or loaded in system prior to movement. Furthermore, coordinate corrections or corresponding vehicles signals are transmitted to each inter-connective ecomm-device or smart-iDevice near-to vehicles programmed trajectories path; wherein encrypted advisory directives are dispatched through encapsulated transmissions that may use radio waves, to one or more vehicles within one or more mass or grouped clustered-mass of vehicles, advising directional movements, e.g. to move to a certain side of road, turn onto adjacent road providing new coordinates of calculable path based on vehicles original destination; opening a clear unobstructed path for any type emergency or dignitaries vehicle along a determined configured route. Wherein each standing traffic light or tVectorhub communicates with existing vehicle traffic controllers, indicating a stop sign or replacement of older traffic lights or of additional devices not listed within transports or vehicles trajectory path, each navigational vehicles within the determined route sequential timing alterations in a new route changes, further allowing protection along determined route.

According to one embodiment, present within Avics may include one or more RFID transponders/receivers/transmitter/Ultrasonic telemetry-device and can be activated in event of a heightened security reasons. A basic RFID system consists of tag device, antennas, and reader's radio frequency (RF) source is either integrated or a separate component that may be hardcoded within one or more iChipset, iChipset$^X$ or AiChipset that controls activation of the one or more transponders/receivers/transmitter/Ultrasonic telemetry-device. Each reader broadcasts RF energy signal over an adjustable area called extended read zone or reader footprint. Wherein a Tag on the vehicle reflects a small part of this RF energy back to the antenna. Such reflected radio waves denote tag's unique identification code, or of additional stored data not listed. Internal antenna relays signal to reader, which can add information such as date/time, vehicle's VIN # to tag's identification code, and stores it in a buffer. Said reader can then transmit tag's identification code along a communication network to one and/or more ecomm-devices within Obvipro processing systems, when traveling on a pre-configured route or a vehicle that has just entered same route for a partial distance.

Herein after term Obvipro may include at least one iChipset, iChipset$^X$ or AiChipset; that may be stacked upon each other within an array of processors; wherein each is a collection of identified circuits pre-configure preforming certain tasks, e.g. to time stamp and mark each data received and transmitted with each ecomm-device data-relics passing through, at least one iChipset, iChipset$^X$ or AiChipset within array receives encapsulated encrypted data directives, after time-stamped data is handed off and/or transferred over to adjoining transceivers or transmitters iChipset, iChipset$^X$ or AiChipset forwarding data-relics onto one or more sub-navigational devices prior device was iLink-sync'd, authenticated and registered with upon startup; wherein at least one iChipset, iChipset$^X$ or AiChipset may only include vehicles Vin #, SHID IDT, or of additional identifications not listed, registration informatics, license number, insurance or other datasets, some data may be hard-coded read only privilege, others data may be merely updated providing data-relics of older datasets of prior data-relics such as renewal of insurance, inspection, etc.; wherein directional data-relics move further onto next asymmetrically or symmetrically inter-connected ecomm-devices for protection reasons onto a repeater tower, onto a server within range of nearest iNavCom center; wherein the secure virtual vehicle navigational system calculates trajectories, frequency flow for at least one vehicle that may be in a cluster of vehicles or not within a domain network infrastructure; wherein the data reverse occurs once computations are derived.

Incorporating modulated backscatter technology allows ecomm-device readers to communicate with tagged objects traveling in excess of normally specified 100 miles per hour (160 kilometers per hour). This technology can also operate from as far away as 100 feet or more (30.5 meters). This highly stable, reliable, and reflective method of wireless or wired reader-to-tag communication allows automatic identification equipment within vehicles VIN # or by encrypted reverse binary IDT # assigned to a particular vehicle as a unique identification or other pertinent requested data being requested stored or added.

According to one embodiment comprising present invention wherein vehicles approach to a ecomm-device utilizes Universal Plug and Play (UPnP) as a Telematic synchronization tool-set. Vehicles registered initially within a home-based domain infrastructure moving into another municipalities near home-domain, vehicles registration is verified using a transponder key-set signal; transmitted via internet or full telemetry spectrum including SD-WAN that may be used within at least one domain infrastructure, repeater towers or whatever communication means necessary to forward vehicles current navigational data-string. Wherein associated matched key-set requested from entered domains secure virtual vehicle navigational system server, vehicle responder transmits hard-coded matched response key-set. Wherein plugnplay data or PNPD activation, further verifies vehicle ownership records, once cleared authenticated parsed navigational data continues for any type vehicles moving into a surrounding inter-connected infrastructure, advices Obvipro granting registered iLink-sync'd to navigate in adjacent infrastructures, networked domains or simply passing through each. Wherein or or mote parts of authentication process negotiates activation via text message configured alpha/numeric or binary as in one or more 1's and 0's as a secondary verification procedure driver or Obvipro utilize activation for each ecomm-device or in sequential parts thereof in separated time: wherein question of vehicles verification ownership or on-board processor may be compromised or vehicles integrity.

Service Discovery for any vehicles for local hotspots, PnP in past was used as middleware in network environments, using PNPD (plug n play discovery) service discovery for each vehicle, vehicles are able to discover local services such as ODNA and merchants local service directories for each state or country, receive digital encrypted directives broadcasted automatically from ecomm-devices, and use them without priori or current knowledge for any local Wi-Fi hub-spot and its network locations creating another layer of security from assigned SHID in each ecomm-device. In other words alterations in ecomm-device locations transmissions, may or may not comprise a pulsating signal adjustments; wherein parts of transmittable ecomm-advice data to one or more vehicles is moved up roadway to at least one hub sensor device, a tVectorHub at an intersection in same directional movement of traffic adding another layer of security during high speeds or heightened alert status, to one or more Obvipro's, pAvics or additional vector-hub class or node-class ecomm-devices may take place from randomized tVectorHubs and/or sub-hub devices, adding another layer of security that works quite well with SentryBeaconHubs, BeaconHubs or SentryHubs ecomm-devices that monitor non-registered vehicle transmissions, due to tampering, equipped with Avics iChipset, iChipset$^X$ or AiChipset; RFIDGPS that may be stacked on top of each other, preforming independent configured tasks or tracking datas time; wherein installation may be on or acting as transports or vehicles license plate or a simple iChipset within at least one iChipset, iChipset$^X$ or AiChipset interconnected to Obvipro's main processor, that only transmits data such as insurance, vehicles VIN, inspection, status and all other telematic informational data; e.g. inspection, registration and insurance within each vehicle for read and write up date by the secure virtual vehicle navigational system adding to current datas historical records never deleting older records; includes older vehicles without ODB technology, all other transport or vehicles using pAvics or Obvipro.

Embarrassing a standardized embodiment in near field ecomm-advice encrypted data push, preferred comm-link in support of close proximity interoperability concerns or issues; wherein the secure virtual vehicle navigational system reliability towards H2V, V2H, I2V, I2V or V2V in conjunction within range of 5.9 GHz DSRC and other commonly and/or authorized frequencies, secure communication data-links used now or in future for purpose of to navigate semi-autonomous or autonomous vehicles of any type, including hovering vehicles or transports; one or more ecomm-devices may only communicate on certain defined frequencies, such as, example: 5.903, 5.925, 5.9508 and so on or additional certified defined segmented frequency channels such as radio transceiver device, transponders, Ultrasonic telemetry-beacons or devices, telephone communications device transmitting on any certified frequency channel known now or contemplated in future to transmit navigational directives, or of additional items not listed. Wherein data-links may have granular configuration capabilities, such that data sent or received is encapsulated in an encrypted wrapper and/or parts of the ecomm-advice directives are transmitted through on different frequencies and/or devices before reaching vehicles Obvipro or smart-iDevices; or moving data in short bursts to or through at least one ecomm-device at a time, parts thereof may have a link-key embedded within data transmission; wherein receiving ecomm-device detects additional data is forthcoming, wherein such data-facts purposely delay waiting on vehicles reaction intervals or surrounding trajectory conditions of other transports or vehicles to execute the ecomm-advice directives, sending confirmation of the executed ecomm-advice to either the secure virtual vehicle navigational, Obvipro, or smart-iDevices. Such configuration adds another layer of security and confuses potential attacks on infrastructure networked domains. Wherein data's wrapper has previous edcomm-devices or ecomm-devices credentials (Longlatilt and/or SHID), or of additional items not listed that receives coordinates from sent device's Paired-key Set matched received ecomm-devices matched set; wherein each transport or vehicles ecomm-device stores one or more parts of the received ecomm-advice initiated by the secure virtual vehicle navigational or Obvipro at a future time. However for long distant standard communication convergence may comprise Wi-Fi, SD-Wan, MVD's, vehicle-domains, smart-iDevices, electrical lines, copper, fiber communication, phone lines, and satellites, wherein one or more navigational component directives may be encrypted traffic derivatives, where some items being transmitted via internet or secure intranets that incorporate Vector Repeater eComm-Devices attached to existing or new Repeater Towers or placed separately on other communication towers or poles, one or more vehicles, camera's, freeways or on other high structures like bridges, where line-of-site is measured in 20-35 plus miles give or take, depending on height to tower with surrounding building density. Such repeater devices are used for communications between different municipal linked infrastructures. The secure virtual vehicle navigational system establishes acute and economical vehicle phase-change spatial locational awareness for practical purposes in constant contact managing vehicle momentum, providing Architectural Telematic Intelligence from secure private infrastructures. Replacing higher traffic signs that have horizontal overhangs, removing these and leaving vertical towers, cities can add their on Wi-Fi system to these towered polls, creating their own income by further controlling and not sharing communication responsibilities with other entities. These wifi Wi-Fi hotspots can boost coverages with repeaters in longer distance by encrypted data pushes to multiple ecomm-devices in several directions at once. Wherein repeater towers may only be Synchronize with one or more edcomm-devices, which transfers data to one or more vector-hub class or node-class ecomm-devices communicating directly to the secure virtual vehicle navigational system, or at least one additional vector-hub class, node-class or vehicles ecomm-device.

Another enhanced embodiment in telemetry mobility, provides data-fact transmission and reception of or acknowledgment of a transponder signal between the secure virtual vehicle navigational system or in P2P iLink-sync'd communications with pAvics, smart-iDevices, compliant certified ecomm-device or of additional ecomm-devices not listed including navigational sensor ecomm-devices built in iCP or a vehicles guidance system, may transmit in varying frequencies or tones; wherein dependent of trace-route, traffic density currently known or anticipated congestion artifact records as to emergency routes forecasted for evacuation probabilities or procedures transmissions are enhanced by one or more femtocells as mini-repeater towers for data-string transmissions of emergency alert notifications including weather alerts as to lane acquisition and other cellular data-facts for any deployment stage one through four; wherein further combinations of comm-links may use cell phone signal boosters/repeaters to advance amplification of one or more data-string, data-facts or data-sets, including datum, data or sense datum transmissions; wherein picocells, microcells or femtocells are deployed in one or more tVectorhubs, vector-hub class, node-class ecomm-devices, or of additional certified compliant ecomm-devices not listed; wherein data-facts are transmitted to all navigating traffic within an area of an accident, emergency, impeding or after a disaster, a programmed event that may measure response analytics to forecast future deployment techniques, modifications in ecomm-advice directives, to test either semi-autonomous or autonomous vehicles reactive responsiveness in the execution of ecomm-advice directives, or or additional items not listed. Wherein in a real-time incident virtual or not accident re-enactment, a reconstruction of a mishap, anticipated mishap or accident providing time lapsed causes whether the mishap or accident was due to human error, a vehicle either semi-autonomous or autonomous iBS or conventional braking system, iCP, guidance system components, sensor, devices, or of additional items not listed a failure or interoperability concerns or issues; wherein one or more vehicle-iDomains, vehicle, public transportation, school buses, law enforcement vehicles, emergency vehicles (EMV's) or other vehicles including motorcycles may be further equipped with at least one femtocell, microcell, picocell to boost or assist in communicating with multiple vehicles (including commercial trucks or service vehicles each of any type) within any mass, a single vehicle-iDomain, human-domain, transport-domain or a iDomain of any type in communication with another vehicle-domain to aid in transmitting or receiving bounced or hopping communication points with other inter-connected vehicles or not, transports or vehicles within a mass or not and so on.

According to one embodiment, reflective, passive, tag devices are used instead of traditional transmitter or "active" tag devices. Because tag devices simply reflects reader's signal, there are no frequencies to synchronize, interference from other radio frequency sources are rare. Frequency changes can be made in reader, eliminating tag or ecomm-device errors or recalls. Further, reflective tag device require less internal power than traditional transmitter tag device so they have a longer life, greater range than bar code, infrared, other passive systems; moving this embodiment further encompasses Telemetry Scalability; wherein in the event of to impart or exchange information from the secure virtual vehicle navigational system through one or more certified capable mobile or stationary sensors scale across different devices, insuring a safety protocol within infrastructure dedicated to enhance recorded events from multiple sensor apparatuses, scaling as needed based on present network traffic artifacts in relationship with congestion of in-part to portion of future traffic congestion at phase-time positional points relative to a domains computing process to transmit through multiple sensor appliances at same time, initially routed by at least one connected repeater tower, iDomain, MVD or a vehicle-domain.

As is known in the art, an RFID tag is defined as active if a battery inside the tag housing device provides power to the tag or the tag is connected to an external power source. A tag is defined as passive if it has no battery. In applications that use passive tag device, RF energy from one or more solar-cells or solar-cell modules disposed on windshield side of tags device that powers tags circuitry, signal. The choice of active versus passive tag device has consequences for overall system cost, that is the initial tag device cost, life, and battery life expectancy.

Passive tag devices have a lower overall cost due to low-cost tag device and long tag life. The lifespan of passive tag device is indefinite because the tag has no battery. The choice between active tag device and passive tag device is related to other system design issues. Active tag device can support higher data rates and higher chip processing speeds, but passive tag device also support data rates and chip processing speeds that are suitable for high-performance applications such as toll. Active tag device can support user interfaces (lights and LEDs), but tag interfaces reduce battery life. A disadvantage of passive tag device is that some countries do not allow sufficient interrogator power and suitable RF frequencies to support the range necessary for some high-performance applications.

Active tag devices have a higher overall cost in ownership including battery changes. Battery life is a primary concern for reliability and for cost of operation. In toll applications, for example, battery outages, which can cause RFID transactions to be processed as violations, are expensive and time-consuming both to users and toll road operators. Battery life depends on the battery capacity and the long-term average power drain. An overall view of tag cost must assess tag replacement costs for tag device with fixed batteries or battery replacement costs for active tag device with user-replaceable batteries, or a toll tag or tag device with one side being a solar panel. Thus, each Avics iChipset, iChipset$^x$ or AiChipset encapsulated inside a tag device, VectorHub Class or node-class ecomm-device, Node and other certified compliant ecomm-devices equipped with solar panels to prevent outages and are equipped with either both passive or active read or read/write capabilities for any given deployment variable. A noteworthy example is the allocation for read only passive data received verified from prior transmissions sent, compared with or against previous transmissions from each mobile ecomm-devices registration class identification being transmitted, parsing SHID and other data before sending data received to the secure virtual vehicle navigational system matched with Sensitivity Factors from BeaconSentryHubs.

According to one embodiment, the remote exchanged encrypted communication device includes an RFIDGPS Modules transponder/receiver/transmitter and at least one Ultrasonic telemetry-beacon or device, and one or more iChipset, iChipset$^x$ or AiChipset having cellular capabilities of all known variations for extended coverage due to environmental errors or elements of interference, such as without limitation weather, solar flares, and the like. Each tVectorHub, vector-hub class or node-class ecomm-devices may be configured to be routinely verified by an encrypted data push for original data composition. Random number and/or a selected group of ecomm-devices in certain areas when communications are limited, combinational com-links may consistent of electrical grid, on near telephone lines, when necessary utilization of cable TV lines in areas where this might be the only alternative for a useful back-up for redundancy purposes.

On deployment a encrypted token is placed within each unit's core NOS (also known as the nuclex operating system), the OSV$^x$ has two levels, first (primary) level is strictly for verification of matched keys for all communications directives. Each matched key has a specific paired-key for communications sent from either the secure virtual vehicle navigational system transmissions or from registered certified compliant ecomm-devices, vehicles attached to Obvipro (onboard vehicle processor), smart-iDevices or portable Avics ecomm-device (pAvics), each of which are assigned there own iKeysets (also known as Identified KeySet). These encrypted matched keys are hard coded into the ecomm-devices systems NOS upon installation, furthermore there are two levels of key matched sequence occurrences for security purposes. Along with a third level authentication process of these matched iKeysets that is setup to send randomized from NOS and sent to primary level of $OSV^X$ for security verification purposes, as to $OSV^X$ original integrity construct. If the operational $OSV^X$ is hit with a breach, a power surge, the NOS has been compromised or otherwise a contravention in protocol from failure or end-of-live hardware, then the $OSV^X$ is rolled back to from a primary call from the secure virtual vehicle navigational system to revert to the encrypted encapsulated original NOS status, deleting the older version in the primary $OSV^X$ level—using current secure encrypted remote deletion technology; wherein ecomm-device system goal reached benefits each ecomm-devices NOS heals $OSV^X$ as needed or requested by the secure virtual vehicle navigational system.

Data exchange transmission to at least one tVectorHub, vector-hub class or node-class ecomm-devices via one or more 'token sets' assigned to each hub requesting matched Paired-Key reply from NOS for security purposes, originally implanted as a unique identifier hardcoded assigned to ecomm-devices $SHID^X$. Wherein $SHID^X$ iKeysets acts as the Core Verification iLink-sync'd processing status for each ecomm-devices in communication with another ecomm-device, secure or not. These iKeysets are none executable, receiving ecomm-device only responds to with a specific Paired-Key of the iKeyset embedded in ecomm-devices NOS or in portable device hardware/software application download. Data transmission is not only encrypted within the exchange, the embedded matched response Key-set may be hidden in transmission and ecomm-device receiving transmission acknowledges the paired key instantaneously when received; utilizing encapsulated encrypted data push. Any break in link communication, the secure virtual vehicle navigational system or the ecomm-device requests iKeySet (system Identified KeySet) re-verification that is embedded in ecomm-devices NOS only; wherein system acknowledges the corresponding response Paired iKey-set for a final determination as to ecomm-devices integrity; communication continues or stops, or based on additional factors not listed, data-exchange may be only monitored until verification is trusted or requires physical maintenance, by certified techniques.

The secure virtual vehicle navigational system includes theft protection protocol, built into each ecomm-device or downloadable Avics iChipset, $iChipset^X$ or AiChipset depending on preferred features and areas deployed relative to specific communications available. If a vehicle, including a truck, motorcycles or any other transport or vehicular apparatus device such as bicycles (iChipset located in frame not able to be seen) are stolen, owner activates notifications transmitted via a mobile application to the secure virtual vehicle navigational system (Xgenx) initiating transmission of ecomm-device GeoiLoc. The present the secure virtual vehicle navigational system is further configured to transmit a deactivation command to Obvipro, certified compliant ecomm-device equipped with Avics iChipset, $iChipset^X$ or AiChipset, when vehicle is not moving for safety reasons or in a parking lot area, with possible siren activation. The GPSGIS or GeoiLoc navigational spatial-location transmits instantly to local authorities for pickup and/or investigation. This also may be a shared PSE with local Tribal entities, share or stakeholders, state or federal DOT and in turn see a major reduction in insurable risk and reduction of premiums.

According to one embodiment, each Avics iChipset, $iChipset^X$ or AiChipset is locked and hard coded into each OBVIPRO to prevent tampering. A fail safe code may be applied. If tampered with, the vehicle will not start, sending a distress signal out and only a dealer or other certified entities will have the ability to re-activate, similar to current ignition key codes. [I]f transport or vehicular apparatus ecomm-device e.g. Obvipro, pAvics, smart-iDevices or other certified devices not listed, telemetry-beacons or vector hub-class ecomm-devices are physically tampered with or broken open, entire NOS, memory mediums and $OSV^X$ each is completely purged securely, leaving no trace records; similar to erasing a Mac's hard-drive a tamper switch code. Since each ecomm-devices programmed data volume is small, only take a few nano-seconds deleting drive contents, leaving null trace records, since each device does not store engine or telemetry data.

According to one embodiment, all sub navigational systems, also known as (Subnaysys) (example: stationary of one or more mobile cameras for trouble areas, street lighting, traffic lights are built with or attached to that includes the FRIDGPS Module, tVectorHubs and Obvipro's and the like) are separate from each other on inputs to the secure virtual vehicle navigational 'system'. Data exchange feeds may or may not be compartmentalized through sub-navigational systems for each ecomm-device type for security reasons. Data collections are verified as to VIN #'s locational address, results are computed and sent to the secure virtual vehicle navigational system to complete computational traffic flow recommendations possibly through a secure two-way paired VCPI (Virtual Cryptic Private Infrastructure) connection. At times archived data requests are sent to separate archived encrypted traffic data repositories using specific data vector-call points (time intervals) from a particular sub-navigational system for analytical comparative computations or for legal occurrences or accident reconstruction analytics as a PSE, in the event of an accident at any given intersection, roadways, private properties or parking lots whether private of public.

The architectural behavior within each ecomm-devices infrastructure, systematically relies on itself for security by not allowing outside communications with other devices. Data transmission exchange detects anomalies such as privileged user access and the associated users console, as to there possible associated threats if shared data is audited through controlled access points for data requests solely from a dedicated server, never directly to given areas within and data base Xgenasys uses or has read, write allowances. Further these requests are sent to a separate server, such that only then the behavior of the datas requested information is tracked with tMarkers as the retrieved data that is requested for sent server or better known as 'SecServ' requested from a ArcSery along with ArctMarker post dating data as to its validity. The process encompasses real-time trackable monitoring, providing Behavior Threat Intelligent Analytics with configurable reporting for regulatory compliance levels from datas inception points to the transfer of shared demand calls from tArcNets (also known as Trusted Architectural Networks), that are registered certified share holders servers where data requests are sent to or requested from.

Such intersections or on roadways that have accidents, each on-board vehicle processor (Obvipro) or pAvics an impact sensor or device determines the vector impact GeoiLoc including all surrounding ILink-sync'd vehicles geo-positional points at time of recorded incident, surrounding vector-hub class or node-class ecomm-devices record-artifacts are comparatively analyzed, whether activated from striking a stationary object, another vehicle or from navigational corrections either by humans, guidance system controller including navigational component errors; wherein each Obvipro or portable smart devices that have installed the downloadable pAvics application activates a distress sequence call on impact from current sensors already deployed in newer vehicles, or of additional devices or sensors not listed; wherein on semi-autonomous vehicles pAvics are further built with a Contact Hub-device (CHD) that includes FRIDGPS Module located under the hood or trunk, or both areas that are linked and paired with vehicles ecomm-device that installed the downloadable software being wired or using Wi-Fi, however safety-critical concerns with multiple Wi-Fi devices in vehicles may be subject to hackers or electrical disturbances between Wi-Fi transmissions or receiving devices, or of additional reasoning not listed; and wherein autonomous vehicles built with or that includes the FRIDGPS Module built into Obvipro that has installed current version of the downloadable application being verified by the secure virtual vehicle navigational system, where CHD is built with or includes at least two or more of, example: impact fuel sensor, fuel cutoff sensor, impact sensor, inertial sensor, shock sensor, accelerometer sensor detecting an abrupt stop or impact, or a vibration sensor for Redundancy of Assurance (ROA) of an indisputable accident detection event; wherein newer vehicle equipped built with at least one of the aforementioned sensors are further not added the CHD do to liability of error, that one sensor may not be sufficient to detect a reason of an accident, impact or loss of life; wherein newer vehicle equipped built with at least one of the aforementioned sensors are further added the CHD do to liability of error, that one sensor may not be sufficient to detect a reason of an accident, impact or loss of life; wherein upon activation of the sequence distress call being initiated transmits three separate messages; wherein first message being sent by each vehicles ecomm-devices received notifications of CHD a contact, sends a MiSOS providing Geo-positional GeoiLoc to both the secure virtual vehicle navigational system via a plurality of the vector-hub class, node-class ecomm-devices, vehicles ecomm-devices, and same message to 911 dispatch sends notices to police, EMS and fire trucks, second transmission being sent to surrounding linked and paired vehicles ecomm-device notifications of accident instructing to decrease speed safely or stop providing Geo-positional GeoiLoc being sent to the secure virtual vehicle navigational system instantly; wherein the third message being sent as a followup to first message sent to the secure virtual vehicle navigational that surrounding vehicles confirmed said received messages that are transferred to or sent directly to the secure virtual vehicle navigational system allowing time to calculate approaching traffic being migrated to alternate iRout-iPaths, notifying vehicle near to accident to move towards opposite lane of accident lane; wherein in the event to a accident with a parked car the sequence distress call is similar, unless vehicle hitting parked car is not equipment with ecomm-device that includes the RFIDGPS Module, surrounding vehicles and vehicle hit the cameras within vehicle takes multiple images on impact; wherein older vehicle vector analytics activates a similar process for portable ecomm-device or smart-iDevices activates a emergency transponder call on a different frequency, including each vehicle involved the secure virtual vehicle navigational system requests vector call points {Longlatilt} along with corresponding virtual vector nodes, including tMarkerTrails from each vector-hub class or node-class ecomm-devices, or of additional sensors or devices not listed, including communications between surrounding ecomm-devices prior to accident time-frame from seconds, minutes or longer before incident occurred, retrieved from municipal repositories as a PSE, in the event of a lawsuit filed or other informational matters requested by certified Tribal entities, share or stakeholders; wherein stakeholders are companies that rely or depend on with Full Trust of Confidence (FTOC) of the secure virtual vehicle navigational system complex; wherein share holders are entities that generate income that provide the FTOA; wherein stakeholders, include cities, private entities that over see, program, generate BTI, or of additional entities that build Reliability of Dedicated Design (RODD) the plurality of vector-hub class or node-class ecomm-devices, or of additional devices not listed, there configured components within similar to NASA's products or services.

As with insurance companies now, the amount of data files system compiles regarding driver and vehicular behaviorism accessible is not staggering. The tMarkerTrail for any vehicle, summarizes and verifies not only specific locational time frames, Phase-Change Artifacts from Longlatilt geographical positional changes are detectable from transmissions formed in overlay models, the dataset transmissions are minute based composite data string uses acronyms or acronyms that may be turned into binary code 1's an 0's, that may be encrypted.

The same goes from comparative data facts held by claims from insurable losses from property and causality claims records; from wind, hail, floods or other natural causes for houses and commercial properties, the informatics generated from the secure virtual vehicle navigational system reflects predictable costs associated with similar cost of the same kind happening to the same structure or vehicle any time in the future and can be handled with staff, preferably from calculated algorithms verified by humans, or verified by certified general contractors that employ independent claim adjustors. The secure virtual vehicle navigational system provides similar readiness from analytical data records, not only for locational points for every vehicular movement motorized or not, within a pre-configured requested time frame, providing specific distances between vehicles from any event, compared with x2Factors from those vehicles that approached the intersection from all angles or lanes, along with the camera data images retrieved will coincide with vehicle speeds, Phase-Change Spatial Position in proportion to all other vehicles at the time of incident, eliminates probabilistic arguments in the event of any type of detected accident, including comparative artifacts that set the incident in motion detected by at least two or more of the following sensors for redundancy of determination of an impact, example: impact fuel or impact sensor, inertial sensor, shock sensor, accelerometer, vibration sensor, or of additional devices or sensors not listed.

According to one embodiment, SentinelHubs or SentinelBeacon are used in school zones and inside school and public transportation to protect children and in areas of known speeding occurrences; wherein school busses or public transportation vehicles are either built with or that is attached to a ecomm-device that includes the RFIDGPS Module, recording violations of speeding or passing a stop school bus from vehicles equipped with pAvics, smart-iDevices or Obvipro. These SentinelHubs are deployed during Phase I, placed without limitation into small concrete structures by school zones, light poles and use the steel pipe as an antenna, unbeknown to passing traffic. The amount time saved versus the revenue to expense in respect to safety officers can broaden the scope of this tech feed to minimize reaction times and save fuel and shifting man power to other needs. Violation notifications are sent via iVocX and/or displayed on virtual interface, that can be viewed by law enforcement vehicles and command center as soon as it happens.

Furthermore, law enforcement agencies are able to view specific vehicles; wherein the secure virtual vehicle navigational system warns other vehicles within a chase zone to move over or stop, allowing constant map-tracking of pursued vehicles safely and relentlessly. The secure virtual vehicle navigational system further systematically transfers of one or more other mapped domains pushed as requested from officer or the secure virtual vehicle navigational system generated pursuant to the need. The in-car device for law enforcement personnel, further allows virtual real-time mapping of one or more tracked vehicles, in one or more domains; wherein one or more certified emergency transports or vehicles have the capabilities of to act as a Identified Mobile-Domain (IMD) in communication with the secure virtual vehicle navigational system using a mobile Repeater Tower, or of additional communication devices not listed of various sizes in long or short range capacity, depending on circumstances or need. Each identified mobile-domain hub and/or sub-hub class-device attached to IMD, navigating a plurality of transport or vehicles in the event of civil emergency or weather event, over riding the secure virtual vehicle navigational system or in conjunction with at least one secure virtual vehicle navigational system directives based on computed routes for one or more infrastructures downed command centers, operationally mapped to, from one or more adjacent or near iNavCom centers effectively facilitating functional navigational directives, providing redundancy within one or more matrix areas or regions.

According to one embodiment, protecting data transmissions is accomplished by using Encrypted Data Push Technology. Such data directives are simple Crypsis Tokenized encapsulated commands based on a configured predefined executable task or tasks, complex or not reduced down to simple encrypted directives, sent from the secure virtual vehicle navigational system to any on-board vehicle processor (Obvipro), pAvics or other certified encrypted communication devices via vector hub-class ecomm-devices throughout the domains networked infrastructure. Some vector hub-class edcomm-devices, such as pAvics installations may be for personal usage only used to identify or provide route location of humans hiking or on bicycles on smart-iDevices. Wherein certain ecomm-devices are setup as a SentryHub or a tVectorHub, or of additional ecomm-devices not listed combined with out knowing the status of either ecomm-devices installations activation. Furthermore these basic functions can be activated on demand from iNavCom as needed for security, using TSF to protect the secure virtual vehicle navigational system inter-connectivity.

According to one embodiment utilizing RFIDGPS Isolation Integration, the location of each OBVIPRO (vehicle) is determined at all times, throughout the network, creating a dynamic isolation architecture that the secure virtual vehicle navigational system uses to compute traffic variables quickly.

Wherein turn signal activation by the secure virtual vehicle navigational 'system' computational encrypted iVoiceCommand eComm-Advice directives or autonomously in the advanced phase of deployment activating turn signals for programmed or not angular movements. Each activation (e.g. turn that may not be signal by driver, brake) in conjunction with vehicles operational request and/or 'system' driven inputs to OBVIPRO that activates a turn signal request, in turn will provide advance notification features given with or without iVoiceCommands, visual displays on Obvipro's iNavX2 virtual interface screen; wherein vTel Architecture consists of Telemetry Networked Topology; wherein endpoints are viewed by hybrid features linked symmetrical or asymmetrical, wherein nodes and hub-devices transmit allied in interconnected arteries of servers within any domain networked infrastructure; wherein one or more vehicles traversing between sub hub-class ecomm-devices transmitting virtual scenic surrounding, incorporating ring, tree, bus, star or hybrid combinational topologies of each.

According to one embodiment the surrounding drivers will know in advance of operational maneuvers. Wherein calculative suggestive corrections during a planned destination or an excursion, signals surrounding Obvipro's with adjustable variations to allow lanes changes or driver brake responses from other vehicular movements detected by vehicles ecomm-device the secure virtual vehicle navigational 'system' generated or by human intervention and/or autonomously or semi-autonomous. Thus, adaptive traffic lights, cameras and other current mechanical or human intervention that adjusts signaling operational modifications that respond to traffic congestion at any given intersection, is only part of the equation. Further drivers are able to take over full control of vehicle, while 'system' makes recommendations as to speed variations minimizing traffic inertia parameters, simple by reducing flow density rates between any traffic light.

System provides controlled encrypted navigational directives, wherein one or more iMechanizm or vehicle within a mass or one or more clustered masses traversing in a directional controlled flow frequency rate; wherein the momentum of one or more transports within a determined mass are similar in distance and momentum, within one more clusters their frequency rate flow is constrained by: throttling energy flow, either increasing momentum or decreasing one or more vehicles within connected domains within a specific mass or of one or more clusters; wherein determined energy consumption momentum power regulates suppression, based on the dissemination of partially or wholly calculated density or one or more transports spatial analytics as to phase-change future artifacts prior location to one or more transports within a cluster at a predetermined X,Y & Z future coordinate or subordinate angular coordinates providing different elements of one or more transports in an organizational departure or entry into one or more safe positions within the mass at determined calculated frequency flow rate with surrounding vehicles within a mass or clusters of one or more masses of vehicles within; wherein current time rate measured against the mass velocity expected value momentum in future time for at least one controlled vehicle entering the mass at a given future time interval; wherein one or more vehicles within the mass or clustered-mass computed overlapping diagramed map allows controlled throttle entry, due to surrounding drafting benefits from one or more forward vehicles. Thus energy propulsion matter becomes self aware as to it surroundings, of course rendering topography and climatic valuables and other embodiments herein, the equation provides further enhancements of quadratic benefits.

Another elementary embodiment of the secure virtual vehicle navigational 'system' generates simple Authoritative Encrypted Digital Traffic Directives formulated from calculable data received from a plurality of Vector-hub Class or node-class ecomm-devices, and other certified ecomm-devices regarding the spatial position during initial deployment phase when pAvics transmissions notify specific vehicles approaching a lane drift intentional or not. Activating turn signals, recommend adjusting IBS capacity if needed or to maintain constraints in flow rates with recommendations from digital audible or visual commands, generated recommendations to surrounding vehicular traffic with evasive maneuverable recommendation either by iVoiceCommands (iVocX) to driver and/or with visual ecomm-advice directives, auto generated for those vehicles equipped with Obvipro's to purposely activate and turn on blinkers in certain Obvipro's as instructed when the need arrises in final Phase 3 integration; wherein transited coded elements disguised with one or more matched cypher keys, for the purpose of to display results in various formats, e.g. pdf's, on web based interface devices, voice tones audibly heard or displayed on virtual interface; encrypted navigational directives or communications from one vehicle location to other inter-connected surrounding ecomm-devices, e.g. Obvipro, pAvics and hub sensor ecomm-devices.

Eliminating the experienced phenomenon all of us have encountered, even with newer vehicles not to mention older transportation units, blinkers just don't work right. That being said, adjusting this one x2factor error brings essential predictability. This one item can save many lives and change the entire landscape for vehicular management standardization within a traffic infrastructure. Furthermore, lane change assistance initiated by driver (semi-autonomous) or autonomously initiated by secure virtual vehicle navigational 'system' and Obvipro notifying other vehicles in the same vicinity, forecasting predicated Spatial Distance Factors (SDF) pre-adjustments to surrounding traffic with or without audible and/or visual assistance for any planned or not routes, an always monitoring each vehicles location in respect to other vehicular Phase-Change Spatial Position. Traffic itself becomes relatively conscious from predicate calculus.

The preferred embodiment in forecasting vehicular positional modifications, is based on historical reactions from drivers, systematically assimilate categorical classifications from prior vehicle type movements, grouping brand and model type and other comparative analytical data with each type of vehicles capabilities to navigate either autonomously, semi-autonomous or manually combined with older vehicles and the drivers specific 'distributed grouped classification' from calculable historical records for IHF (identified human factors) grouped into specific classifications, e.g. age, attentiveness, or of additional items not listed, machines guidance system or vehicles behavioral adaptation to responsive data received or transmitted, allowing the secure virtual vehicle navigational system or Obvipro to learn as fast as it receives data as to how any future navigability event should be adjusted based on semi-autonomous or autonomous vehicles navigational capabilities, capacity and drivers reactiveness ranking in proportion to surrounding vehicles, age, or of additional items being compared not listed. These adjustable attributes are collected during Phase I implementation examination, wherein deployment of pAvics, smart-iDevices and other certified ecomm-devices, or of additional ecomm-device not listed continuously gathers specified artifacts based on vehicle vs. navigational appreciable computations between semi-autonomous vs. autonomous phase-change positional points in relational spatial vector-change to compiled IHF's factors.

The secure virtual vehicle navigational system comprises Delimited Traffic Analysis updated continuously with Factored Time Constraints adjusting vehicular flow rates, computed from each vehicles current Positional Vector Nodes archived. Such computational data encompasses alternate destination routes, modifications in flow rates, including perpendicular road intersections along same route, providing controlled momentum for surrounding vehicles based on surrounding Predicated Traffic Artifacts.

According to one embodiment, the present invention successfully collects encrypted observations, quantum vector nodes associated vector points building a matrix virtually provided by every vehicle throughout a domains infrastructure displayable in the virtual interface within a given domain area infrastructure as requested in a localized area in relationship with other vehicles within the same infrastructure area, computing pre-configured speeds, future lane turn notifications and adjustments, entry or exit vector points from specific roadways from archived or realtime calculated trip analytics measured from current or past Phase-Change Artifacts based on designational classification precepts. Obvipro, the onboard vehicle processor sends out advisements on road conditions to each vehicle as to the volume of vehicles at any given time intervals with speed variations sending back encrypted calculated ecomm-advice directives maintaining safe distance and Controlled Spacial Velocity (CSV); wherein the secure virtual vehicle navigational system calculates datasets from historical markers from each OBVIPRO, pAvics and other certified encrypted communication devices (also known as ecomm-device) as to Phase-Change Artifacts, that are later used to calculate future conditions on road congestion, maintenance problems, road congestions or expansions and the like, along with driver inputted obstacles on road-ways with other visual items or driver, user or operator needs.

Thus according to the secure virtual vehicle navigational systems embodiments, advanced warnings are formulated and sent to adjacent domain infrastructures during a programmed route or simply an excursion, the secure virtual vehicle navigational system apparatus sends ecomm-advice data for vehicular arrival time-frames associated with those vehicles approaching or expecting to enter the next infrastructures nearest domain. During this designated route as a vehicle moves along its configured or not route, traffic forecasting data is sent from area tVectorHubs, vector-hub class or node-class ecomm-devices as vehicle moves into a new infrastructure. Local Domains Networked Infrastructure secure virtual vehicle navigational system receives such data transferred from previous traversed infrastructure, begins verifying iLink-sync-d status, registers vehicles ecomm-device within, traffic forecasting and ecomm-advice continues from data sent by last tVectorHubs, vector-hub class or node-class ecomm-devices exited domain, vehicle continues movement.

cVector (construction vector) Hub sensors, may be virtual cVectorHubs, data-fact content transmissions utilized for construction areas or other areas to warn vehicles of upcoming hazardous road conditions. cVectorHubs are temporarily deployed at the beginning of each road construction work zone, configured to broadcast warnings or signals relating to speed reductions, route alterations, hazards, or of additional items not listed resulting from the construction area. The information provided by the cVectorHubs can be changed on will call basis so that modifications are updated as needed, due to construction completion, or of additional items no listed, example: congestion levels, topographical conditions, weather conditions; wherein the secure virtual vehicle navigational broadcasts being sent to Obvipro, pAvics, smart-iDevices, or of additional ecomm-devices not listed a weather alert, ecomm-advice, Amber alert, earth quakes, advisements, advertisements, or of additional warnings, alerts, traffic warnings not listed displayed on iNavX2 VIR or ecomm-devices display by a plurality of means, technologies, techniques using an icon to be clicked on, example: alpha character '?' encircled within, or scrolled across the display, or both; wherein the alerts, warnings advisements or advertisements being broadcasted by audible or visual means, or both and sending images, details, alternate iRoutes along with additional information that fully discloses pertinent reasons for each broadcasted transmission; wherein broadcasts are continuously broadcasted until end as determined by government authorities.

When construction permits are pulled to begin work on road way, contracting entity requests for a registered cVectorHubs (Construction VectorHub) to be deployed by city or state personnel. The data sets for these types of hub ecomm-devices are comparatively joined in any vehicles route trip, computational adjustments take into considerations as to any route density along these construction areas, maneuvering parts of traffic towards calculated alterations to bypass and maintain combined time variations in destinations arrival times based on speed.

Another pre-configured embodiment in construction zones, each worker, employee or other personnel actively engaged within a traffic work area is equipped with pAvics or smart-iDevices attached to vehicles, equipment and clothing; wherein the device continuously transmits a transponder signal that may be of different frequencies and/or pulsating. Furthermore the secure virtual vehicle navigational system apparatus broadcasts construction vehicles, equipment and workers positional points in viewable or audibly announced in virtual interface iNavX2 as transports or vehicles come into range, modulating velocity, or providing alternate iRouts in proportion to work area density factors.

Wherein warning signals are broadcasted by cVectorHubs are received by any approaching vehicles that have downloaded pAvics installed in smart-iDevices. Since integration in each OBVIPRO for older vehicles are not available in Phase I of implementation examination stages towards full deployment Phase IV or V dependent on acceptance of technology change, utilizing pAvics will assist with full migration concerns, until older vehicle go out of service and utilize benefits of pAvics. Older vehicles may require alternative solution along with certified ecomm-devices, that being the case once migration is completed these older and newer vehicles may be equipped with at least one iChipset, $iChipset^X$ or AiChipset, solely for the purpose of transferring data-facts that are updated-able vehicle inspection, navigability example iBS of braking capabilities, light circuits and other vehicle diagnostics that are archived within iChipset configured timely scheduled transmissions through at least one sub-hub class sensor device to at least one localized iLink-sync'd CybrCloud server; wherein data-facts also include insurance, registration and licensing authorities along with transports maintenance records and repaired recall items; wherein based on transports or vehicles age different types of devices similar to a license plate and/or for that matter all vehicles are issued one ecomm-device built with one or more iChipset, $iChipset^X$ or AiChipset combined into either license plate mounted on a windshield tag or attached to vehicle and in communication with Obvipro; wherein data is stored on a read/write iChipSet, $iChipset^X$ or AiChipset providing historical artifacts when insurance, registration and licensing was renewed system verified; wherein vehicles Obvipro's system processor sole purpose assists transports or vehicles navigation. System (Xgenasys) transmits secure data directives, transport or vehicles Obvipro processes data, executes ecomm-device directives by sending navigating maneuvers to a human or autonomous vehicles guidance system controller confirming executions safely.

Another preferred embodiment implementation for road construction workers provides a telemetry beacons, Beacon-hubs device, or of additional ecomm-devices not listed transmitting on a selected frequency; wherein the secure virtual vehicle navigational system identifies independently each workers positional geolocation point from a pAvics equipped with at least one transceiver and/or a transponder, or of by additional means that transmits a constant signal of a dedicated frequency or frequencies; wherein approaching transports or vehicles iNavX2 device displays each worker safely at least a thousand feet in advance of being seen; wherein each construction workers Geolocation or GeoiLoc is feed continuously into a central iHub-device that is monitored by contractor company, state or federal supervision personnel; and updating the secure virtual vehicle navigational system constantly monitors density factors, adjust speed and routes vehicular traffic before construction area providing alternate iRoutes, the display of vehicles spatial location throughout the iRoute-path based on destination arrival time-frames compared with original iRoute, providing driver, operator, user with new estimated arrival time.

Another security benefit comprising one tag as stated previously, when all vehicular traffic is Channel Connected, since older vehicles, including newer transportation vehicles are equipped with only one tag comprised of insurance, inspection, registration or other data with responder or transmitter that may or may not be combined with a receiver or simply one transceiver; wherein data is updated as needed or continuously when new data-facts are generated, detected or received from secure internal or external data-links with Tribal entities, share or stakeholders. Therein saving states and other entities a noteworthy amount of expenses across all avenues, including safety and further enhancing infrastructure security, since vehicles are detectable on any domains network, even without advanced ecomm-devices not being installed active or registered, these vehicles will still be trackable for safety reasons until they are link-up with the secure virtual vehicle navigational system infrastructure with navigational capabilities, using pAvics, smart devices, smart-iDevices or iHD's of autonomous vehicles.

Another security benefit comprising one tag as stated previously, when all vehicular traffic is Channel Connected, since older vehicles, including newer transportation vehicles are equipped with only one tag comprising insurance, inspection, registration or other data with responder, transmitter that may and/or may not be combined with at least one transceiver; wherein data is updated as needed from secure internal data-links. Therein saving states and other entities a noteworthy amount of expenses across all avenues, including safety and further enhancing infrastructure security, since vehicles are detectable on any domains network, even without advanced ecomm-devices not being installed, active or registered, vehicles will still be trackable for safety reasons until they are link-up with the secure virtual vehicle navigational system, using pAvics, smart devices, smart-iDevices or iHD semi-autonomous vehicles, or of additional devices not listed.

Implementation of pAvics tied into older vehicles on board processor transmits only minimal data records, such as $CO_2$ and/or $O_2$ functions e.g. is working or not working properly, Phase-Change Spatial Locational Data Transmissions, provides precise vehicular interconnection to surrounding vehicles interoperability with each other, announcing such occurrences via virtual interface with or without iVoiceCommands or audibly heard, displayed on smart-iDevices. pAvics downloaded in a smart-iDevice, or of additional devices built with a full screen, like a larger Garmin, TomTom, etc. by merely plugging pAvics ECDLink into OBD or OBDII connectors under dash, similar to when user's updated their older vehicles from AM radio to AM/FM cassette, then onto FM/CD, etc. These ECDLinks, encrypted ecomm-device link or ECDL's; wherein updates and like are installed via 'certified' registered technicians, wherein data is completely shared, device and parallel port for diagnostic purposes and it is locked in with a security iScript inside at least one ECDLink ecomm-device once registered and link-sync-d, if removed will not work again by means of an internal code that flushes ecomm-device if ever unplugged, tampered with, caused to have electrical current or data to enter, or of additional means to alter, read or change OSV or NOS. 'Certified' in aforementioned statement means security levels background checks for personnel or equipment being used. A pAvics device can have a LCD, slide out screen from under or replacement of radio device, provides similar functionality for older vehicles not equipped with OBVIPRO providing a datalink for transmissions with or between vector-hub class or node-class ecomm-devices and the secure virtual vehicle navigational system.

ECDLinks comprises a iCrypticus information transfer system application, begins with at least one and/or all images of a Discover Card, Master Card, Visa iLogo or other credit card types, displayed together or independently on at least one registered iLink-sync'd system content generated encrypted data pushed iURL, iWindow and/or iPWindow (that has its own IP assignment) further transmitted within an iMatrix-Array generated from at least one configured processors iServer, configured to influence or direct at least one iNetwork. Comprising of at least one iLink-sync'd iCloud-ProxyServer and/or at least one iCloudServer, configure to transmit at least one iURL, iWindow or iPWindow from processors iServer; wherein iPWindow is viewable on iNavX2 interface in a field of choice resembling a specific icon image that may notify transports or vehicle driver or owner audibly with or without written language explaining credit card process; system application determines which registered iLink-sync'd transport, identified by at least SHID ID # along with other assigned identifiable alpha-numeric ID's that are encrypted.

Wherein during the determination configuration of as to at least one iCloud-ProxyServer or at least one iCloudServer, they may be one and the same. However, for security reasons each iCloud-ProxyServer, preferably needs to be solely a iCloud-ProxyServer only, that only verifies each iURL, iWindow, iPWindow as to iRoute-path or iTrace-route, both may be combined then compared.

Wherein the iCrypticus information transfer system application is further configured to display on a PC, a MAC, iPhone, Android or other compliant certified smart-iDevices equipped with an operating system and incorporates a configured web-browser either proprietary or open-source, comprised of diverse operating systems, and may further be equipped with a secure virtual interface to complete transaction, configured as an application that does not communicate with $OSV^X$, Mac's and Androids operating systems; wherein downloaded application is independent of $OSV^X$, activation is selected by iServer authentications requesting payment audibly heard and/or visually with instructions, configured to only display one iURL or iWindow upon registered user or driver/owner acknowledgment, further configured to display and select either alpha numeric characters to fill-in fillable fields within iURL, iWindow, iPWindow provides voice fillable fields by $iTouch^X$, each followed by the iCrypticus information transfer system verification as to data entered, may be audible heard subsequent timed iURL iWindow or iPWindow to re-entered data, in the event of anomalies detected, timed entered data-field lapsed, providing notification reason.

Figure 6A:
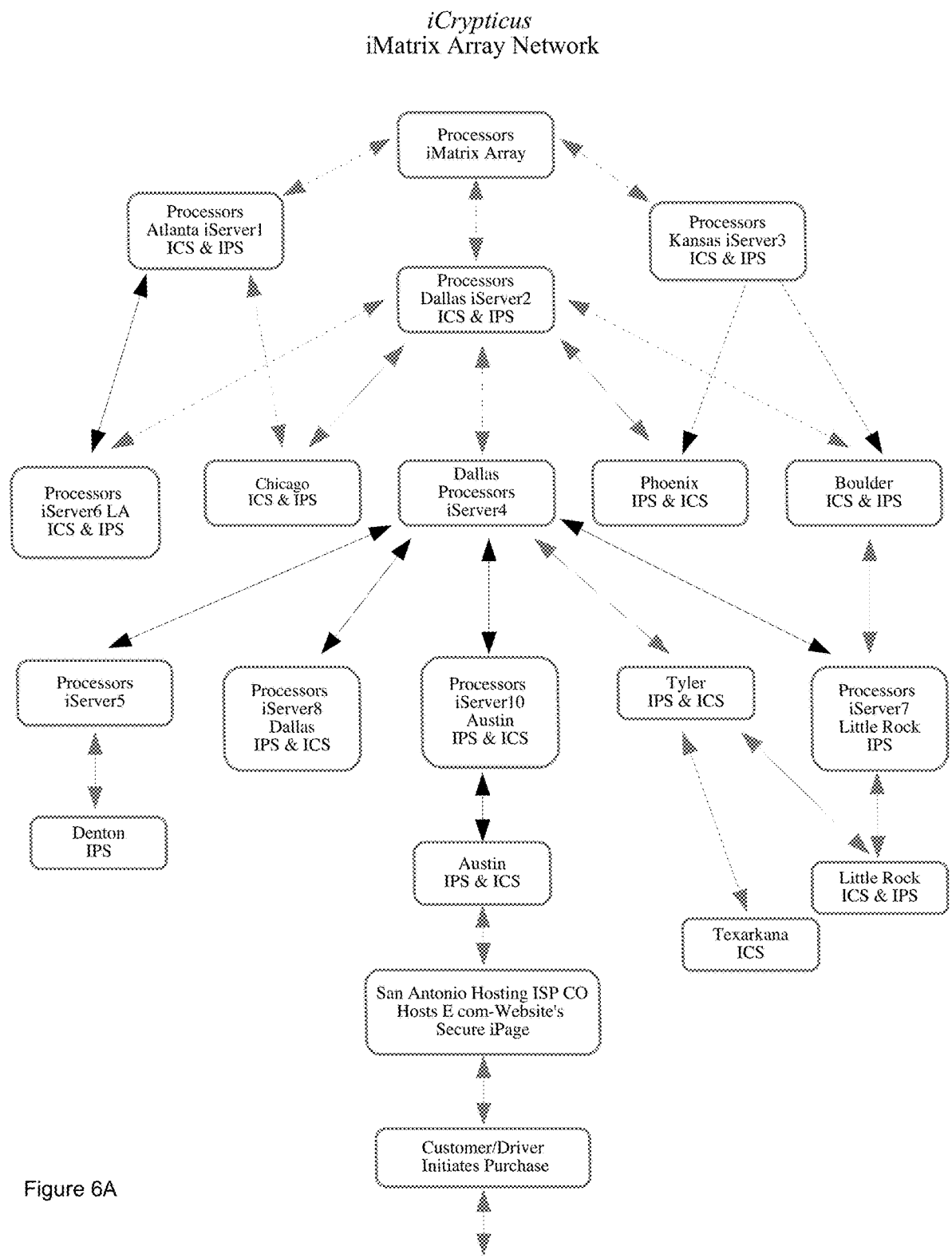
Figure 6B:
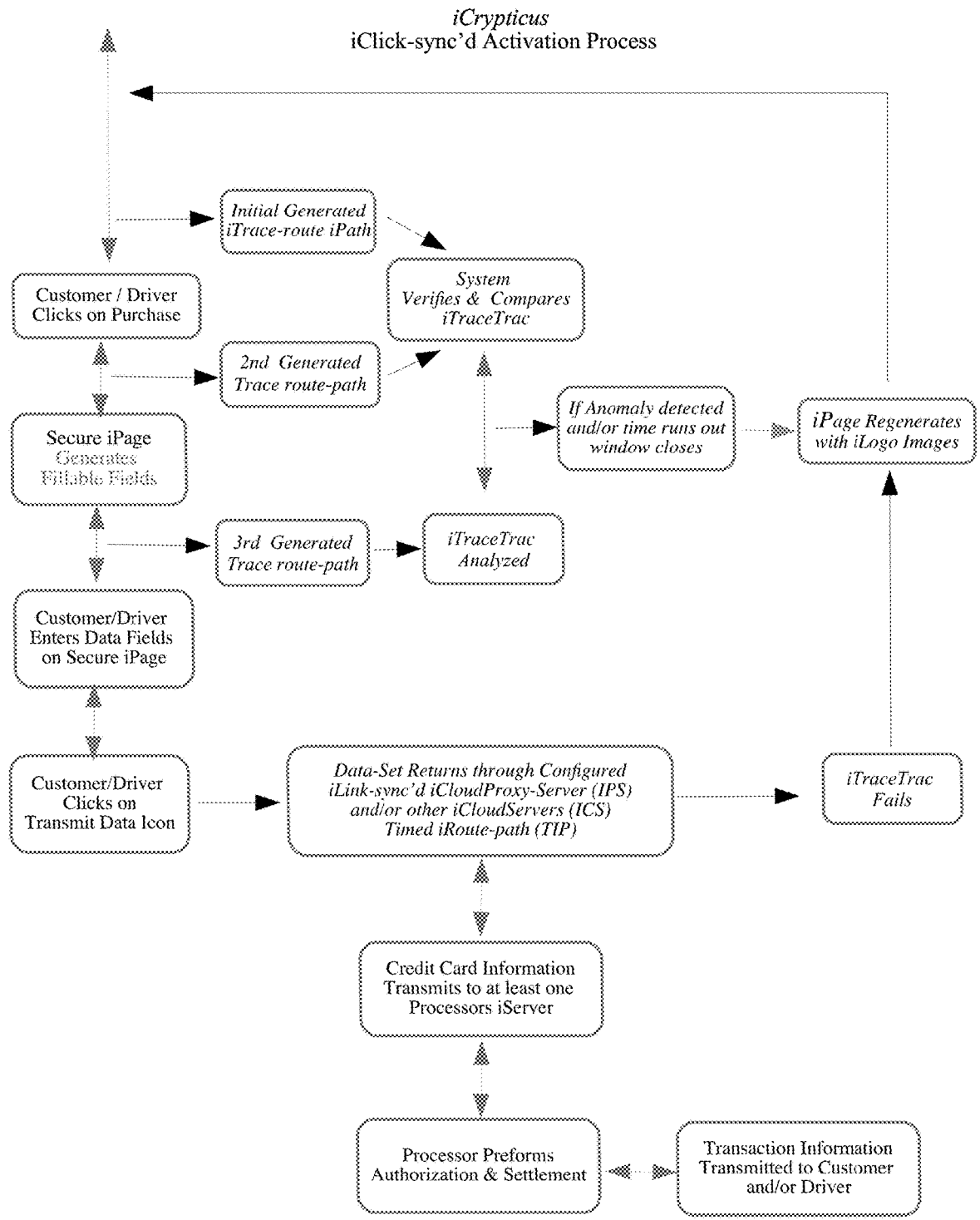
Figure 6C:
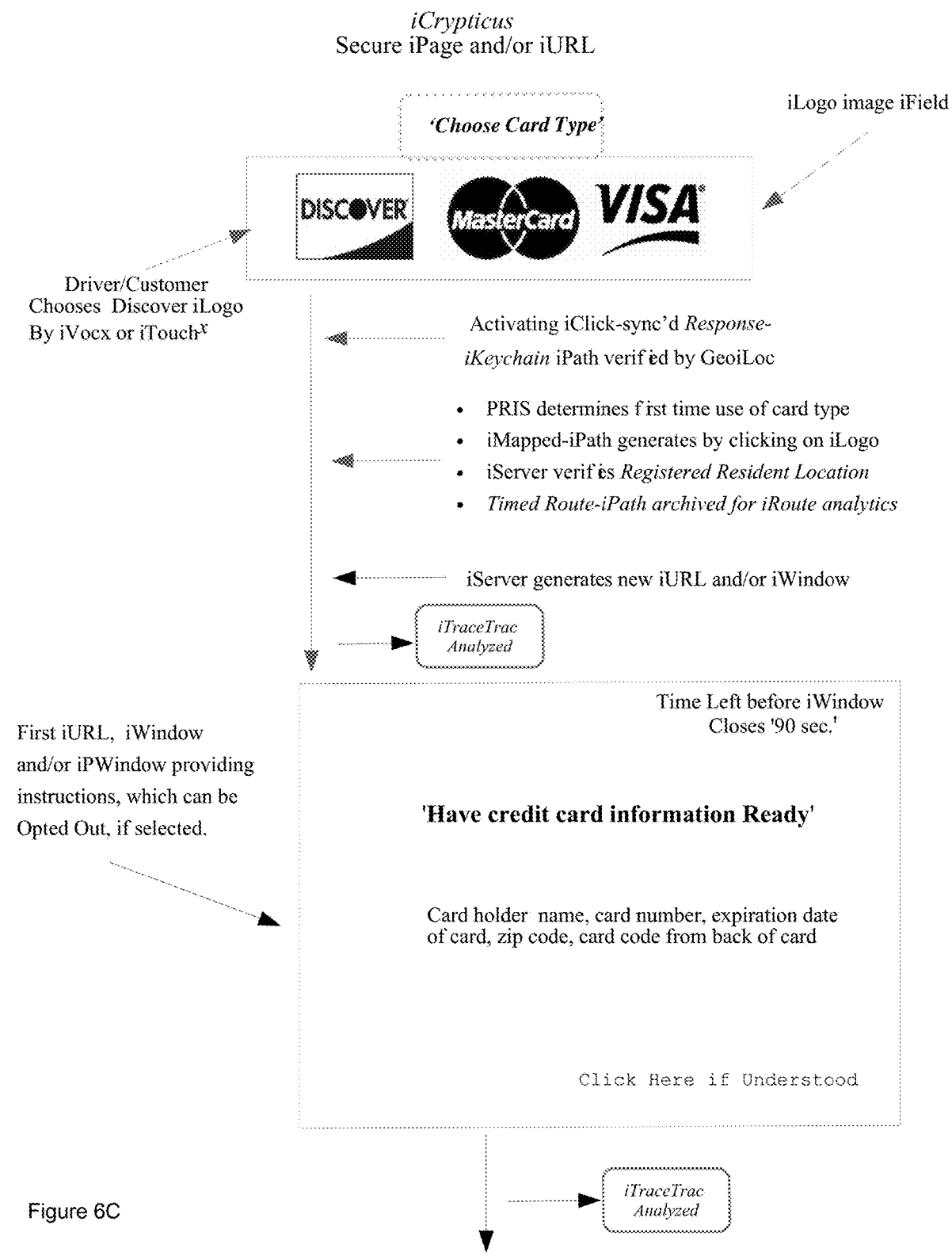

Wherein, upon clicking on any one of the three iLogo image iFields displayed in FIG. 6C, for instance Discover Card the iLogo itself is merely a translucent image iLink-sync'd to at least one iURL, iWindow or iPWindow, generated from at least one processors dedicated iServer, further securely iLink-sync'd (ILSD) within one or more configured ProxyServers ILSD with at least one iCloudServer iLink-sync'd, further does not communicate to any other device or a server of any type except host Processors iServer, that is paired-authenticated and registered with or to at least one customers hosted website with providers (ISP) servers. Configured to display at least one Secure-iPage iLink-sync'd with one or more iCloudServers in secure communication with at least one iLink-sync'd iCloudProxy-Server (IPS) further configured only communicating with iLink-sync'd host Processors iServer (PRIS) in communication with iCrypticus System Core (ICSC), comprised of at least one internal executable program configured to generate at least one Secure-iPage, iWindow or iPWindow iLink-sync'd with and securely pushed upon secure request from iClick-sync'd activation. Where system application is a virtual closed environment and further tested, measured for performance in the VES for any partial updates and/or system upgrades, to iMapTrac data-artifacts and/or sets for positional iRoute-data changes as they occur; wherein system watches over each iTrace-route detecting anomalies.

Wherein iCrypticus information transfer system manages at least two iLogo-images, each generated from at least one Processors iServer that inter-connected with at least one other iServer that controls generation of each iLogo-image and further gate-directs one or more registered iURL's, a popup iWindow (iPopup), and/or iPWindow transmitted via encrypted data push to at least one registered iLink'd-port configured on at least one iChipset, $iChipset^X$ or AiChipset within Obvipro, viewable on iNavX2's virtual screen or other certified compliant ecomm-devices, such as a Nuclex Operating System, iPhone, Android devices, a PC or a MAC of any type, e.g. iMac, MacBook, MiniMac and/or other operating system that may be of OpenSource, a proprietary OS platform, Safari, Internet Explorer or any other Open-Source web-browser.

iCrypticus information transfer system application does not require an application download, only the ability to allow the display of at least one Secure iPage configure on at least one iURL, iWindow, iPopup or iPWindow, such that the device and/or program enables user to communicate through at least one non-transitory computer-readable medium further comprising a computer device configured to display web-based content and/or any other type readable content.

Wherein preferred embodiments for any type data-text of any language or image data-content displayed by program code languages comprising non-modifiable display codes, such as without limitations XHTML, HTML5, XML, XSLT or currently known non-modifiable display code known now, in research and development that is ideally suited towards dynamic markup languages, and further not able to be altered during and/or after and at any other point of data-transmissions and/or contents reproduction viewable in a virtual interface.

Wherein secure iPage may be generated as a single iURL transmitted by encrypted data pushed to various types of certified compliant screens, as a registered identifiable page, iURL, a iPopup, iWindow or iPWindow authenticated to be displayed at a specific registered location, derived from at least one a non-transitory computer-readable medium comprising one or more algorithmic equations, configured to generate at least one matched iPaired-key set with at least one corresponding matched Response-iKey that may be embedded within at least one iKeyChain, that my have parts or all of which are embedded within each encrypted data push for the purpose of, to authenticate a hosted iSite Server-devices GeoiLoc spatial iLink-sync'd iURL embedded iLogos-images registered within at least one iNetworked configured Matrix, and each its own Timed Route-iPath (TRIP) provides a GeoiLoc (geographical identified location), of at least one iLocPath (identified location path) or a iClick-sync'd activation and/or its corresponding return Response-iKeychain iPath providing one or more identifiable-records (IDREC) of each ecomm-server device and/or other node-devices model #, serial #, IP and its cBlock route assignments, firmware, SHID, ESN #, and each iLink-sync'd devices GeoiLoc-datas Longlatilt along with spatial timed-registered distance between each iLink-sync'd server-node device and/or any other unique identifiable ecomm-devices serial number used to identify the device and its associated serial number, part numbers and/or all other factory assigned or hardcoded numbers; where attempts to read iPage-iCode, is not able to printed on paper, viewed as a pdf, etc., since the page its self virtual. Any attempt to read and/or to right click on iPage activates script, iMap-tracing devices and/or generating iTrace-route IP registering a possible tampering event.

Wherein each iKeychain consists of at least one Paired-Key with its corresponding identified Response-iKey, generated by ICSC encrypted repository: Kruptikos and further control-verified by Kruptos: read acknowledge verification (RAV) of each generated iKeyChain and its associated iKey and the iResponse-iKey and/or any other parts of a Paired-iKeyChain in secure communication with system iServer. Each iKeyChain is created within protected area of processors non-shared iServer; where each iKeyChain may have at least one iResponse-iKey encapsulated that may be further tokenized, from one or more embedded computerized mathematical algorithmic equations within one or more iFields or a single fillable iField, the construct consists of one or more layers, within each an additional embedded iKeyChain, which is read/verify only (reads at least one iResponse-iKey that may be embedded within at least one iKeyChain and verifies with responding iKeyset); each primary iKeyChain transmitted sum and its corresponding iResponse-iKeys may be constructed of an additional or subsequent transmissions with at least one embedded security code within each iPage, that initiates itself in the event of irregularities in one or more parts of iMapped-iPath initial iRecord generated.

Wherein each devices registered informatics, e.g. Identified Trace Tracked (iTracetrac) comprising of iRoute-path and/or Timed Route-iPath, may be combined into one string of characters that may further be encrypted by and/or from one or more configured algorithms that may be of at least one non separated binary string-iCode and/or separated and/or transmitted within an embedded binary-iString, that may be further separated by non-sense and/or other parts of encrypted communication device records—ECDR, and transmitted in different configured data-strings within one or more separated data-strings, further protecting iData-string transmissions.

Another embodiment comprising a iCode-script behind credit cards number fillable iField, converts each number entered re-positioning each within 16 digit iString, that may be further encrypted when transmitted back through established iRoute iPath.

Wherein compiled identification-strings ECDR's configured iLink-sync'd iNetworked iCrypticus information transfer system continuously monitors, verifies in opposition to in the anticipation of conceptual attacks between registered time-intervals configured authenticated and registered secure iNetworked iServer-node devices.

Wherein the next iWindow, iURL, iPopup or iPWindow with different content further configure as a timed iVPN within and/or in conjunction with a VPC (virtual private connection) within a configured identified virtual private infrastructure (iVPI). Each iPage may display count-down minutes located within iWindow-field on upper right quadrant; wherein said content authenticated iPage provides instruction procedures for first time users, that may be deactivated if requested and further archived for that specific card holders preferred task in a non-shared repository, that is read/verify only access each P2P (point2point) iCom-link'd with iCrypticus information transfer system; finally third timed-interval iURL, iWindow, iPWindow, or iPopup window is generated by an encrypted data push transmission, provides fillable iFields for credit card information, completion provides final timed iRoute.

Wherein upon each iClick-sync'd image activation and subsequent encrypted data pushed iPopup and/or iURL establishes a VPN, VPC or other forms of secure point2point connections, through at least one iLink-sync'd iCloudServer (ICS), further configured only communicating with at least one iLink-sync'd ICPS in P2P connection with at least one Processors iServer (PRIS) transmitting back a new secure iPWindow and/or a new iURL with different content that may not be identified and holds at least one embedded iScript; comprising of one or more tokenized iKeyChains and/or iResponse-Keys for test reasons or for additional security measures, which may be further embedded with primary iKeyChains Response-iKeySet; wherein popup iWindow or new iURL has at least one statement within new iWindow's popup or iURL field, stating: 'Choose Card Type' in various colors, font types or languages. Once user iClicks on any part of system generated iPopWindow (IPW) and/or iURL iWindow-Field (IWF). Wherein the iCrypticus information transfer system generates a return encrypted transmission pushed back from at least one iCloudServer (ICS) gated from at least one iCloudProxy-Server (ICPS) and further controlling iGate-path from at least one PRIS, where iLogo-image resides and has a registered resident location, that is iLinked-sync'd to one or more iURL's or IPW upon clicking on primary notification iWindow requesting iLinkPayment on top and being securely pushed from the iCrypticus information transfer system creating said content iURL. Wherein the iCrypticus information transfer system may generate a new verification IPW or may be within a new iURL requesting a second time and/or additional transmissions of a IPW and/or iURL due to lag-time variables in iTrace-route variations, with a new iLinked-sync'd iLogo-image displayed, if system continues to detect lag-time deviations in regard to trace-route nodes hopped and/or where data-content moved through in relationship with primary trace-route, next popup or new URL announces time-out sequence.

A preferred security embodiment comprising of, each IWF or IPW is constructed of at least one embedded algorithm; wherein algorithm encrypts data-content fillable fields as data is being entered; wherein each location of the 16 credit card numbers are mathematically moved, changing its positional location within the sixteen point character string. Each string-iCode changes sequentially, determined by algorithmic indicators example: based on volume of transactions from a particular IP-iURL, timed-interval distance in iRoute, or of additional factored items not listed; the same event occurs on additional content iFields during card holders initial registration with any credit card being entered for the first time with the iCrypticus information transfer system, e.g. name, card number, expiration date of card, zip code, card code from back of card and/or other requested data iFacts.

Wherein the iCrypticus information transfer system iServer transmits random configured paired-key verification to each image page location, where image during registration as to iPage transmission combined trace iRoute-path includes time servers GeoiLoc spatial location, along with IP address registration information of website, the servers C-Block identities of owners hosted page and hosting companies server(s) obtained from one or more sites, example: www.robtex.com, www.geodatasource.com and other known dbases or sites providing similar informatics; wherein parts of the aforementioned data is proprietary and not shared or displayed.

Wherein an advanced preferred embodiment consists of the entire page the credit card iLogos-images, iWF is pointed to and generated from processor iServer; the iURL, iWindow iPWindow, or iPopup window may further have its own SSL certificate or certificates and/or its on dedicated IP assigned by the iCrypticus information transfer system, controlled by processor that may be in conjunction with ISP, may cost a yearly fee for both the SSL certificate and its own IP address to further protect iServers generation for each virtual iPage. Where processors iServer runs random sequential configured routines on webpage iURL, iWindow, iPWindow or iPopup windows before, after, during the transaction, at other timed intervals; each iPage displays expression: 'Verified by iCrypticus' enclosed within one or more shapes that may be displayed on each generated iPage in the shape of, e.g. round, oblong, square, or of additional configure shapes not listed, underneath the statement that may be opaque, with the additional statement of 'Verified by iTraceTrac'.

Wherein at least one iCrypticus information transfer system iServer(s) identifies each transactions iTrace-route, compared with and/or against determined artifacts of GeoiLoc data-artifacts of prior transactions, transmission real-time-intervals (RTI) comparative analysis with iClick-sync'd, response paired-key, transaction data-entry, e.g. all of credit cards information and/or parts thereof, against time between each node device connection points, the timing of which is earmarked and archived in processors iServer repository dbase, and compared against initial iClick-sync'd activation, corresponding return Response-iKey may be embedded within encrypted data pushed back, along with prior data-artifacts response paired-key also has iPath-iRoute timed to milliseconds compared with initial activation of one of the three or more images. Therefore, now there are at least three sets of recorded iTrace iRoute-paths, initial iClick-sync'd activation from a chosen image, the transmitted response iPaired-key response is pushed back, the instruction page and its confirmation return transmission the third iRoute-path and the forth is the transaction completion-path creating confirmed iLoc-TracPath archived for further transactions from same card holder from the same website, ecomm-device, smart-iDevice, or e-commerce site, that may be generated from the same ISP racked-servers; wherein completion cycle on iWindow, iURL, iPopup window or iPWindow is controlled based on prior response intervals iTime-frames from the same card holder, comparing GeoiLoc along with iLoc-TracPath references combined or confirmed independently detecting variances thereof, whether to confirm transaction or not. Wherein subsequent iPaired-key transmissions activations may occur if any anomalies are detected;

Wherein all type servers, e.g. iServers, iCloudProxy-Server (IPS) and/or iCloudServers (ICS) are configured as Unix OS; wherein iCloudProxy-Server (IPS) or iCloudServers (ICS) perform certain tasks to receive, transmit, verify at least one data-set, datum, data or sense datum comprising of at least one iKeyChain and at least one matched iResponse-Key with at least one embedded iKeyChains Response-iKeySet and/or at least one iKeySet that authenticates a devices GeoiLoc spatial iLink-sync'd iURL embedded iLogos-images registered within a iNetworked configured assembly, each its own Timed iRoutePath, provides a GeoiLoc (geographical identified location), of at least one iLocPath (identified location path) after iClick-sync'd activation and/or its corresponding return response-iKeychain iPath providing one or more identifiable-records and all others items corresponding to server-devices spatial GeoiLoc time factors between each iLink-Sync'd iServer, iCloudProxy-Server (IPS) and/or other iCloudServers (ICS) and any hosting companies Longlatilt and their clients websites that have registered with at least one 'credit card processor' for website owners iURL verified location comprising server rack ID # and/or its vertical or horizontal location in specified rack, or of additional items not listed.

Wherein any attempt to view code on iURL's iPage, their is none; the images are pushed held in suspension and/or uses similar principles of linking any type image from a server to a website, however the process is virtual, of course and there is no visible code.

Wherein a security embodiment comprises the use of one or more iCloudServers, upon initial iClick-sync'd activation after choosing one of the three image iLogos, IPWindow or iURL replaces image-iLogos entirely; where at least one iCloud-ProxyServer within a configured iMatrix transmits corresponding Cryptic Tokenized iURL or iPWindow, further embedded with at least one iKeySet to at least one GeoiLoc vicinity of at least one iLink-sync'd iCloudServer, when iClicked on a mathematically generated iURL and/or iPage embedded iResponse-Key immediately transmits back to transmitted iCloudServer and or another GeoiLoc iCloud-Server depending on traffic load and/or another GeoiLoc iCloud-ProxyServer for the purpose of a second verification as to iLogos timed iRoute-trac and/or its Maptrac'd iRoute response interval iMatch data-set. Where response-iKey transmitted back with first iWindow and each determined transmitted ISP server may be configured as a VPN and/or VPC connection, displaying warning information, example text states: 'Next Window' underneath second line states: shall terminate and/or disappear within 90-180 seconds more or less determined, along with 'Have credit card information Ready'; once iURL iWindow and/or iPWindow vanishes; timed-interval ends, all that is seen is iURL transmitted from processor as it was seen at first view, the original screen with iLogo-images. Wherein each time a new screen activates and disappears, iTraceTrac event takes place, data-relics and/or spatial-artifacts are analytically compared with prior iTrace-route record-artifacts along with and/or against initial verified iTimed-iRoute from very first iClick-Scyn'd activation; wherein final iPWindow and/or new iURL screen seen provides the following fillable fields to enter: credit card number, expiration date, card code from back, zip code and other required information determined by system iServer based on prior transactions from same card holder.

Wherein at least one iProxyCloud-Server may transmit data request or response to paired-key onto another iCloud-Server and/or iServer, since cloud computing has nearly matured, if a customer purchases from website in OK, one or more networked iServers may be closer to and/or iLink-sycn'd to and/or with primary hosting companies hosted e-commerce website, and may be located in another state. Therefore, handling credit card transactions is simple, since a processor can setup at least one iMatrix that may be interconnected to one or more iMatrix-Networks further inter-connected to another iNetworked group in other states of at least one iServer, iProxyCloud-Server finally onto at least one Credit Card Processors iCloudServer inter-connected each are iRegistered and iLink-sync'd and only communicates with each other handling transactions from within any state, that may iRoute to other iNetworked Processor iServer in other states, depending on transaction congestions with primary iServer for authorization and/or settlement procedures. Furthermore, one or more parts of authorization and/or settlement income may be a PSE, providing additional income to each city and/or municipality for any services paid, e.g. vehicle registration, insurance, virtual vehicle inspections and other necessities.

Wherein a further preferred embodiment for each patron or customers that purchase from or within a particular store-front merchant or web based e-commerce site(s), customer can login using a similar secure means to register their one or more credit cards with at least one registered credit card processors iServer and/or possibly with at least one acquiring bank; wherein upon a credit card transaction, the processors system iServer(s) initiates upon requested iClick-sync'd activation from an iPhone, Obvipro's virtual interface, smart-device or devices that are Android compliant, an encapsulated encrypted iPaired-key is transmitted embedded in iURL, iWindow, iPWindow, along with only one corresponding subsequent or a new iURL, iWindow and/or iPWindows determined by cardholders card registered information, allowing them to enter a secure passcode; wherein system may request additional passcode entered transmitted via SMS for security, that may be selected to display or audibly heard, or both by iTouch$^X$ voice command entered; wherein activating iTouch$^X$ voice command from the iNavX2 interface, each alpha, numeric or special character or characters voice entered iTouch$^X$ command verifies by repeating the letters, numbers or special characters back to user confirming said characters.

Wherein additional security parameters, include a encrypted repository stored in Kruptikos in P2P communication with iServer, in further secure-comm with at least one iProxyCloud-Server that may be in P2P with at least one iProxy-server only to verify fillable generated iWindow, iURL and/or iPWindows data-fields; wherein confirmation responses are simply programmed to either confirm or denies one or more parts of fillable fields, e.g. completed card number if entered, last four or a combination numbers of one or more card number positions within 9 through 12 field, followed by a combination of at least two numbers in the span of 13 through 16th position; example: enter numbers from cardholders card number positions, e.g. 9, 10, 13 and 16 or any combinations of at least a pair of two digits within the span of cards 9th number through 16th digit and/or further at least two numbers with 5 through 8 sequence range in no particular order; wherein further numerical sequence is not restricted to last four numbers of any credit card digits content; next field enter name of card holder, expiration date, card code and zip code.

Wherein each registered credit card with at least one iProcessor and/or acquiring bank may assign each card holders registered credit card an iCardPin; comprising of at least (six) 6 digit combination constructed of alpha and/or numeric figures, or special characters, e.g. &, ^, #, ), (, >, <, }, { or at least one greek, latin, pictographs, math symbols, or other determined selected figures or characters from other languages.

Wherein each iServer repository, that confirms all or parts of data-fields upon entry acceptance, the next fillable field becomes available for data-entry; otherwise a new iWindow and/or iPWindow replaces current fillable field after clicking to confirm filled information stating: Confirmation Declined, within a prescribed timed-interval seconds plus or minus iPWindow and/or iWindow field disappears, allowing field entry to continue until count-down closes timed connection.

Accordingly one significant embodiment comprises driver sensitivity as to attentiveness towards counter-reaction directives form inconsistent variables in driving techniques are archived. These variations are then monitored, categorized and/or cataloged creating reference vector data repository (VDR) in a non-transitory computer-readable non-shared storage medium for each drivers comparative relationship, either with self-driven, semi-autonomous or an autonomous driven designed transports, or vehicles. Regarding how responsive both human, iMechanizm's or vehicles are under various circumstances, compared either in unison or separately with each other. Advancing predictable calculations maneuvering vehicles from ecomm-advice directives from foundational attributes for each drivers ability to react to or with the secure virtual vehicle navigational 'system' ecomm-advice directives in relationship to drivers responsiveness, along with other drivers driving behaviors and/or limitations as to preventative responsiveness, vehicle capabilities from maneuvering including IBS capacity initiated by human and/or iCP, along with vehicles dimensional analytical magnitude in relationship with conceptualization of human drive-ability vs. semi-autonomous in correlation with the secure virtual vehicle navigational 'system' generated directives autonomously. Each driver is coded with certain algorithmic variables having pre-configured limitations as to how 'system' generated ecomm-advice directives are transferred to each surrounding vehicles driver or iMechanizm displayed on a virtual interface (TVA) with adaptive lexical analysis for audible words or visual presentations of transmitted navigational directives. Data-relics and there associated artifacts of each driver, generate Cached Driver Responsiveness (CDR) in respect to human vs. driver ability to react with current autonomous vehicles capabilities in various calculable evasive maneuvers and/or with other driver capabilities in how each grouped classification reacts to semi-autonomous or autonomous command control ecomm-advice directives. Wherein this archived learning curve becomes comparatively complex depending on time of day, day of week and/or combinations thereof in relationship to a planned route or not, randomized destination for shopping, work destination, with blended comm-advice directives mixed or correlated with surrounding drivers historical responsive data and social concentrated distraction or lack thereof. This data becomes a bench mark for autonomous ecomm-advice directives based on drivers age, physical limitations, and other native concerns such as concentration levels, marital status, drivers capabilities to navigate; e.g. x2Factors; along with vehicles capacity to maneuver—by human effort in relationship with semi-autonomous or autonomous imechanixms.

Wherein data is continuously updated and comparatively analyzed against configured conclusions not just with a particular driver, such data is comparatively analyzed with any person within this class of variations as to age, gender and in combinational comparative analytical data forecasting simultaneously co-mixed against other similar driver attentiveness and other parameters mentioned herein against other classes. Thereby acquiring adaptive knowledgeable response factors, wherein the secure virtual vehicle navigational system begins to teach itself based from human input assessing quantified ecomm-advice directives for each vehicle driven, in relationship to how driver/owner or vehicles guidance system understands communicated responsive thoughts and/or processes ecomm-advice directives best.

According to one embodiment such Delimited Traffic Analysis is updated continuously with Factored Time Constraints for Vehicle momentum Control adjusting vehicular flow rates based on density of any given area artifacts, computed from current Positional Traffic Vector Nodes, encompassing alternate destination routes based on Predicated Traffic Artifacts. Including possible ticket notifications of inappropriate passing a school buss while loading or un-loading students, excessive speeds in construction zones, lane changes without notifications, passing in a no passing zone and driving in the wrong direction. These items are also archived for each driver behaviorism, forecasting possible directives to warn surrounding vehicles of possibility in approaching hazardous areas or vehicles that may or may not be iLinkSync'd or have not registered or installed pAvics.

Passing in a no passing zone, result thereof causes a significant portion of vehicular fatalities world-wide. Thus, the need to prevent such occurrences exist; wherein the secure virtual vehicle navigational system, incorporates ability to map-track vehicles, based on GSIGPS modeling in proportion to existing road ways. Wherein the secure virtual vehicle navigational system detects inconsistency based on or more embodiments presented herein; wherein systematically configured the secure virtual vehicle navigational system displays provides roads virtual contour in spatial phase time relevancy with other vehicles; wherein system transmits continuously transmitting to one or more vehicles virtual interface, calculated phase-change abrupt lane drifts in areas where there are double strips or not on any traversed road, indicating a no passing zone or unsafe to pass based on predicated on-coming traffic momentum. Wherein the secure virtual vehicle navigational system provides highway mappings of lane width and striping determinations supplied by state DOT or by a vehicles cameras as to precise location of passing zone and others lane indications, traffic signage placement; wherein GPSGIS mapping on virtual interface provided by the secure virtual vehicle navigational system, based on vehicles present of future phase-change anticipated spatial locational change in spatial relationship to road contour or current signage; and generating configure announcement directives transmitting warnings along with evasive maneuvers to one or more vehicles within a determined Spatial phase vicinity occurrence. If vehicle proceeds to attempt vector lane drift, the secure virtual vehicle navigational system or at least one vehicles Obvipro sends warning a specific vehicle, along with evasive controlled visual or audibly directives to apply brake, maneuver to a determined side angle. Wherein further, system announces in later part of Phase I if vehicle continues, a notice of traffic violation has acquired, visually and audibly stating WARNING adjust lane location as directed. Meantime, during Phase 2 to 3 transition, approaching autonomous vehicle directives transmitted to surrounding vehicles; wherein same embodiment takes place for vehicles traversing in wrong lane, headed against advancing traffic.

According to one advanced embodiment Digital TVA GPSGIS Overlay Modeling and/or Quantum Positioning Overlay Model and/or current virtual modeling means; for all traffic signage, including but not limited to traffic intersection lights displayed on Obvipro's screen or other certified ecomm-devices. iVoiceCommands and/or visual notifications advise and/or to warn driver and iMechanizm of up coming road traffic modifications, intersections and the like. Traditional ways of thinking about transport mechanisms and the lack of manageability thereof is archaic; wherein the most important part of systems basic parameters is human life and the associated protection of each driver, mitigating economic damage to personal and public property. Additionally, each iMechanizm or vehicle requires guidance directions at different levels, same principal occurs in a Mac or PC; wherein routing and protection of elements the secure virtual vehicle navigational system insures, reducing liability of incidental mishaps and associated loss of life.

Vehicular Network Traffic (VNT) control is similar to managing computer network traffic at its core. Thus, secure control is accomplished by load balancing networks momentum rate in conjunction with iLink-sync'd tLoad Stand devices; wherein past or future network vehicular traffic congestion artifacts in relation to spatial future time are calculated from comparative algorithms; wherein present phase-change spatial positional point in relationship to at least one vehicle, the secure virtual vehicle navigational system transmits determined velocity adjustments to one or more vehicles within a mass by anticipated phase change momentum. Wherein controlling predicates directional vs. bidirectional traffic balanced load, within and against one or more transports destination route in one or more domain networked infrastructures. Autonomous vehicles can and will self navigate, however as with the air line industry planes with advanced telemetry at some time or another, pilot must take control for a number of reasons. Every airport has at least one air traffic controller, overseeing and monitoring one or more planes within a certain vicinity; wherein air traffic system collects Telematic Information (TI) from aircrafts planned routes adjusting altitude, speed and angles. However, not all airplanes have same capabilities, thus there are deficiencies within this class of transportation; wherein altitude positions compensate safety for certain types of aircrafts. Traffic Information Modeling (TIM) aptitude incorporates a similar skill-set from communication devices generating previous positional points for at least one transport in future time-space point, modeled from algorithmic overlays to reposition at least one transport in future time spatial point; wherein economies of system in supply chain acquisition for the advancement of various sub-navigational system part variations in cost and performance allows smaller cities to move over to a Virtual Traffic Interface (VTI) for vehicle viewing traffic signage for visual navigation, saving thousands of millions in road traffic signage expenditures state and/or country wide.

[I]t can be further resolved that a very large percentage, well over half of drivers do not adjust navigational concerns indicated by traffic signage from a multitude of items, e.g. long range driving most people do not see and or ignore or use some sort of navigational devices instructing them where to go, to excited or oblivious to safety, busy talking on the phone or with occupants within; wherein drivers have become uninvolved or disconnected due to driving itself is a mundane task, along with many other x2Factors.

Each device, e.g. Obvipro, hub-class or telemetry devices, etc. are modularly built with redundancy in sectional parts, able to remove parts during continuous operations, no need to replace entire communication device, furthermore there are only a few items within each device, at least one configured iChipset, iChipset$^X$ or AiChipset for each ecomm-device, e.g. receiver, transmitter, transceiver and a transponder of nano, micro and/or nano-micro technology; wherein an additional core element of the secure virtual vehicle navigational does not record conversations happing inside vehicle or pAvics downloaded application in stalled on a smart device, or of additional ecomm-devices not listed or Obvipro scans continuously of a listening device or signal being transmitted, if detected a jamming frequency is initiated advising driver, owner, operator or user of event suggesting a facility to remove said detected device or devices; wherein XgenX believes, is a baseline that a vehicle is merely an extension of one domicile, privacy should be upheld consciously; wherein XgenX or ecomm-device, or both uses algorithms to detect deficiencies in semiautonomous or autonomous vehicles navigabilities, due to human or machines decision capabilities, providing a plurality of services with the intent to: Empowering Transparency Of Service.

Another embodiment which may or may not be encrypted, a Digital VTA Overlay model also known as Vector Telemetry Architecture; wherein Overlay Modeling is generated by Quantum GPSGIS Positioning and/or current virtual GPSGIS modeling means, focusing on presentations that are separated as to universal syntax code semantics for tag device, elements and attributes, providing virtual accessibility features with internationalization, adhering to processing display code that does not allow modification, injections and/or other alternations after the fact, and further provides improved secure renderings for virtual traffic lights, street signs and locations, surrounding buildings, alternative routes and the like. Furthermore, all viewable in virtual reality interface and/or screen, accessible on Obvipro, pAvics or other certified smart ecomm-devices equipped with iChipset$^X$ of various capacity and/or power of X equals 2, 3, 4, 6, etc.; wherein X represents processing tasks or process, or of additional items not listed that each iChipSet is configured to preform; example to mark datas iMarker trail for time and route taken to transmit, receive, transmit transponder reply or to activate initial transponder sequence, and acknowledge executed maneuvering directives from certain types of encrypted data or data-strings from iCP to and from the secure virtual vehicle navigational system or to certified compliant ecomm-devices.

Accordingly embodiments known as VTA, comprise on demand network features that can be toggled back and forth using iVocx's—voice activated command system with vehicles installed with Obvipro and/or other similar certified ecomm-devices or by touching screen interface, requesting visual activation for DOT cameras for on screen viewing; on demand Channeled Telematic Weather in vehicles for local areas or forecasted or programmed directional destination based on traffic variables laced with weather-telematic virtual indication informing driver or vehicle manageability variations in navigation ecomm-advice guidance, activate driving lights at appropriate times, and blinkers sends notices to the secure virtual vehicle navigational 'system' calculating and sending digital notifications to surrounding vehicles with variations in lane position and/or incorporating speed adjustments to accommodate a graceful repositioning into requested or the secure virtual vehicle navigational 'system' generated lane-acquisition positioning; wherein each Obvipro also becomes conscious of archived maneuverability from system; wherein Phase 3 and beyond Obvipro merely verifies navigational directives with system and/or begins to request changes from the secure virtual vehicle navigational system—again similar to Chess, vehicles are simply object-pieces waiting for commands, requesting authorization or a calculated time-frame determined by vehicles ecomm-device to react in advance of or to a determined need based on one or more programmed variables stored with ecomm-devices memory medium; wherein in Phase III through Phase IV each vehicles ecomm-device initiates at least on stored navigational directional directives at specific time-intervals or time-frames that coincide with an detected event, response or a approaching act initiating a stored command or task, or of additional items not listed that the secure virtual vehicle navigational has approved by field tested recommendation or executed maneuvers for a specific vehicle based on semi-autonomous or autonomous vehicles navigability capabilities.

Navigational system comprises a Digital VTA GPSGIS Overlay Modeling from Quantum Positioning Overlay and/or similar virtual modeling means, end viewable interface viewed with code written from XHTML, HTML5, XML, XSLT and/or current none modifiable display code that simultaneously produces traffic vector nodes on a virtual display screen that provides images for warning signs, traffic lights, speed variations, curves in road ahead and all other signage being used concurrently and/or in the future, may or may not be digitally encrypted when transmitted, effectively exhibits exactly where driver requested roads are, 'system' overtures as to implicit dimensional details.

According to above enhanced embodiment, present invention utilizes existing GPSGIS earth mapping satellites, DOT mapped locations of each sign and/or current technologies that enhance details of any given roadway and surroundings in any country. Thereby, saving municipalities, states and/or other countries significantly, and continue to reduce traffic expenditures; making a safer traffic landscape minimizing associated fatalities when accidental contact occurs with traffic signage, further decreasing fuel matter consumption in manufacturing these items, including material and labor costs for all signage. This paradigm shift means many more technical jobs, both hardware, software, monitoring, storing and sharing data, forecasting expenditures and road expansions if needed and much more informatics needed to Manage Autonomous User Based Insurance cost variables along with Vehicle Telemetry Guidance System (VTGS) for autonomous or semi-autonomous driving.

An advanced preferred embodiment for VTA, during a trip out side resident domain vehicle is registered in initially, pre-configure advertisements and entertainment upon driver selection either by voice requests from iVocx channelled through iNavCom Centers from other cities Domains Networked Infrastructures send Obvipro's, pAvics and other certified devices. Specific selections are gated through one or more AlphaHubs for specific items for any type of On Demand Network Advertisement (ODNA or ONDNA) platform being controlled by the secure virtual vehicle navigational system transmitting to one or more local AlphaVectorHubs within each domains infrastructure, where users search for business names, specific products or services; wherein ODNA or ONDNA platforms provide alternate route-ipaths or purveyor phone number or establish iCall-Sign iConnection. Extended transmissions are accomplished using existing or new repeater towers, also known as Vector Repeater Comm-Devices. Such that these preferred requests can be viewed on Obvipro's virtual interface iNavX2—VTA in respect to lodging and/or dinner accommodations, locational fuel nodes and other related necessities with exact virtual attributes as to Geographical Informational Location (better known as GeoiLoc). Channelized Network Advertisements are supported by local merchants, wherein additional revenue from said advertisements further encourage retailers to embrace localized infrastructure that is somewhat controlled by a governing board of merchant members.

Wherein driver/human or each vehicle, smart-iDevices equipped to download and function reliably with pAvics or Obvipro, requester may be either human or derived or by vehicles Obvipro, smart-iDevices pAvics may be decisionmaker obtaining any type service for personal usage or for maintenance items on vehicles from local and/or out side networked domain merchants of diverse purveyors; wherein reservations for dinning, maintenance items, may be made or paid through at least one system EDCLink device; wherein transports equipped with Obvipro is alerted to audible and/or visual notifications of transports items in need of attention for 02 and all other sensor OBDII and/or OBDX (future OBD connections points) capable of transmitting deficiencies of different kinds, light mini light bulbs; battery starters and/or alternator failures, each displayed on iNavX2 virtual interface; wherein system displays on toggled screen certified maintenance facilities to preform necessary work to repair faulty items.

for these channeled announcement promoting local products, services and events of all types, is aware of pertinent surroundings viewable from VTA's interface, such nomenclature and related information from GPSGIS imagery is necessary for system to calculate specific mapped items for each voice or virtual requested knowledge item, such as GeoiLoc points for fuel, food and other types of nodes related to requested demand. Each GeoiLoc consists of Longlatilt co-ordinates that is translated into VTA's digital virtual interface for viewing GPSGIS data codes overlay-ed, displaying exact route and/or alternate routes based on traffic density variables, fuel remaining and/or scenic routes chosen.

A preferred embodiment for requested trip reservations for lodging and other necessities are transmitted via an encrypted data push from attributes from distant Domains Networked Infrastructures. These requested items such as dinner or lodging reservation data file can be specific or generalizations as to advertisements from any distributional node point request(s). Data files are sent via certain sub-navigational vector-hubs and/or other telemetry-devices for such items are channelled through a VCPI Wifi and/or internet or Repeater Towers connections between infrastructures, that further assists UPNP if transport is tuned off and/or deactivated. Each Infrastructure has Paired-Keysets for such data transmissions, these files are encrypted in a rapper that is encapsulated around requested data file as to driver-demand or reservations for specific merchants. Key request for future events are different from data files requested for comparative shopping outside primary registered infrastructure. Each Key has an associated Paired-Key for encrypted rapper to open, use of these Keys and their associated Paired-Keys are all system generated for security purposes. Thus, driver-demand requested data file can not be altered during transmission, once data file is received from Domains Networked Infrastructure driver-demand is currently registered with, local system sends verification Key back to initiate embedded rapper sequence to open. Contents are then compared with past GPSGIS achieved data-set if parsed, data is viewable in virtual interface, storing files for future computational comparative requests.

Preferred considerations on the embodiment of variations in biometrics, e.g. thumb, eye or voice recognition and in conjunction with or not the use of push button engine starts, wherein upon such initiation vehicles Obvipro or pAvics transmits UPNP activating navigation with currently register vehicles in a networked domain or activation of ODNA adding another layer of security; wherein further protection biometrics assists determination as to whois overseeing the navigational aspects, in the event of an accident, there want be any question anymore; wherein biometric recognition comprises: voice, facial, thumb, eye, or of a push bottom engine start with voice recognition print; and emergency request for Mi911 used voice, thumb, eye, voice text from iTouch$^X$ activated by a selected user word; wherein biometrics recognition activates authentication of a user, driver or operator virtual or not, access by emergency personnel that uses a plurality of biometric recognition.

According to one advanced embodiment, with ever increasing concerns with patterns from abrupt atmospheric condition changes, weather forecast modeling will narrow in areas to weeks if not days. Thus, there is need comprising of continuous digitally enhanced localized updated atmospheric conditions presented in 'virtual channelized data format' from real-time comparative data feeds from at least one of NOAA's, NCEI locations or other certified data feed locations; wherein selected Telemetry Hub-devices and/or vehicles equipped with meteorological collection telemetry-devices "MCTD" or from ECMWF and other countries weather predicting agencies combined. That may be deployed through local academic facilities also referred iNavCom Centers another part of Autovecth's offices; some or all data part feeds may or may not be a PSE (paid service event, that may be paid through at least one EDCLinks and/or ECDLinks and/or by other secure means), that may be iLink-sync'd directly to at least one credit card payment processor, payment portal and/or processing facility and/or registered ISO in secure communication with and/or to at least one acquiring bank; further provide advanced real-time features that incorporates encrypted digital weather modeling for any given traffic area on demand and/or as requested and displayed virtually or audibly on iNavX2 interface. Such revenue generation helps provide and cover infrastructure costs and/or pay those academicians generating channelized weather feeds (CWF), and Institutional Weather-Telematic Data for commerce vehicles and individual transports, implementing connected solutions, assisting driver-demand knowledge on current atmospheric situational conditions; wherein systematic comparative computational data merged with configured density, determine system decisions on traffic variables for speed, density factors between transports, lane change acquisition, more based on calculated weather data feeds.

Accordingly, Channelized Telematic Weather consists of on demand user selected atmospheric conditions from one or more governmental, academic and/or institutional weather centers; wherein data transmission results are over-lay'd, creating variable models displaying alternative projected views; wherein same data facts are incorporated into system calculable phase-change traffic directives.

Another preferred embodiment incorporating Beacon-Hubs and other vector sub-hub class devices during latter part of Phase II and fully incorporated in Phase III until full integration into a Virtual Interactive Reality (VIR) Inter-FACE, wherein vehicles equipped with digital thermometers and other weather-telematic instruments, similar to older Buick's, or of additional vehicles that are equipped with barometers transmitting measured local atmospheric conditions that includes pressure, temperatures, or of additional atmospheric instruments not listed; and Obvipro's are further equipment with a plurality of weather-telematic instruments or Obvipro ecomm-device being linked and paired with vehicles iCP being built with weather-telematic instruments, smart devices equipped with weather-telematic instruments that have downloaded pAvics software application, stationary or mobile smart-iDevices, or of additional ecomm-devices at homes, or vector-hub class or node-class ecomm-devices equipped with plurality of the weather-telematic instruments not listed, example: digital thermometers, atmospheric pressure devices continuously transmit temperatures, pressures and other associated weather related data transmitting to local iNavCom Centers. Thereby increasing probabilistic forecasting accuracy in partnership with NOAA, other countries weather prediction centers extending Channeled Telematic Weather real-time localized data feeds with Enterprise Environmental Efficiency with no advertisements.

The secure virtual vehicle navigational system encompasses a Virtual Environmental Sandbox (VES); wherein all functional aspects: system updates, system, pAvics or Obvipro software updates; any third party providers, advertising frameworks and all other system modifications are run in secondary protected VIR, prior to implementation in one or more selected domains over a period of time; wherein further testing iHfactors (identified human factors) in relational-ship to and combined communication capabilities between semi-autonomous and/or autonomous navigated vehicles occurring prior to full implementation of any updated-able items, changes in ecomm-advice digital directives and all other system functional attributes.

According to one embodiment, a secure user web-interface is provided to allow user access to geographical positional data over a computer networks infrastructure. Historical geographical positional data and/or any other stored informatics on server may then be viewed over at least one secure network interface from data-artifacts transmitted to a secure shared server; wherein data-relics viewed as a PSE by subscribers that may be paid through at least one EDCLink equipped and configured on one or more iChipset and/or iChipset$^X$, transmitting non-executable data and/or images with non-changeable code transmissions, e.g. subscribers entertainment data, fuel consumption rates and levels to driver/owner or tribal entities, provide local merchant advertisements, channeled telematic weather and other necessities via filtered certified applications for integrity and security for one or parts as a PSE; wherein portions of revenue shared with each municipality, including but not limited to a percentage of credit card processing fees.

FIG. 6A is a paradigm configured iMatrix Network that protects credit card transactions by iCypticus completed within each iNavX2 virtual interface or from a computer device equipped with at least one computer web-enabled interface configured to display web-content from any type web-browser, including proprietary, open-source operating system and/or a single downloadable application, and further incorporates one or more of the embodiments listed herein.

FIG. 6B configured paradigm of a typical iClick-sync'd Activation Process within iCrypticus structured system apparatus, providing an intelligibly secure procedure, protecting credit card transactions and/or associated data for each card holder.

Any updates from certified application providers beta test in the secure virtual vehicle navigational systems VES proceeds any deployment; wherein prior to updates to certified devices, a security token is sent to virtual interface (iNavX2) via popup iWindow or iURL, activating embedded paired-key; wherein said window displays vendors credentials; wherein matched credentials within said application activates embedded Response-iKeychain back, waiting on a text message sent to virtual screen or driver/owners cellular smart-device or other certified compliant devices; wherein alpha, numeric or binary characters, or combinations thereof are either copied into popup iWindow or iURL that may be sent via SMS or by other secure means not listed; either manually or via voice command entered by driver that may encompass a secondary or subsequent verifiable code Response-iKey for security reasons. Additional control measures to protect intrusive updates, encapsulated signatures are sent systematically from onboard vehicles processor (Obvipro); wherein a matched key-set incorporates responding hidden token-set similar to other embodiments stated herein. It is believed that automatically propagating devices start-up sequence, to one or more devices initiated validation order, may be a questionable enterprise solution; however, first half may be system filled and one or more other subsequent device requesters may only be entered via voice or imputed by a humans hand push bottom; initialization must encompass or one or more forms of biometrics to complete installation registration in one or more infrastructures and or to confirm updates propagated and/or initiated by NOS within each Obvipro's OSVx (operating system version). Commercial transport imechanixms, including interstate and intrastate conveyances are iMaptrac'd, data-artifacts transmitted to one or more certified owner representatives, driver/owner of vehicles, and further record iRoute-data each transport telemetry-device passed through toward billed destination; wherein once a new iPick iDrop-Route that is either system entered by user and/or generated establishes new iRoute entered via a web-based virtual interface or on iNavX2 and propagates to each domain networked infrastructure predicted iRoute passes through; wherein one or more owners representatives and update routes, tracks delivery time-frames, able to notify purchasers in real-time as to delays due to unloading and loading, billing and invoicing are tracked with informatics shared with all tribal entities as a need to know event, including DOT, purchaser, Commerce Department in each state and US providing gross volume weight loads, any material type transported or hazard items; including items arriving from outside US borders.

FIG. 6C is a configured example of a group of iLogo image iField, showing only three card card logos independent of each other; wherein other credit card types, e.g. JCB and other card types can be added based on owner choice, that reflects customer satisfaction; wherein by clicking on chosen iLogo within iField; iCrypticus system application generates iMapped-Path from a registered iDevice that was authenticated within any domain networked infrastructure and/or on hosted websites iRoute from ISP; wherein each iClick-sync'd transmits to at least one iCloudServer, onto at least one iCloudProxy-Server activating a Response iKeychain-Set from iServer; wherein Registered Resident Location further generates iMapped-iPath along with Timed Route-iPath in no particular order; wherein PRIS further determines if card holders credit card is registered and/or is first time user, if iMatch-data determines same system generates instruction iPage, and if not system executes iPage for credit card information. Each subsequent iPage is assigned an iCode-Key upon clicking on Understands, Transmit Data and/or other verbiage, the iCode-Key generated for that particular iPage is Maptrac'd from source to destination creating identifiable-records, purposely to verify iTracetrac records against TimeRoute-iPath.

FIG. 6D comprises a paradigm of iCrypticus Secure iPage for iNavX2 Interface With Data-iFields to pay for vehicle inspections, license renewal, insurance, advertisement, reservations, or of additional services or products not listed, and further incorporates all the associated embodiments listed herein, either separately, independently or in combination of each other.

FIG. 6E further comprises a paradigm of iCrypticus Secure iPage, iWindow and/or iPWindow, with registered card Data-iFields only, to pay for vehicle inspections, license renewal, insurance, advertisement, reservations or any other product and or services, and further incorporates all the associated embodiments listed herein, either separately, independently or in combination of each other.

It should be noted, data transfer points, e.g. telemetry-devices described to move data to a central collection system for computational equations, methods are not limited to stated specific embodiments described herein, but is intended to apply to all similar method and/or apparatuses for data transmission to or from system and transports, collection and subsequent analyzing and/or processing and dissemination thereof. Modifications and alterations from described embodiments will occur to those skilled in said art without departure from said spirit and scope of data collection method and system apparatus and is intended to be as succinct as possible. Furthermore, variations and modifications of foregoing are within scope of data collection method and system apparatus. It is understood, data collection method and system apparatus as disclosed herein extends to all alternative combinations of one or more of individual features mentioned, evident from text and/or drawings, and/or inherently and/or conceptually disclosed from minds eye as to presented art. All of these different combinations constitute various alternative aspects of data collection method and system apparatus and/or components thereof to navigate imechanixms safely. Embodiments described herein explain written representation for all system attributes. While present invention has been described with reference to one and/or more particular embodiments, those skilled in related art will recognize that many changes may be made thereto without departing from spirit and scope of said present invention. Each of these embodiments and obvious variations thereof is contemplated as falling within spirit and scope of inventions elements, which is set forth in application claims.

Furthermore, collection, communication link processes and associated methods and system apparatus are capable of other embodiments to numerous to enumerate and understood as being practiced or of being carried out in various ways not mentioned herein.

This invention may be embodied in many different forms as to a device sensor capabilities and should not be construed as limited to embodiments set forth herein. Rather, these embodiments are provided so that disclosure will be thorough and complete for those knowledgeable, will fully convey the scope of inventions limitless solutions to those skilled in associated arts revealed. Like numbers refer to like elements throughout. As used herein, the term "and/or" includes any and all combinations of one and/or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in these specifications, specify the presence of stated features, integers, steps, operations, elements, and/or components, but do not preclude the presence and/or in addition of one or more other features, integers, steps, operations, elements, components, and/or groups thereof.

Unless otherwise defined, all terms (including technical and scientific terms) used herein have the same meaning as commonly understood by one of ordinary skill in the art to which inventive items belongs. It is further understood that terms, such as those defined in commonly used dictionaries, should be interpreted as having a meaning that is consistent with their meaning in the context of the relevant art and will not be interpreted in an idealized and/or overly formal sense unless expressly so defined herein.

As will be appreciated from those further skilled in derivatives in the inventive art presented, portions are encrypted embodied on hardware or installed downloadable on certified ecomm-device transmitting directives to at least one human, transport apparatus, vehicle or iMechanizm. Transmissions from ecomm-devices are encapsulated hardware device, and/or a similar apparatus and system downloadable as a software application for certified smart-iDevice. Accordingly, present invention may take the form of an entirely hardware embodiment and/or an embedded micro, nano, micro/nano or nano/micro embodiment, combining software and hardware in all aspects all generally referred to as a "circuit" or "module" or iChipset, iChipset$^X$ or AiChipset system, each of which either may be layered and/or stacked referred to, as in one or more iChipsets, iChipset$^X$ or AiChipset on top of a iChipset, iChipset$^X$ or AiChipset that may and/or may not work independent of each other in certain aspects, procedures as to each micro, nano or mini-micro processor, processors or the processing of and/or combinations thereof, each performing specific duties or tasks assigned.

Thus, present invention includes a similar apparatus and system which computer program product is embodied on a non-transitory computer readable medium as a macro, micro or a nano configured embodied in medium and includes instructions which perform specific processes as is hard-coded within each devices NOS, programmed for downloaded application. Such storage mediums may include, but is not limited to, any type of disk including floppy disks, optical disks, CD-ROMs, magneto-optical disks, ROMs, RAMs, EPROMs, EEPROMs, flash memory, magnetic or optical cards, any other types of media suitable for storing and processing electronic instructions currently in use now or conceived of in future time.

Computer program code for carrying out operations of present invention may be written in any programming language including without limitation to any part therein; object oriented programming languages such as cross-layer optimization, artificial intelligence using parts from KVM, XML, Smalltalk, C# and/or C++, conventional procedural programming languages such as "C" programming language, visually oriented programming environments such as VisualBasic and ActiveX or virtual overlay modeling generated by quantum mathematics or currently known mathematical variations to overlay computed imaged results in linear, non-linear or of in any dimensional aspect computed results of which are displayed in a non-modifiable code index via a web based interface for subscribers and stakeholders, including on VIR Inter-Face on Obvipro's disciplined display.

Preferred embodiments for this invention comprises code languages comprising of none modifiable display codes such as without limitations XHTML, HTML5, XML, XSLT and/or current none modifiable display code, meta-language ideally suited towards dynamic data markup, further not able to be altered during or after at any point of data-transmissions, contents reproduction.

Such display codes provide digital GPSGIS Esri MapObjects, ArcSpatial Objects overlays, all other visual virtual displayable items will be in none evasive code that is not able to be modified after displayable generated content fact; wherein the construct uses XMTL, XHTML, HTML5, XML, XSLT or any other currently known or in its infancy, a none modifiable display code that simultaneously produces traffic vector nodes on a virtual display screen providing traffic navigational directives, text, SMS, voice over data-facts of any language and all other scenery relevant images in current strict language code where injections are not able to be implanted, the secure virtual vehicle navigational 'system' configurations pre-configured presentational functionality is not able to be altered after transmission.

Another preferred embodiment the secure virtual vehicle navigational system calculates ArcSpatial Objects using geographic information system (GIS) interconnected ArcPoints or ArcNode relationship from each vehicles current or future calculated VectorArc position, encompasses merging reprojected data subsets from vehicles Longlatilt traversing along any thoroughfare. Automating lateral traffic proximity variables determine a constructed model using script workflows, executing sequential overlays comparing individual vehicles calculated vector-range momentum with vector-space on roads and surrounding objects, e.g. building, bridges, guard rails, etc. Including other vehicles to automate complex GPSGIS workflows without need of programming, providing uncomplicated precise configured sequential trusted steps endlessly. Variations in interactive programs comprising one or many different and connected intricate exceptional scripted individualized or chained sub-routines, denote or involve numbers or quantities containing both real and imagery parts, end programmed customized geo-process displayed on iNavX2 virtual interface. Processes enhances not only scope, determining ArcSpatial Objects viewable on interactive screen, corresponding mathematical computations related to processes sub-routines are application building blocks for examining realtime VectorArc change from transmitted data through hub-devices for any given vehicle vLaneDrift. Each sub-routine employed reinforces other decision processes results. Thereby not relying on a single comm-link to produce dynamic result from traffic change or difference in road conditions from typical certain limits of any given process determination. Redundancy in sub-application runtime controls execution, each component application adds decision protection arriving at Phase-Change Spatial movement.

Wherein the preceding embodiments as to how invention is described, order of associated items were presentational in some cases to deepen illustrative embodiments overall prevailing possibilities in any examples included herein (e.g., specific deployed operating devices and their associated names, communication protocols, process or processes being performed at time-frame, operational parameters, dimensional aspects with each other, the secure virtual vehicle navigational system orientations, or of additional items not listed) and relationships between various components as disclosed and described herein are for illustrative purposes only, in no way limiting scope of any communication apparatus orderliness, functionality of attributes and/or data dissemination, collection as disclosed and claimed herein.

Furthermore, expressed or identified embodied sensors, solutions, processes, methods, communication devices encrypted or not, modules, apparatuses or embodiments disclosed or described herein may be implemented in conjunction with one another or independently from one another, depending on specific embodiment and implementation of the secure virtual vehicle navigational system data collection equipment in any infrastructures organizational disciplines or sub-routines within one or more subnaysys. Accordingly, presence or absence of other subject matter that may be complementary to present method and the secure virtual vehicle navigational system apparatus, no way limits scope of the present method or system apparatuses and its future contemplations thereof.

Most drivers when the light turns green wants to speed up, get up to the posted speed limit as legally fast as possible, attempting to beat the next light, some times this happens. Most of the time it's not going to happen, since lights or other sensors them selves are unable to determine the momentum of any vehicle within the mass or whether they are turning at the next intersection, directional movements or migrating from within a specific Vector-Range for each road areas dimensions based on DOT measurements. Others want to be first and go faster than those around them, again traffic lights can not determine this without the help of authoritative commands regulating speed in support, effecting one or more vehicles or a mass. Wherein the secure virtual vehicle navigational system instructs smart devices, smart-iDevices or iHD's equipped with the downloadable pAvics, advise drivers as to speed alterations or momentum flow, vector lane drifts, route directives or suggestions based on predicated artifacts, when to turn on left or right turn signals, break when probabilistic circumstance dictates, transmit engine data facts and more. Phase 2 is a combination of both human variations or variables and command controlled directives generated by the secure virtual vehicle navigational system (machine) suggestions, some of which may activate system variables stored within Obvipro to command turn signal activation at requisite time interval automatically, or of additional command control acronyms that are binary items not listed; wherein vehicle Obvipro advises driver responsible actions the secure virtual vehicle navigational system is taking, along with visual indications on virtual interface or audible sequence for each maneuvers for driver to take control an act on suggested command control directives or not. Phase 3 will encompass a parallel of Phase 2. Drivers will always have full capacity to take control and maneuver vehicle from system transmitted digital authenticated directives or allow the secure virtual vehicle navigational system to advise driver the next movement as in playing Chess with a machine, the vehicle repositions itself based on the secure virtual vehicle navigational system command controlled authorization, human control either by audible or visual-based prompts, entering iVocX Data Requests transmissions to Obvipro, through various HubClass Devices for navigational directional change, as needed or requested from driver, vehicle or as determined by the secure virtual vehicle navigational system.

Obviously, many other modifications and variations of the present invention are possible in light of the above teachings. The specific embodiments discussed herein, certain nomenclatures used to reveal unique processes to illuminate conceptualizations never thought of or considered before, some of which may merely become known through elaborations or illustrative in the overall explanation as time is of the essence in the thought amount to be as centered as possible, not meant to limit the scope of the present invention in any manner. It is therefore to be understood that within the scope of the disclosed secure virtual vehicle navigational system, may be practiced otherwise then as specifically described without departing from the soul and breadth of the delineated embodiments so characterized herein.

The invention claimed is:

1. A secure virtual vehicle navigational system which manages monitored traffic flow based on spatial phase change density factors and provides authoritative navigational and traffic directives to a plurality of autonomous or semi-autonomous systems vehicles based on the spatial phase change density factors;
   wherein the secure virtual vehicle navigational system comprises: a central processing server complex; a navigational system server complex, and a plurality of encrypted and paired communications apparatuses (ecomm-devices);
      wherein the plurality of ecomm-devices comprise;
         a smart device with authorized software upgrades that allows the secure virtual vehicle navigational system access to proprietary inertial measurements and sensors;
         a vehicle with an attached device that includes an RFIDGPS Module;
         a vehicle with a built in RFIDGPS Module;
         a tower with a RFIDGPS module;
         a drone device that has a RFIDGPS module;
         or any stationary or portable device that has a RFIDGPS Module;
            wherein the RFIDGPS module comprises at least two processors, a plurality of storage mediums, at least one interface, a display; a transceiver system with either a transceiver or transponder, a sensor system which includes embedded telemetry-devices, accelerometers and a quantum compass, at least one microcells, picocells, femtocells, Yagi antenna; and an either a directional antenna, omnidirectional antenna, or both;
               wherein the RFIDGPS module is configured to measure telemetry data, to determine the locational position of an ecomm-device based on sensors and measured telemetry data; record the measured telemetry and sensor data, record the locational the measured telemetry data and locational position data to other ecomm-devices in a surrounding area and the navigational system server complex, to continuously respond to requests for the measured telemetry data and locational position from other ecomm-devices in the surrounding area and the navigational system server complex, to continuously mark the measured telemetry data and the locational position upon being created within the ecomm-device, to continuously mark the measured telemetry data and locational position being received from other ecomm-devices in the surrounding area; to continuously mark the measured telemetry data and locational position being transmitted out of the ecomm-device; to continuously record the time distance calculated between the plurality of ecomm-devices in the surrounding area, to continuously record the calculated time distance between the navigational system server complex and the plurality of ecomm-devices in the surrounding area as messages are transmitted, received, and marked in
      wherein the authorized software installed on the smart device, is configured to measure telemetry data based on the propriety inertial measurements and sensors, to determine the locational position of an ecomm-device based on sensors and measured telemetry data; record the measured telemetry and sensor data, record the locational position of the ecomm-device, continuously transmit the measured telemetry data and locational position data to other ecomm-devices in a surrounding area and the navigational system server complex, to continuously respond to requests for the measured telemetry data and locational position from other ecomm-devices in the surrounding area and the navigational system server complex, to continuously mark the measured telemetry data and the locational position upon being created within the ecomm-device, to continuously mark the measured telemetry data and locational position being received from other ecomm-devices in the surrounding area; to continuously mark the measured telemetry data and locational position being transmitted out of the ecomm-device; to continuously plurality of ecomm-devices in the surrounding area, to continuously record the calculated time distance between the navigational system server complex and the plurality of ecomm-devices in the surrounding area as messages are transmitted, received, and marked in the plurality of ecomm-devices;
   wherein the plurality of ecomm-devices comprise a display that displays audio and visual content on an augmented virtual interactive reality interface configured with either a 2D, 3D or a 4D toggled interface;
   wherein the plurality of ecomm-devices are assigned a plurality of unique identifications;
      wherein each of the unique identifications are encapsulated in an encrypted wrapper program within a secure area of a nuclex operating system (NOS),
   wherein the plurality of ecomm-devices are restricted to read verifications only to at least one matched encrypted key and the matched encrypted keys associated paired-key sets,
   where the plurality of ecomm-devices are configured with a plurality of encrypted matched keys and there associated paired-key sets;
      wherein the plurality of encrypted key sets are configured by a plurality of coded algorithms and the algorithmic codes are stored within an encrypted repository within the NOS, wherein the NOS is configured to perform authentications by encrypting and decrypting communications transmitted from the navigational system server complex to the plurality of ecomm-devices and the plurality of ecomm-devices to the navigational system server complex;

wherein the navigational system server complex transmits and receives encrypted data with the plurality of ecomm-devices;

wherein the encrypted data transmissions comprises an embedded coded string within each transmission;

wherein the embedded coded string within the encrypted data transmission comprises of a plurality of signals that are sent as a series of pulses, packets, or both in a plurality of encrypted frequencies;

wherein within a random embedded coded strings, a Sentinel-Code is randomly implemented that detects attempted code injections during each transmission received;

wherein the central processing server comprises a plurality of registered and paired cloud servers which are in constant communication with a navigational system server complex;

wherein the navigational system server complex comprises of a plurality of networked domains, is configured as paired cloud servers, and is in constant communication with the plurality of ecomm-devices, wherein the navigational system server complex is configured to receive telemetry data from the plurality of ecomm-devices, receive locational position data from the plurality of ecomm-devices, receive time distance data between the plurality of ecomm-devices and between the navigational system server complex and from the plurality of ecomm-devices, receive further navigational informatics from multiple other sources; and use all of the received data to calculate spatial phase change density factors, by performing calculable equations, which allows the navigational system server complex to monitor traffic flow and provide authoritative navigational and traffic directives to a plurality of autonomous or semi-autonomous vehicles which have ecomm-devices installed based on the calculated spatial phase change density factors;

wherein the multiple sources include weather data from NavStar, GPS.gov, Huqhes or from other similar providers in conjunction with Channeled Telematic Weather from one or more NOAA and NCEI, traffic data from traffic databases, data from intersection light sensors, Department of Transportation databases including insurance and registration information, municipality computer systems, automobile dealerships and maintenance centers, cameras located throughout a specific region; topological data (longitude, latitude and altitude) from the plurality of ecomm-devices, and vehicle specifics data distributed through an on-board diagnostic device connected to vehicles OBD port;

wherein the calculable equations comprise the navigational system server complex tracking, recording, measuring and maintaining a spacial density factor in a clustered mass in a surrounding area between each of the plurality of ecomm-devices at a calculated speed in relationship to a spatial phase-change analytic from received data;

wherein the spacial density factor is calculated from current positional points of the plurality of ecomm-devices in relationship to prior position points of the plurality of ecomm-devices and at least one forecasted future positional phase point of the plurality of ecomm-devices;

wherein the navigational system server complex compares a speed of the a calculated clustered mass in the surrounding area chosen for the plurality of ecomm-devices and compares this speed with the navigational informatics received from the multiple other sources, determines locational position factors for the plurality of ecomm-devices within the same mass in the same surrounding area, calculates common variations in predictable overlay models for the plurality of ecomm-devices within the same mass in the same surrounding area, and provides spatial phase change density factors to manage the plurality of ecomm-devices flow rates at future points in time space;

wherein the navigational system server complex system transmits authoritative navigational and traffic directives which include modifiable speed variations, instructions, directives to the plurality of ecomm-devices and further suggestions for the user of an autonomous or semi-autonomous vehicle with an ecomm-device installed to operate vehicle lights, blinkers, change lanes, avoid a collision, change routes, alter routes consistent with original routes of the plurality of ecomm-devices, update destination time frames of the plurality of ecomm-devices, and provides alternate routes based on current computed location of the plurality of ecomm-devices with projected congestion and spacial phase change density factor computed variables;

wherein the authoritative navigational and traffic directives further include modifiable speed variations comprising weather variations or traffic updates causing reductions in flow rates, speed or velocity of the plurality of ecomm-devices, wherein the navigational system server complex detects a predicated or predictable eventuality of congestion level change in future time space for the plurality of ecomm-devices based on the spacial phase change density factors;

wherein the navigational system server complex is further configured to respond to a request from a vehicle navigational device installed on a vehicle and determines an anticipated communication interoperability issues in communication time-lag in responses to transmissions or requests from the vehicle navigational device between the navigational system server complex, the plurality of ecomm-devices, and the vehicle navigational device;

wherein the navigational system server complex is further configured to compute and compare the plurality of ecomm-devices spacial phase density factors in calculated traffic flow rates from change in weather conditions on selected routes or entire areas affected by atmospheric changes; to assist minimizing the need to break inertia of the plurality of ecomm-devices, to control safe vehicle density factors, and manage the plurality of ecomm-devices flow rates, thus maximizing constant traffic flow variable velocity for the plurality of ecomm-devices during weather conditions;

wherein the navigational system server complex is further configured to detect anomalies, accidents and mishaps by recording vehicles locations, time intervals of communications and distance traveled, time when the vehicle entered a specific region, time when a vehicle exited a region; vehicles travel speed, volume of traffic in relationship with topography and climatic conditions, traffic flow rates and traffic density for a specific region, transmitted signal indicators of the specific region, other monitored and recorded data sets for each user of the autonomous or semi-autonomous vehicle with an ecomm-device installed and any other navigational informatics received from the multiple other sources associated for a specific region, thus allowing the navigational system server complex to reconstruct anomalies and accidental occurrences and determine the derived causation for each of the anomalies, accidents, or mishaps;

wherein the navigational system server complex transmits instructions to the plurality of ecomm-devices installed on the autonomous or semi-autonomous vehicles, where the instructions are carried autonomously when the vehicle is autonomous or displayed either audible or visually on the display when the vehicle is semi-autonomous, and further wherein the display displays traffic signage, including representations for speed and location, spatial locations of surrounding vehicles accompanied with audible and visual navigational maneuvers for guidance, visual and audible notifications to users with destination arrivals time, alternate routes, traffic, when a vehicle is being controlled, and visually indicating and recording the vehicle is receiving transmissions from or to other vehicles.

\* \* \* \* \*